United States Patent [19]
Yamada et al.

[11] Patent Number: 5,432,023
[45] Date of Patent: Jul. 11, 1995

[54] FUEL CELL

[75] Inventors: Shuji Yamada; Motoya Kanda, both of Yokohama; Masao Yamamoto; Nobukazu Suzuki, both of Tokyo; Yoshiko Kanazawa, Yokohama; Akinori Hongu, Fujisawa; Yuu Kondou, Yokohama; Ken Uchida, Tokyo; Koji Hashimoto, Inagi; Hirokazu Niki, Yokohama; Kunihiko Sasaki, Kawasaki; Shinji Tsuruta, Yokohama, all of Japan

[73] Assignee: Kabushiki Kaisha Toshiba, Kanagawa, Japan

[21] Appl. No.: 238,703

[22] Filed: May 5, 1994

Related U.S. Application Data

[63] Continuation of Ser. No. 41,427, Mar. 31, 1993, Pat. No. 5,364,711.

[30] Foreign Application Priority Data

Apr. 1, 1992 [JP] Japan ................................ 4-080009
Sep. 11, 1992 [JP] Japan ................................ 4-243218
Oct. 19, 1992 [JP] Japan ................................ 4-279075

[51] Int. Cl.$^6$ ............................................. H01M 8/24
[52] U.S. Cl. ........................................... 429/34; 429/39
[58] Field of Search ....................... 429/34, 37, 38, 39

[56] References Cited

U.S. PATENT DOCUMENTS 4,467,019  8/1984  Feigenbaum .......................... 429/34
4,973,531 11/1990  Zaima et al. .......................... 429/37

FOREIGN PATENT DOCUMENTS 59-66066 4/1984 Japan .

Primary Examiner—Stephen Kalafut
Attorney, Agent, or Firm—Finnegan, Henderson Farabow, Garrett & Dunner

[57] ABSTRACT

In a fuel cell comprising a stack having superposed a plurality of electromotive parts composed of a fuel electrode, an oxidizing electrode, and an electrolyte layer nipped by the two electrodes and using a liquid fuel as the fuel for the fuel cell, this invention contemplates forming a liquid fuel introducing path destined to be directly exposed to the liquid fuel on terminal surfaces of the component parts of the electromotive parts in a direction perpendicular to the flow of an oxidizing gas along at least one of the outer peripheral surfaces of the stack including the terminal surface of the fuel electrode and lying parallelly to the flow of the oxidizing gas and enabling the liquid fuel in the liquid fuel introducing path to be supplied to the fuel electrodes by a capillary attraction. A fuel cell provided with means for recovery of the water produced by the cell reaction in the oxidizing electrodes is also disclosed, which fuel cell effects the removal of the water produced in the oxidizing electrodes during the operation of the fuel cell by a capillary attraction generated by two porous members, i.e. a first porous member disposed in the oxidizing electrodes and a second porous member adjoined to the first porous member and possessed of a smaller average pore diameter than the first porous member.

6 Claims, 33 Drawing Sheets

FUEL CELL

This is a continuation of U.S. patent application Ser. No. 08/041,427, filed Mar. 31, 1993, now U.S. Pat. No. 5,364,711.

BACKGROUND OF THE INVENTION

This invention relates to a fuel cell and more particularly to a fuel cell which fits miniaturization.

The fuel cells have been recently attracting keen attention as independent power generating devices on account of their high efficiency. These fuel cells are broadly classified into phosphoric acid fuel cells, molten carbonate fuel cells, solid oxide fuel cells, and alkaline fuel cells which share the requirement for consuming a gaseous fuel and methanol fuel cells and hydrazine fuel cells which share the requirement for consuming a liquid fuel. Since these fuel cells are intended for power sources chiefly used for driving power generators and large equipment, they necessitate such devices as a compressor and a pump for the introduction of the gaseous or liquid fuel and an oxidizing gas into the cell proper, entail complication of system, and consume electric power for the introduction of these substances.

The fuel cells will be specifically described below with reference to the methanol fuel cell which uses methanol as a liquid fuel, for example. In the system of the methanol fuel cell, the fuel is transferred from a methanol tank by a pump to the cell proper and air as the oxidizing agent is supplied from the ambient air by a blower to the cell proper. Particularly since this cell forwards as a dissolved fuel a mixed liquid of methanol destined to serve as a fuel and an electrolyte such as, for example dilute sulfuric acid in a compressed state via a methanol controller and an acid controller to the cell proper by means of a pump, the system is complicated all the more. The other fuel cells similarly suffer from this complication. The systems of all fuel cells invariably require to use a blower and a pump for the transfer of a fuel and an oxidizing gas. This complication of system arises from the fact that the current fuel cells are intended as power sources for power generation apparatus and large equipment and consequently destined to handle large volumes of power. To fulfill the functions, they require transfer of large volumes of the fuel and the oxidizing gas and consequently necessitate such transfer devices as a pump and a blower.

As a social trend, various facilities such as OA (Office Automation) equipment, audio equipment, and radio equipment have undergone gradual miniaturization with the advance of semiconductor technologies and are required to be adapted for portability. As power sources for satisfying this requirement, handy primary batteries and secondary batteries are now in use. The primary batteries and secondary batteries, however, are functionally limited in service life. The OA and other equipment using these batteries naturally offer limited service life. In the case of the OA equipment which uses these batteries, after the batteries are exhausted, the operation of the equipment can be continued by replacing the spent batteries with new supplies. Since the primary batteries have a short service life for their weight, they are unfit for portable equipment. The secondary batteries are rechargeable after they have completed discharge. Since the recharging requires a power source for exclusive use therefor, it not only consumes much time but also compels the secondary batteries to find only limited places for service. Particularly, the OA equipment incorporating a secondary battery therein inevitably imposes a limit on the length of continued service life because the replacement of batteries which is required after completion of discharge is difficult to make. The desire to give various small battery-operated devices an increase in service life cannot be easily satisfied by mere extensions of the conventional primary and secondary batteries. In the circumstances, the desirability of developing batteries having a longer service life has been finding growing recognition.

As one measure for the solution of the problem in question, the fuel cells described above are available. The fuel cells are advantageous in that they are capable of generating electric power simply by the supply of a fuel and an oxidizing agent and further in that they allow protracted and continued generation of electric power by the supply of fuel. When they are amply miniaturized, therefore, they can serve as highly advantageous systems for the operation of such small devices as the OA equipment which call for only a small power consumption.

Since the fuel cells allow use of air as the oxidizing agent, they place no limit on the place of use or on the duration of use from the standpoint of the oxidizing agent. The use of a gas as the fuel is not appropriate for the miniaturization of a fuel cell because the amount of the gas to be required for the generation of electric power is large on account of the density thereof, notwithstanding the OA equipment has a small power consumption. A liquid fuel has a high density as compared with a gaseous fuel and, therefore, is overwhelmingly advantageous as the fuel for the fuel cell to be used in a miniaturized OA device. When the fuel cell using a liquid fuel can be miniaturized, therefore, a power source for a miniaturized device which is capable of operating for a heretofore unattainable long duration can be realized. The problem in the realization of the power source for such a miniaturized device as mentioned above consists in the fact that since the system using the liquid fuel as conventionally practiced necessitates use of a pump for feeding the liquid fuel and a blower for feeding an oxidizing gas respectively to the cell proper as described above, the system itself is complicated and in the existing construction cannot be easily miniaturized.

Further, in the conventional fuel cells such as phosphoric acid fuel cells, molten carbonate fuel cells, and solid oxide cells, the gases which are supplied by a pump and a blower to the cell proper are introduced into an oxidizing electrode and a fuel electrode via gas channels which adjoin the electrodes mentioned above. In this case, the gas paths of the gas channels are formed each in the shape of a large groove enough to preclude the occurrence of pressure loss to the fullest possible extent from the standpoint of flowing the large volumes of fuel gas and oxidizing gas without exerting an undue load on the pump and the blower. In the gas channels of the carbonate fuel cell, for example, grooves of a depth exceeding 2 mm are generally formed. This rule similarly applies to such fuel cells as methanol fuel cells which use a liquid fuel. Particularly methanol fuel cells unlike phosphoric acid fuel cells mentioned above suffer more seriously from pressure loss than when a gas is used as the fuel because a mixture of sulfuric acid serving as the electrolyte and methanol destined to serve as the fuel is supplied to the electrolyte layer and the fuel electrode. Since the conventional fuel cells use a pump and a blower for the supply of a gas and a liquid as described above, the grooves in the gas channels are inevitably formed in large dimensions. When the grooves are formed in small dimensions, the pump and the blower are required to have large capacities. Thus, the conventional fuel cells have a problem in successfully attaining miniaturization by extension of the conventional techniques.

As a fuel cell enabled to cope with the problems mentioned above and adapted for miniaturization, the liquid fuel cell which utilizes the capillary attraction for the supply of a liquid fuel has been proposed (refer to Japanese Unexamined Patent Publication No. 66,066/1984). This liquid fuel cell is a parallel flow type cell which supplies a liquid fuel by aspiration from a fuel storing chamber disposed in a lower part upwardly in one direction to an anode by the capillary attraction of a capillary material using as a matric material an organic or inorganic fibrous material as paper, cotton, asbestos, or glass or a synthetic fibrous material as acryl or nylon and also supplies an oxidizing gas in the same direction as the fuel. This fuel cell requires the fuel storing chamber to be provided in the lower part and a gas inlet to be formed in the lower part of the cell proper to permit the supply of the oxidizing gas in the vertical direction. Thus, it is constructed so as to interpose a gap between the fuel storing chamber and the bottom surface of the stack. In this system, the capillary material is formed of fibers of appropriate flexibility so that part of the capillary material may be mechanically constricted to allow control of the supply of the fuel there-through. Further, this fuel cell is so constructed that the capillary material formed of electrically insulating substance as mentioned above may be buried in part of the collector on the anode side and held in tight contact with the collector.

The liquid fuel cell described above fits miniaturization more than the conventional fuel cells because it relies on the capillary action for the supply of the liquid fuel to the fuel electrode. It nevertheless entails a plurality of problems and, therefore, requires improvements capable of eliminating these problems. As mentioned in the relevant specification, this fuel cell has a constructional limitation that the liquid fuel is capable of permeating or penetrating the anode (fuel electrode) in the horizontal direction but is incapable of succumbing to the capillary action in the upward direction. Further, since the fuel cell of this system is so constructed as to necessitate interposition of a gap between the bottom surface of the stack and the fuel storing chamber and insertion of the fibrous capillary material in the fuel storing chamber as described above, the capillary material and the fuel storing chamber allow no easy sealing and, at the same time, the stack and the fuel storing chamber must be so constructed as to be integrally fixed. Moreover, since the fuel storing chamber must be provided in the upper part thereof with a plurality of inlets for the introduction of the capillary material in preparation for the integration, it entails the disadvantage that the construction thereof is complicated and extremely difficult to manufacture. It may be safely added that the construction for this integral fixation, the necessary for opening slits at least in the oxidizing electrode part of the bottom surface of the stack for the purpose of ensuring the flow of the oxidizing agent also adds to the complication of the construction.

Since the liquid fuel is supplied by the capillary action which is manifested in one direction from the lower part to the upper part as described above, the travel of the fuel to the upper part of the fuel electrode consumes much time and the shape of the fuel cell places a limit on the supply of the fuel by the capillary action. Generally for the purpose of increasing an electric current to be generated, such electromotive components as electrodes and electrolytic plates require an increase in area. In cases where the cell height is limited as in the present system, the electromotive components must be inevitably enlarged in width and the cell proper consequently restricted in shape. Further, this fuel cell has the capillary material of insulating substance buried in part of the collector on the fuel electrode side, the electrons which are obtained in consequence of the cell reaction inevitably flow through the collector, with the result that the electricity is concentrated and the route for the flow of the electricity is elongated possibly to the extent of inducing an electric loss.

As respects the work of clamping the fuel cell, the conventional fuel cells of large output and large area have required use of a large clamping device which is capable of exerting uniform force on the cell proper for the purpose of ensuring ample contact between the adjacent component parts of the fuel cell and enhancing the performance of the finished fuel cell. The phosphoric acid fuel cells and the molten carbonate fuel cells of the commercial grades have cell areas approximately in the range of from 5,000 to 10,000 $cm^2$. For the purpose of clamping these fuel cells to ensure thorough contact between the adjacent component parts thereof, the clamping device to be used for the work of clamping is required to be capable of exerting a clamping load approximately in the range of from 15 to 30 tons. The clamping devices heretofore adopted for handling the conventional fuel cells, therefore, are invariably complicated and overly voluminous. Thus, they are unfit for handling fuel cells which are directed toward miniaturization.

As one major cause for complicating the conventional fuel cells, the problem in the removal of the water which occurs as a reaction product on the surface of electrode may be cited. Generally, in the fuel cell, water occurs on one of the opposed electrodes as the product of cell reaction. This water must be removed from the surface of the electrode. The water thus stagnating as the product of cell reaction on the surface of the electrode obstructs the supply of a substance for replenishment to the electrode and, as a result, impairs the efficiency of the reaction in question.

Particularly the solid polymer electrolyte fuel cell which uses as an electrolyte a protonic conductive membrane such as of perfluorocarbon sulfonic acid (product of Du Pont marketed under trademark designation of "Nafion") operates at a relatively low temperature (room temperature to 100° C.) and, therefore, can be expected to serve effectively as a power source for miniaturized devices. In the fuel cell which operates at the low temperature not exceeding 100° C., the problem of stagnation of the water on the surface of the electrode gains all the more in seriousness because the water produced on the oxidizing electrode occurs in a liquid state and is not easily vaporized.

In the conventional fuel cell, the recovery of the formed water has been effected by providing an air supply duct on the lateral surface and an air discharge duct on the opposite lateral surface respectively of the cell proper and causing the produced water to form dew on the wall surface of the air discharge duct. FIG. 42 schematically illustrates the conventional fuel cell.

To be specific, as illustrated in FIG. 42, an air supply duct 83 incorporating therein a blower 82 is disposed on one lateral surface and an air discharge duct 84 is disposed on the other lateral surface respectively of a fuel cell proper 81 and a formed water recovery duct 85 is disposed below the air discharge duct 84 and these ducts are installed in a cell case 88 provided with openings for an air inlet 86 and an air outlet 87. The air is supplied by the blower 82 and the air containing the formed water is transferred into the air discharge duct 84. The formed water is allowed to form dew on the inner wall surface of the air discharge duct 84 and the dew produced by the formed water is recovered in the formed water recovery tank 85 and the discharged air is forwarded through the air outlet 87 and released into the ambient air.

When the method for recovering the formed water in the manner described above is applied to such a miniaturized fuel cell as expected, the advantage derived from the high efficiency and the compactness of size is lost because the electric power for driving the blower itself and the volume of the blower are too large to be ignored. Other methods have been proposed for recovery of the formed water. The method which effects the recovery of the formed water after this water has been gasified, by nature, has poor energy efficiency because it requires supply of energy equivalent to the heat of vaporization.

To realize a miniaturized fuel cell, therefore, it becomes necessary to use a mechanism which is capable of removing the formed water from the oxidizing electrode without using extra electric power or energy.

As another cause for complicating the system of a fuel cell, a problem of construction may be cited.

FIG. 43A and 43B illustrates a common construction of superposed layers in one example of the phosphoric acid fuel cell. In this case, conducting plates 39 which are called a separator or an interconnector are interposed one each between a plurality of electromotive parts composed of an oxidizing electrode 38, an electrolyte layer 36, and a fuel electrode 37 to connect the electromotive parts in series and secure necessary voltage. This construction is not limited to the phosphoric acid fuel cell but applied effectively to the molten carbonate fuel cell and further to the solid polymer electrolyte fuel cell. In the fuel cell of this construction, the fuel or the air as an oxidizing agent which has been supplied to the cell by the use of a pump or a blower is introduced into the relevant electrodes via separators which adjoin the oxidizing electrode and the fuel electrode. In this case, from the viewpoint of flowing large volumes of such reactant substances as fuel and oxidizing gas without exerting an undue load on the pump or the blower, the paths for gas flow in the separators or the electrode plates are formed in the shape of a groove so deep as to avoid inducing pressure loss to the fullest possible extent. In the case of a fuel cell which uses a liquid fuel such as methanol, since this fuel cell flows the fuel in a liquid state unlike the phosphoric acid fuel cell, the pressure loss gains all the more in seriousness than when the fuel is used in a gaseous state.

The fuel cell of the conventional construction requires to have a considerable thickness because the paths for flowing the reactant substances must be formed as in the separators. Thus, the volume to be occupied by other than the inherent electromotive parts, i.e. the electrolyte layer, the reaction catalyst for the fuel and the oxidizing electrode, and the collectors, is suffered to increase inevitably. If the electrode plates and separators which function as paths for flow are reduced in thickness, since the narrow paths for flow still play the part of supplying the reactant substances, the pump and the blower are compelled to bear an undue load. As an inevitable consequence, these mechanisms must be enlarged.

As a measure to attain miniaturization of the fuel cell as a whole by decreasing to the fullest possible extent the volume which is occupied by other than the inherent electromotive parts, i.e. the electrolyte layer, the reaction catalyst for the fuel and the oxidizing electrode, and the collectors, a method which comprises arranging a plurality of electromotive parts vertically in the direction of thickness, namely parallelly in the lateral direction and interconnecting the terminal parts thereof in series may be conceived. The fuel cell embodying this method allows the supply of the reactant substances to and the recovery of the reaction products from the plurality of electromotive parts to be attained by the use of one empty space, obviates the necessity for separators, and does not require the electrode plates to function as paths for flow. Thus, the paths may be omitted or reduced in thickness. The concepts of this principle have been already disclosed in Japanese Unexamined Patent Publications No. 141,266/1988 and No. 141,270/1988, for example.

The fuel cells of such construction as described above, however, entail the following problems.

In the ordinary fuel cells, the reactant substances which are supplied to the electrolyte layer for the purpose of replenishing the components of electrolyte which have been lost by exudation or vaporization or preventing the electrolyte layer from drying are made to incorporate therein the same electrolyte as contained in the electrolyte layer and steam.

Particularly, the solid polymer electrolyte fuel cell which uses as an electrolyte a protonic conductive membrane such as of the aforementioned perfluorocarbon sulfonic acid (product of Du Pont marketed under trademark designation of "Nafion") among other electrolytes suffers from gradual shortage of water on the fuel electrode side and gradual decline of efficiency because water flows in conjunction with ions from the fuel electrode to the oxidizing electrode during the operation of the fuel cell. The fuel to be supplied to the fuel electrode, therefore, is replenished with a liquid electrolyte when the fuel is a liquid substance such as methanol or with steam when the fuel is hydrogen gas.

On the other electrode, formation of water takes place. In the aforementioned solid polymer fuel cell, the oxidizing electrode side has excessive water because of the presence of the water flowing from the fuel electrode in addition to the water which is formed by the electrode reaction.

The water, electrolyte which have been supplied as entrained by the reactant substances, and formed water form the cause for ionically linking or short-circuiting a plurality of electromotive elements and consequently inducing a decline in cell voltage. This problem gains in conspicuousness particularly when the water and electrolyte mentioned above happen to occur in a liquid state.

In the fuel cell of the construction having a plurality of electromotive elements arranged parallelly in the lateral direction and the terminal parts thereof interconnected in series, the problem of such voltage loss gains all the more in seriousness because the electromotive elements share a space for the supply of fuel and a space for the recovery of the product and further because the distances between the adjacent electrodes are small.

FIG. 28 is a schematic diagram illustrating two electromotive parts arranged parallelly in the lateral direction and interconnected in series. In FIG. 28, 37 stands for a fuel electrode, 60 for an electrolyte layer, and 38 for an oxidizing electrode and two electromotive parts 55 are electrically interconnected in series with a lead 57. The fuel electrodes 37a, 37b and the oxidizing electrodes 38a, 38b of the two electromotive parts adjoin each other. The supply of the fuel and the discharge of the product can be carried out in one empty space in either of the two electromotive parts. In the construction of FIG. 28, the supply of the fuel is effected through a fuel path 58 and the supply of the oxidizing gas through an oxidizing agent flow path 59.

In this case, a potential gradient is produced between the fuel electrode 37a of one of the electromotive part and the fuel electrode 37b which is equivalent in potential to the oxidizing electrode 38a of the same electromotive part. A potential gradient is similarly formed between the oxidizing electrode 38a and the oxidizing electrode 38b.

In this case, when a substance which functions as an electrolyte happens to exist on the surfaces of the two electromotive parts, i.e. the fuel flow path 58 and the oxidizing agent flow path 59, migration of ions occurs in accordance with the potential gradient mentioned above. This migration of ions functions as a leak current and induces loss of voltage.

When the miniaturization of a fuel cell is to be attained with the construction in which the plurality of electromotive parts are arranged parallelly in the lateral direction and interconnected in series and are made to share an empty space for the supply of the fuel and an empty space for the recovery of the product as described above, the voltage loss which occurs between the electromotive parts is suffered to degrade the efficiency of the fuel cell. Thus, the miniaturized fuel cell requires to decrease the voltage loss.

The fuels which are effectively used for the common fuel cells include gaseous fuels such as hydrogen gas and liquid fuels such as methanol and hydrazine, for example. The use of a gaseous fuel in the fuel cell for an OA device is unfit for the purpose of miniaturizing the fuel cell in spite of the small power consumption by the OA device because the amount of the gaseous fuel required for power generation is very large on account of the density of the gas. The liquid fuel has a high density as compared with the gaseous fuel and constitutes itself an overwhelmingly advantageous fuel in the fuel cell for the miniaturized device. When the fuel cell using the liquid fuel is successfully miniaturized, a power source having a heretofore unattainable long service life can be realized for a miniaturized device.

Among other liquid fuels, such C1 to C2 compounds as methanol and ethanol are inexpensive and have moderately high boiling points and, therefore, can be readily used from the standpoint of safety. As a technical difficulty encountered by the fuel cell of this kind, the development of an electrode catalyst may be cited. In the anodic oxidation of such a fuel as methanol which contains carbon atoms, the phenomenon of poisoning due to the gradual fast deposition of the intermediate reaction product on the surface of electrode with the elapse of time manifests itself even when the electrode is made of platinum inherently exhibiting a high catalytic activity and eventually brings about a great loss of the catalytic activity of the electrode. This adverse phenomenon raises a serious problem in the development of a practicable fuel cell.

A campaign for the development of an electrode catalyst which excels in resistance to the poisoning in question is well under way. It has not yet succeeded in introducing a catalyst of ideal quality. At present, a fuel cell which is capable of stably yielding high output for a long time remains yet to be developed. The fuel cell which uses an organic fuel such as methanol, therefore, requires to curb the phenomenon of poisoning on the surface of the electrode.

As described above, the conventional fuel cell of ordinary run is complicated as a system and, unless the existing construction is given an appreciable improvement, poses a difficult problem in miniaturization. The conventional liquid fuel cell which makes use of the capillary action fits miniaturization from the constructional point of view. Since it is complicated and has many limitations in construction, it has not yet been miniaturized enough to be used as a power source for a small device. Further, the method for clamping the component parts of fuel cell, the discharge of the formed water, and the interconnection of electromotive parts need to be adapted for miniaturization of the fuel cell. The poisoning of the surface of electrode which occurs when a liquid fuel is used in the fuel cell also demands a due countermeasure.

SUMMARY OF THE INVENTION

This invention has been produced for the purpose of solving the problems encountered by the conventional fuel cells mentioned above and providing a miniaturized fuel cell which is useful as a power source for a miniaturized device.

The first object of this invention is to provide a fuel cell which simplifies a system for the supply of a liquid fuel and an oxidizing gas, permits use of a simple construction, and allows miniaturization without a sacrifice of high efficiency.

The second object of this invention is to provide a fuel cell which fits miniaturization and allows the discharge of the water formed in consequence of the operation of the fuel cell without requiring any special motive force or energy.

The third object of this invention is to provide a fuel cell which minimizes ionic conduction between electromotive parts, entails only sparing loss of voltage even when the electromotive parts are interconnected in a manner fit for miniaturization of the fuel cell, and enjoys perfect feasibility.

The fourth object of this invention is to provide a fuel cell which is capable of curbing the phenomenon of poisoning to be manifested on the surface of the electrode when such a liquid fuel as methanol, a suitable fuel for use in a miniaturized fuel cell, is adopted and also capable of yielding a stable output for a long time.

This invention has been perfected to accomplish the objects mentioned above. The first fuel cell aimed at simplifying a system for the supply of raw materials thereby fulfilling the first object of this invention comprising a stacked body which includes a fuel electrode composed of porous material having capillaries, an electrolyte plate stacked on the fuel electrode, and an oxidizing electrode stacked on the electrolyte plate, fuel supplying means for supplying liquid fuel to the lateral face of the stacked body, wherein the liquid fuel is diffused into the fuel electrode by capillary attraction, and oxidizing gas supplying means for supplying oxidizing gas to another lateral face of the stacked body by flowing the oxidizing gas along the face of the oxidizing electrode.

The stacked body of the first fuel cell is a rectangle having two main faces and four lateral faces, the oxidizing gas flows from the first lateral face of the stacked body to the second lateral face of the stacked body which is parallel to the first lateral face, and the fuel supplying means is attached to the third or fourth side of the stacked body.

The fuel supplying means of the first fuel cell comprise a liquid fuel introducing path formed on at least one of the lateral faces of the stacked body.

Further, in the first fuel cell a plurality of the stacked bodies are superposed.

The second fuel cell comprises a stack having superposed a plurality of stacked bodies of the first fuel cell, which fuel cell is characterized by the fact that oxidizing gas supplying grooves for flowing the oxidizing gas are formed on the surfaces of the fuel electrodes.

The third fuel cell comprises a stack having superposed a plurality of stacked bodies of the first fuel cell, which fuel cell is characterized by the fact that oxidizing gas supplying grooves for flowing the oxidizing gas are formed on the oxidizing electrodes.

The fourth fuel cell comprises a stack having superposed through the medium of a separator a plurality of stacked bodies of the first fuel cell. And in the fourth fuel cell, the fuel supplying means comprises a liquid fuel introducing path formed on at least one of the lateral faces of the stacked body.

The fifth fuel cell comprises a stack superposed a plurality of stacked bodies, comprising a fuel electrode, an oxidizing electrode, and an electrolyte plate nipped between the fuel electrode and the oxidizing electrode, wherein the stack is clamped at least in the direction of superposition of the stacked body with a material having rubber elasticity.

The fuel cells of this invention described above invariably allow effective flow of the oxidizing gas because they are constructed so as to cause the oxidizing gas to flow in the vertical direction relative to the stack. The flow of the oxidizing gas is not obstructed and the supply of the liquid fuel by the capillary attraction is ensured because the liquid fuel introducing paths are formed in a direction perpendicular to the flow of the oxidizing gas along the outer peripheral surface of the stack lying parallelly to the flow of the oxidizing gas and the liquid fuel introduced into the liquid fuel introducing paths is supplied to the fuel electrodes by the capillary attraction. These fuel cells permits simplification of construction and places only sparing limit on construction. Owing to these features, the fuel cells allow smooth supply of the oxidizing gas and the liquid fuel without specifically requiring use of such auxiliary parts as a pump and a blower. Thus, they promise miniaturization.

The fuel cell using an improved method for the discharge of the formed water, the second object of this invention, has the following construction.

The fuel cell comprises a stacked body comprising a fuel electrode, and an electrolyte plate nipped between the fuel electrode and the oxidizing electrode, means for supplying a fuel to the stacked body, means for supplying an oxidizing agent to the stacked body, and means for recovering the water generated in the oxidizing electrode, wherein the recovering means comprise a first water absorbing means adjoined to the oxidizing electrode, and second water absorbing means adjoined to the first water absorbing means, wherein the second water absorbing means have higher water absorbing ability than the first water absorbing means.

That is, this fuel cell comprises an electromotive part composed of a fuel electrode, an oxidizing electrode, and an electrolyte layer nipped between the two electrodes, a first porous member adjoined to the oxidizing electrode and adapted to absorb the water emanating from the oxidizing electrode, and a second porous member adjoined to the first porous member and adapted to absorb the water retained by the first porous member, which fuel cell provides the second porous member constructed so that the average pore diameter thereof decreases in the direction of flow of the water.

The fuel cell which uses such a liquid fuel as methanol, for example, discharges the function of a fuel cell by the following mechanism.

The fuel such as methanol is supplied to the fuel electrode and oxygen to the oxidizing electrode. In the case of the fuel cell using methanol, for example, the following reactions occur.

Fuel electrode (anode): $CH_3OH + H_2O \rightarrow CO_2 + 6H^+ + 6e$ 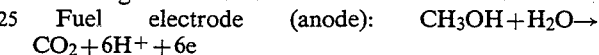

Oxidizing electrode (cathode): $3/2O_2 + 6H^+ + 6e \rightarrow 3H_2O$ 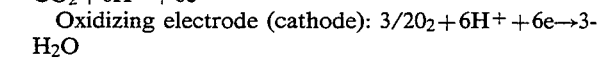

Overall reaction: $CH_3OH + 3/2O_2 \rightarrow CO_2 + 2H_2O$ 

To be specific, on the fuel electrode, methanol and water undergo an equimolar reaction and produce carbon dioxide gas and protons. The protons pass the solid polymer electrolyte membrane and reach the fuel electrode, at which they react with oxygen to form 3 mols of water. Totally, the reaction of methanol with oxygen forms 2 mols of water. For the purpose of enabling these reactions to proceed smoothly, it is necessary at least to remove the formed water quickly.

When the fuel cell is intended to serve as a power source for a miniaturized device, the quick removal of the formed water must be carried out without resorting to any extra motive force.

The oxidizing electrode contemplated by this invention is so constructed as to adjoin a porous member to the surface of the oxidizing electrode or form the oxidizing electrode itself with a porous member and effect the removal of the water formed on the oxidizing electrode by the capillarity manifested by the porous member. Further, for the recovery of the water, a porous member having a stronger capillary attraction than the porous member adjoined to the surface of the oxidizing electrode or the oxidizing electrode itself made of a porous member, namely a porous member having a smaller average pore diameter than the porous member mentioned above, is set in contact with the porous member adjoined to the surface of the oxidizing electrode or with the oxidizing electrode formed of a porous member. As a result, the water is smoothly removed from the surface of the oxidizing electrode.

This invention is particularly effective when it is applied to a fuel cell which operates at a temperature, specifically at a temperature of about 100° C. or below, at which the water formed on the oxidizing electrode is in a liquid state. In other words, the absorption of the water by the capillarity of the porous member is effectively attained when the water is in a liquid state.

The fuel cells whose working temperatures at not higher than about 100° C. include alkali fuel cells, phosphoric acid fuel cells designed to operate under special conditions, and solid polymer electrolyte fuel cells, for example. The solid polymer electrolyte which is used particularly in the solid polymer electrolyte fuel cell is made of a macromolecular compound possessing an ion-exchange capacity. The macromolecular compound molded in the shape of a membrane allows no leakage of electrolytic solution, precludes mixture of the reactants of anode and cathode, and fits miniaturization and simplification of a fuel cell system. To date, a proton-conducting solid polymer membrane has been developed to the extent of finding practical utility. An anion-conductive membrane may be used.

When the miniaturization of the fuel cell is considered, hydrogen gas, for example, can be used as the fuel for the fuel cell. For example, the hydrogen gas which is occluded in a hydrogen-storage alloy may be used. The fuels which are used desirably from the practical point of view include alcohols such as methanol and ethanol, hydrazine, and amic acids which are in a liquid state at normal room temperature.

The fuel cell allowing only meager voltage loss between the electromotive parts, the third object of this invention, has the following construction. In this fuel cell, a plurality of electromotive parts composed of a fuel electrode, an oxidizing electrode and an electrolyte layer nipped between the two electrodes are interconnected in series. The fuel electrodes severally of the electromotive parts are supplied with the fuel transported through a common fuel flow path and the surfaces of the fuel electrodes severally of the electromotive parts are opposed to the fuel flow paths or the oxidizing electrodes severally of the electromotive parts are supplied with the oxidizing agent transported through a common oxidizing agent flow path and the surfaces of the oxidizing electrodes severally of the electromotive parts are opposed to the oxidizing agent flow paths. The fuel cell thus constructed is characterized by the fact that the electrolyte layer contains a water-absorbing or water-retaining substance.

In the fuel cells described above, the electrolyte layers severally of the electromotive parts incorporate therein, in addition to a compound possessing an ion-exchange capacity which is a main component substance for ordinary electrolytes, a water-absorbing or water-retaining substance which is capable of supplying water to the interior of membrane, retaining the water therein, or allowing passage of water proportionately to the prevalent concentration gradient.

Since the electrolyte layer contemplated by this invention exhibits a water-absorbing or water-retaining property as described above, it functions to absorb quickly the water formed on one electrode catalyst surface and keep the catalyst surface constantly ready for contact with a reactive substance and, at the same time, diffuse the absorbed water in the electrolyte proportionately to the prevalent concentration gradient and prevent the other electrode surface from drying. During this process, the electrolyte itself manifests an outstanding property of constantly maintaining effective ion-dissociating and ion-conducting characteristics without requiring introduction of water from an external source.

The fuel layer using this electrolyte layer, therefore, is capable of supplying water into the electrolyte without entailing addition of water to the reactant substances being supplied. The ion conduction outside the electrolyte layer can be curbed notably because the water produced on the oxidizing electrode is quickly absorbed.

The water-absorbing or water-retaining substances which are effectively usable for this invention include absorbent macromolecular compounds such as starch, acrylonitrile copolymers, cross-linked acrylates, and cross-linked polyethylene oxide and gel compounds such as silica hydrogel and denatured protein (gelatin), for example.

The effect of this invention is manifested conspicuously when the electrolyte to be used in a solid polymer electrolyte.

Among other solid polymer electrolytes, the proton-conducting solid polymer electrolytes include perfluorocarbon sulfonic acid polymer (product of Du Pont of U.S.A. marketed under trademark designation of "Nafion") and sulfonic acid group-containing polystyrene cation-exchange membranes, for example.

Owing to the use of the electromotive part of the nature described above, the fuel cell of a construction such that neither of the reactant substances supplied to the oxidizing electrode and the fuel electrode which form the essence of this invention contains an electrolytically acting substance more than is inevitably entrained therein and the terminal parts of the plurality of electromotive parts are interconnected in series can be realized.

For the interconnection of the terminal parts of the plurality of electromotive parts in series, the method which resorts to direct interconnection of the collectors severally of the power-generating elements by welding or with a conductive adhesive agent, the method which effects the interconnection through the medium of a conducting plate for the purpose of precluding mixture of the reactant substances or leakage of electric current, or the method which comprises pre-shaping the plurality of electromotive parts integrally so as to allow interconnection in series in advance of the manufacture of the electromotive parts may be adopted.

In these methods, the possible leakage of electrolyte may be effectively prevented by giving a water-repelling treatment to the parts of union of the plurality of electromotive parts.

The fuel cell which curbs the phenomenon of poisoning on the surface of electrodes, the fourth object of this invention, comprises a fuel electrode, an oxidizing electrode, and an electrolyte layer nipped between the two electrodes, which fuel cell is provided with means for anodically polarizing the fuel electrode.

To be specific, this invention contemplates using a mechanism which, when a poisoned product is formed on the surface of the fuel electrode during the operation of the fuel cell, anodically polarizes the fuel electrode by connecting a counter electrode to this fuel electrode and removes the poisoned compound by means of oxidation. As a result, the fuel cell to be produced obtains a stable output for a long time.

Further, in the ordinary fuel cell, a plurality of electromotive parts composed of a fuel electrode, an oxidizing electrode, and an electrolyte layer are interconnected in series. In this case, the polarizing operation mentioned above is desired to be rotated through the plurality of electromotive parts. In this manner, therefore, the removal of the poisoned product can be carried out without interrupting the operation of the fuel cell.

DESCRIPTION OF THE PREFERRED EMBODIMENTS

Now, this invention will be described more specifically below with reference to preferred embodiments thereof.

First, the fuel cell which has been miniaturized without a sacrifice of high efficiency by simplifying the system for supply of liquid fuel and oxidizing gas and also simplifying the construction in conformity with the first object of this invention will be explained.

Figure 1:
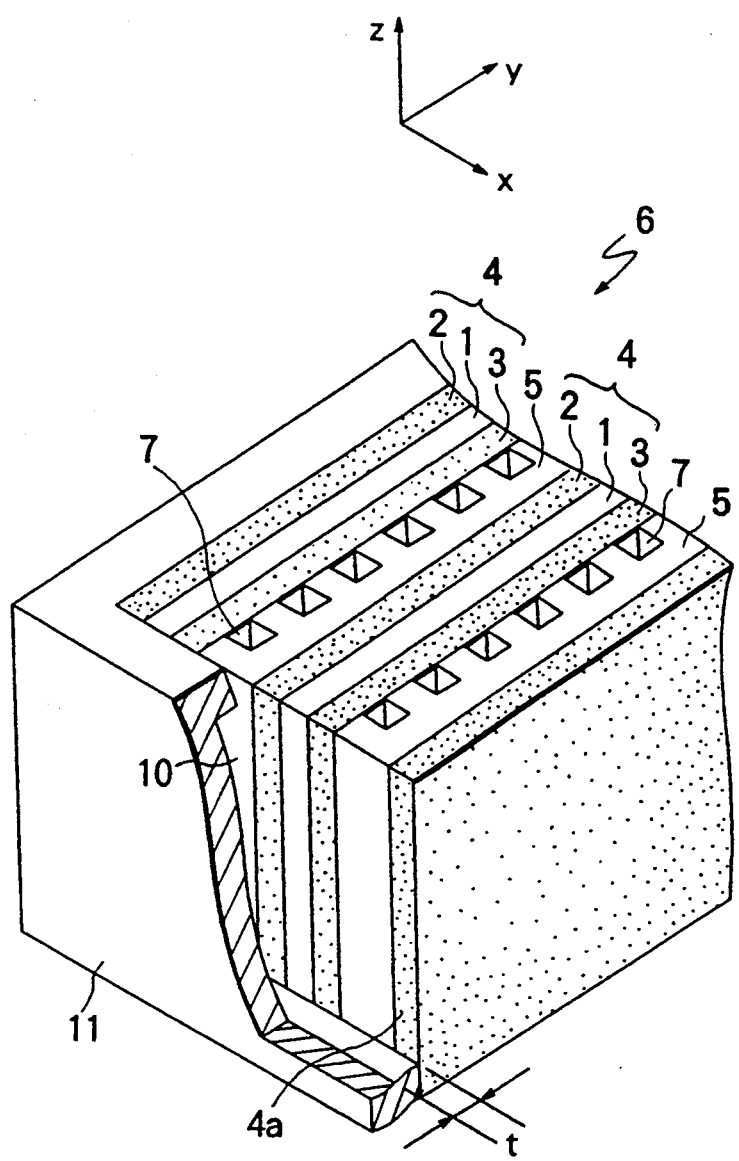
FIG. 1 is a partially cut-away perspective view illustrating the construction of the essential part of a separator-containing fuel cell as one embodiment of this invention.

FIG. 1 is a partially cut-away perspective view illustrating the construction of the essential part of a fuel cell as one embodiment of this invention. In the diagram, 1 stands for an electrolyte plate nipped by and between a fuel electrode (anode) 2 and an oxidizing electrode (cathode) 3. An electromotive part 4 is composed of the electrolyte plate 1, fuel electrode 2, and oxidizing electrode 3. Here, the fuel electrode 2 and the oxidizing electrode 3 are both formed of a conductive porous material so as to permit flow therethrough of the fuel and oxidizing gas and allow passage therethrough of electrons.

By superposing a plurality of such electromotive parts 4 as described above through the medium of a separator 5, a stack 6 destined to serve as a cell proper is constructed. This stack 6 basically is so set in place that the superposed surfaces of the electromotive parts 4 may lie parallelly with the vertical direction. The separator 5 mentioned above is formed of a conductive material so as to fulfill the function of a collector for conducting generated electrons. Optionally, a catalyst layer in the form of a layer, islands, or granules may be interposed, when necessary, between the fuel electrode 2 or the oxidizing electrode 3 and the electrolyte plate 1. This invention is not affected by the presence or absence of this catalyst layer. The fuel electrode 2 or the oxidizing electrode 3 itself may be used concurrently as a catalyst electrode.

For the purpose of ensuring effective flow of the oxidizing gas such as, for example, air in the fuel cell of this invention without requiring a motive power, the fuel cell must be so constructed that the oxidizing gas will flow in the vertical direction relative to the stack 6. Particularly, by causing the oxidizing gas to flow in the direction from the lower to the upper part of the stack 6, the heat generated in consequence of the cell reaction enables the oxidizing gas to flow very smoothly. In the present embodiment, therefore, oxidizing gas supplying grooves 7 for flowing the oxidizing gas in the vertical direction (the direction of z shown in the diagram) are formed as continuous channels in the surfaces of the separators 5 adjoining the oxidizing electrodes 3.

Since a gas has a notably small density as compared with a liquid and in consideration of the balance between the liquid fuel and the oxidizing gas which is necessary for the cell reaction, the construction which allows the oxidizing gas to be supplied in a larger amount than the liquid fuel is advantageous for the sake of efficiency and performance and consequently for the purpose of promoting the miniaturization of a fuel cell. From this point of view, the degree with which the oxidizing gas supplying grooves 7 advantage the operation of the fuel cell grows in proportion as the cross-sectional areas of the grooves 7 enlarge. When the grooves 7 are overly enlarged in width for the purpose of increasing the cross-sectional areas thereof, the areas of the grooves 7 available for electrical contact are decreased so much as to induce loss. When the grooves 7 are overly enlarged in depth for the same purpose, the electrodes or separators 5 gain so much in thickness as to disadvantage the miniaturization. When the grooves 7 are increased in number and proportionately decreased in cross-sectional area thereof, the pressure loss of the oxidizing gas inside the gas supplying grooves 7 is increased possibly to the extent of rendering smooth flow of the oxidizing gas difficult. It is, therefore, desirable to give the grooves 7 a width of about 0.5 mm to about 20 mm and a depth of from about 0.2 mm to about 2 mm. The shape of these oxidizing gas supplying grooves 7 is to be decided in consideration of the method to be adopted for the supply of the fuel gas as specifically described afterwards herein.

The separators 5 in the present embodiment concurrently fulfill the function of a channel for flowing the oxidizing gas as described above. The use of the parts 5 thus fulfilling the functions of a separator and a channel (hereinafter referred to as "combination channel and separator") allows a decrease in the total number of component parts to be used and promotes the miniaturization in a large measure. It is permissible to use ordinary channels in the place of the separators 5.

The combination channels and separators of the nature described above may be formed of a metallic plate devoid of pores or of a porous material. They are required only to be capable of separating the liquid fuel and the oxidizing gas. When the porous material is used, it is desirable for the purpose of preventing the liquid fuel from invading the oxidizing electrodes 3 to stopper the pores in the combination channels and separators 5 at least on the fuel electrode side or the oxidizing electrode side. Further, for the purpose of improving the flow of the oxidizing gas, it is desirable to give the pores in the combination channels and separators 5 made of a porous material a larger diameter than those in the porous members serving as the oxidizing electrodes 3.

Figure 2:
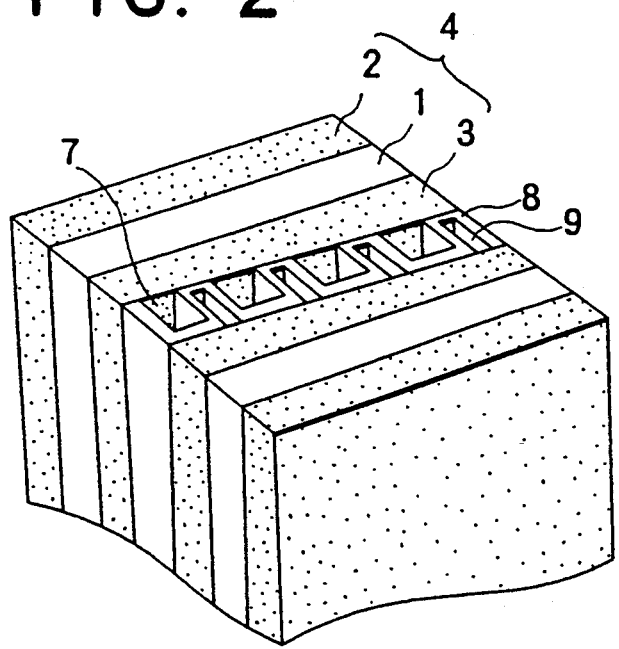
FIG. 2 is a diagram for aiding in the explanation of a modified example of a combination channel and separator shown in FIG. 1.

The oxidizing gas supplying grooves 7 are not specifically discriminated on account of their shape so long as they satisfy the conditions mentioned above. For example, such combination channels and separators 8 as produced by folding and bending a thin metallic plate with a press or roll as illustrated in FIG. 2 may be used. The separators 8 of this shape allow disposition of the oxidizing gas supplying grooves 7 on the oxidizing electrode 3 side thereof and continuous grooves 9 on the fuel electrode 2 side thereof. It is also permissible to provide the combination channels and separators 5 (8) with the oxidizing gas supplying grooves 7 and, at the same time, provide the oxidizing electrodes 3 with grooves for flowing the oxidizing gas in the vertical direction.

The stack 6 mentioned above is provided on at least one lateral surface thereof with a fuel introducing path forming member 11 so as to allow formation of a liquid fuel introducing path 10 along the lateral surface mentioned above. The liquid fuel (generally a mixed liquid consisting of dilute sulfuric acid as an electrolyte and methanol as a fuel, for example) which has been introduced into the liquid fuel introducing path 10 is supplied to the fuel electrodes 2 through the lateral surface of the stack 6 by the capillary attraction. If the liquid fuel introducing path 10 is formed on or beneath the stack 6 when the oxidizing gas is supplied in the direction from the lower to the upper side, it complicates the construction of the stack 6 greatly. It is important that the liquid fuel introducing path 10 should be formed along one of the four lateral surfaces and not along the upper and lower surfaces in all the six surfaces of the stack 6 and in a direction perpendicular to the flow of the oxidizing gas (the direction of x in the diagram). For the purpose of enabling the liquid fuel reaching the liquid fuel introducing path 10 to be supplied to the fuel electrodes 2 through the lateral surface of the stack by the capillary attraction, the liquid fuel introducing path 10 is formed along at least one (the lateral surface 4a, for example) of the two lateral surfaces formed by the terminal surfaces of the electromotive parts 4. To be more specific, the liquid fuel introducing path 10 is formed in a direction perpendicular to the flow of the oxidizing gas along the surface formed of the terminal surfaces of the electromotive parts 4 in the outer peripheral surfaces of the stack 6, i.e. the one surface 4a including the terminal surfaces of the fuel electrodes 2 and lying parallelly to the flow of the oxidizing gas. For the purpose of enabling the liquid fuel to be supplied to the fuel electrodes 2 by the capillary attraction, the fuel cell is so constructed that the liquid fuel introduced into the liquid fuel introducing path 10 will directly contact the terminal surfaces 4a of the electromotive parts 4 mentioned above.

As a result of the construction described above, the entire terminal surfaces of the fuel electrodes 2 can be directly exposed to the liquid fuel and the liquid fuel reaching the interior of the liquid fuel introducing path 10 supplied smoothly to the fuel electrodes 2 by the capillary attraction without obstructing the flow of the oxidizing gas. Further, the fuel cell of the present embodiment allows simplification of the construction of its own, avoids placing any noticeable limit on construction, and permits miniaturization because the direction of supply of the oxidizing gas (z direction) and the direction of introduction of the liquid fuel to the terminal surface of the stack 6 are made to intersect perpendicularly to each other as a rule.

Incidentally, the fuel introducing path forming member 11 is not specifically discriminated on account of construction or material. For example, it may be formed integrally with or separately from the clamping member of the stack 6. It is, however, essential that the part of the fuel introducing path forming member 11 which adjoins the lateral surface of the stack 6 should be insulated so as to prevent adjacent cells from short-circuiting. This insulation is attained, for example, by forming the fuel introducing path forming member 11 itself with an insulating material or interposing an insulating material between the fuel introducing path forming member 11 and the stack 6.

The shape of the liquid fuel introducing path 10 mentioned above basically is only required to be such that the liquid fuel will be introduced from a fuel storing tank which is omitted from illustration and the liquid fuel so introduced will be supplied to the fuel electrodes 2 by the capillary attraction. As one way of supplying the liquid fuel from the fuel storing tank to the liquid fuel introducing path 10, the method which relies on spontaneous drop of the liquid fuel from the fuel storing tank and subsequent introduction of the dropping liquid fuel into the liquid fuel introducing path 10. Though this method necessitates installation of the fuel storing tank at a level higher than the upper surface of the stack 6, it ensures infallible introduction of the liquid fuel into the liquid fuel introducing path 10. As another way of effecting the supply of the liquid fuel, the method which resorts to extraction of the liquid fuel from the fuel storing tank by the capillary attraction of the liquid fuel introducing path 10 may be cited. This method no longer requires the point of contact between the fuel storing tank and the liquid fuel introducing path 10, namely the position of the fuel inlet formed in the liquid fuel introducing path 10, to lie above the upper surface of the stack 6. This method, when used in combination with the aforementioned method of spontaneous drop, for example, brings about the advantage of allowing the fuel tank to be set freely at any desired position.

For the purpose of enabling the liquid fuel introducing path 10 to generate the capillary attraction, the gap (denoted by the letter t in the diagram) forming the liquid fuel introducing path 10 is desired to be in the range of about 0.2 mm to about 5 mm, though variable with the kind of the liquid fuel and the material for the fuel introducing path forming member 11. If the gap t of the liquid fuel introducing path 10 is less than 0.2 mm, the possibility of shortage of supply of the liquid fuel may arise. If the gap exceeds 5 mm, the liquid fuel introducing path 10 may possibly fail to generate the capillary attraction sufficiently. The advantage of the liquid fuel introducing path 10 grows in proportion as the volume thereof decreases in consideration of the fact that during a protracted suspension of the operation of the fuel cell, the liquid fuel stagnating in the liquid fuel introducing path 10 is wasted by diffusion and the vapor arising from the diffusion emits offensive odor. With the enhancement of the capillary attraction in view, it is further desirable to limit the gap t forming the liquid fuel introducing path 10 to 3 mm or below.

For the purpose of enabling the liquid fuel once introduced by the capillary attraction into the liquid fuel introducing path 10 to be continuously supplied smoothly to the fuel electrodes by the capillary attraction, it is important that the capillary attraction exerted on the liquid fuel en route to the fuel electrodes 2 should be greater than that exerted on the liquid fuel en route to the liquid fuel introducing path 10. The liquid fuel introducing path 10 may incorporate therein an insulating porous material or fibers for the purpose of further enhancing the capillary attraction to be exerted on the liquid fuel reaching the path 10. When the capillary attraction is thus enhanced, the gap 6 forming the liquid fuel introducing path 10 may exceed 5 mm. Optionally, in addition to the one liquid fuel introducing path 10 laid along one lateral surface of the stack, another liquid fuel introducing path 10 may be formed on the other lateral surface of the stack 6.

The fuel storing tank mentioned above may be adapted so as to be freely attached to and detached from the cell proper. Thus, alternate use of two such fuel storing tanks permits long continuation of the operation of the fuel cell. For the purpose of enabling the device using the fuel cell to continue its operation even during the replacement of fuel storing tanks, it is necessary that the fuel should remain in the fuel cell at the time that the fuel storing tank is separated from the cell. The fuel storing part which fulfills this requirement is a supply part which interconnects the liquid fuel introducing path 10 and the fuel electrodes 2 or the fuel electrodes 2 themselves with the time spent for the interchange of the fuel storing tanks in view, the amount of the fuel remaining in the fuel cell is desired to be at least enough for keeping the device in operation for at least one minute. The supply of the liquid fuel from the fuel storing tank to the liquid fuel introducing path 10 may rely on the construction of the fuel cell system which causes the spontaneous drop of the fuel or the expulsion of the liquid fuel from the interior of the tank by dint of the inner pressure of the tank. The fuel cell system may be otherwise so constructed as to effect the extraction of the fuel from the tank by dint of the capillary attraction of the liquid fuel introducing path 10. When the spontaneous drop or the inner pressure of the tank is relied on in this case, the outlet gap of the fuel storing tank is not governed by the gap forming the liquid fuel introducing path 10. When the capillary attraction is relied on, the outlet gap of the fuel storing tank is desired to be greater than the gap forming the liquid fuel introducing path 10.

By the method described thus far, the liquid fuel which has been introduced into the liquid fuel introducing path 10 is supplied by the capillary power to the fuel electrodes 2. The capillary attraction which serves the purpose of attracting the liquid fuel toward the fuel electrodes 2 side may be that of the porous member itself which forms the fuel electrodes 2. When this capillary attraction is to be utilized, the liquid fuel can be supplied smoothly even in the lateral direction on the condition that the porous material of which the fuel electrodes 2 are formed should be manufactured so as to contain therein the so-called open pores having a controlled diameter and continuously extending from the lateral surface of the fuel electrode 2 on the liquid fuel introducing path 10 side to at least another surface. When the fuel cell gains in surface area, the amount of the fuel to be supplied will possibly decrease in proportion as the distance from the liquid fuel introducing path 10 increases because the speed of supply of the liquid fuel decreases and the cell reaction proceeds concentrically on the liquid fuel inlet side. In this case, the provision of an additional liquid fuel introducing path 10 on the other lateral surface of the stack which satisfies the aforementioned condition offers an effective countermeasure.

The pore diameter, for example, of the porous material forming the fuel electrodes 2 is not specifically restricted but is only required to be such that the pores will be capable of drawing the liquid fuel from within the liquid fuel introducing path 10. In due consideration of the magnitude of the gap forming the liquid fuel introducing path 10, the pore diameter is desired to be in the range of from about 0.2 $\mu$m to about 300 $\mu$m. The pore volume of the porous material which serves as the index to the continuity of pores in the porous material is desired to be in the range of from about 35% to about 80%. If the pore diameter is smaller than 0.2 $\mu$m, the production of the fuel electrodes 2 is attained only with difficulty. If it exceeds 300 $\mu$m, the capillary attraction decreases excessively. If the volume of pores is less than 35%, the porous material can no longer generate sufficient capillary attraction because the total amount of open pores decreases and that of closed pores increases. If the volume of pores exceeds 80%, the porous material manifests inferior strength and becomes difficult to manufacture in spite of an increase in the total amount of open pores. Practically, the pore diameter is desired to be in the range of from 0.5 $\mu$m to 100 $\mu$m and the volume of pores in the range of from 45% to 75%.

For the purpose of drawing the liquid fuel by the capillary attraction into the fuel electrodes 2, it is desirable to keep open at least one of the lateral surfaces of the fuel electrode 2 except for the lateral surface thereof falling on the liquid fuel introducing path 10 side so that the air entrapped in the fuel electrodes 2 will be expelled by the liquid fuel which has been drawn in as described above. The lateral surfaces of the fuel electrodes 2 except for the lateral surface mentioned above are desired to be kept shielded for the purpose of curbing otherwise inevitable volatilization of the liquid fuel.

Figure 3:
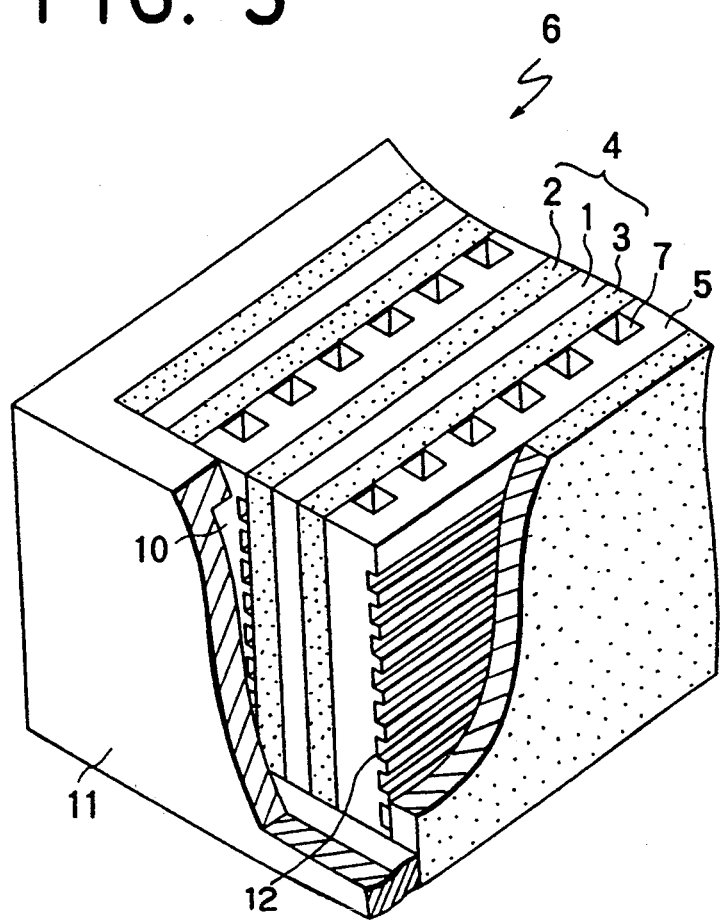
FIG. 3 is a partially cut-away perspective view illustrating the construction of the essential part of another example of the separator-containing fuel cell of this invention.

The capillary attraction to be utilized for drawing the liquid fuel toward the fuel electrode 2 side needs not be limited to the capillary attraction produced exclusively by the porous material forming the fuel electrodes 2. Thus, liquid fuel supplying grooves 12 in the form of a continuous depression may be formed in the horizontal direction (y direction in the diagram) on the surfaces of the combination channels and separators 5 adjoining the fuel electrodes 2 as illustrated in FIG. 3, for example, and the capillary attraction generated by these liquid fuel supplying grooves 12 may be utilized for drawing the liquid fuel toward the fuel electrodes 2 side. In this case, the liquid fuel introducing path 10 is to be formed so as to allow the liquid fuel to contact directly the open terminal parts of the liquid fuel supplying grooves 12.

The shape of the liquid fuel supplying grooves 12 has no particular restriction except for the requirement that it should allow the grooves 12 to manifest the capillary attraction aimed at. It is at least necessary that the capillary attraction generated by the grooves 12 should be smaller than the capillary attraction of the fuel electrodes 2. If the capillary attraction of the grooves 12 is greater than that of the fuel electrodes 2, the liquid fuel in the liquid fuel introducing path 10 can no longer be supplied to the fuel electrodes 2, though it may be supplied to the interiors of the liquid fuel supplying grooves 12. Though the shape of the liquid fuel supplying grooves 12 is variable with the wettability of the material forming the combination channels and separators 5 with the liquid fuel, the width thereof is desired to be in the range of from 0.2 mm to 10 mm.

If the width of the liquid fuel supplying grooves 12 exceeds 10 mm, the capillary attraction generated by the grooves 12 decreases excessively. Thus, the capillary attraction of the fuel electrodes 2 predominates so much as to disrupt the significance of the formation of the liquid fuel supplying grooves 12. Conversely, if the width of the grooves 12 is less than 0.2 mm, the supply of the liquid fuel can no longer keep pace with the progress of the cell reaction, though the capillary attraction may be enhanced. Further, the grooves 12 are not easily cut by a ordinary method. The formation of these grooves 12, therefore, requires adoption of a special method. The depth of the grooves 12 has the same situation as the width thereof. This depth is desired to be in the range of from 0.1 mm to 2 mm. Particularly when the grooves 12 are given an unduly large depth, the combination channels and separators 5 are inevitably required to possess a large wall thickness possibly enough to obstruct miniaturization of the fuel cell. When the liquid fuel remains in a large amount in the grooves 12 after the supply of the fuel has been stopped and the generation of power discontinued, it is wastefully diffused into the ambient air to foul the air with the odor of the emanating vapor. It is more desirable, therefore, to limit the depth of the grooves 12 to 1 mm or less. For the same reason and additionally for the sake of increasing electrical contact, the width of the grooves 12 is desired to be not more than 5 mm, preferably not more than 3 mm.

The liquid fuel supplying grooves 12 mentioned above are intended for drawing the liquid fuel from the liquid fuel introducing path 10 by the capillary attraction generated by the grooves 12. When the liquid fuel is introduced from the fuel storing tank into the liquid fuel introducing path 10 by the capillary attraction generated by the path 10 as described above, the capillary power of the liquid fuel supplying grooves 12 is to be set at a level higher than that of the liquid fuel introducing path 10. Though this difference in capillary attraction is basically fixed by the cross-sectional areas of the liquid fuel introducing path 10 and the liquid fuel supplying grooves 12, the material forming the separators, and the material forming the fuel introducing path forming member 11, it is desired to be obtained by setting at least either of the width and depth of the liquid fuel supplying grooves 12 at a size smaller than the gap t forming the liquid fuel introducing path 10. Thus, the shape of the liquid fuel supplying grooves 12 is to be fixed in due consideration of the shape of the porous material forming the fuel electrodes 2 and that of the liquid fuel introducing path 10. The shape of the liquid fuel supplying grooves 12 must be fixed with due respect also to the shape of the oxidizing gas supplying grooves 7. It is desirable to set the width and depth of the oxidizing gas supplying grooves 7 at magnitudes about 1.1 to 20 times, preferably about 1.2 to 20 times, those of the width and depth of the liquid fuel supplying grooves 12, for example.

The liquid fuel supplying grooves 12 are not always required to be laid horizontally but may be formed as inclined at an angle in the range of from 45 to 90 degrees relative to the vertical direction (z direction). It should be noted, however, that the area available for the formation of the liquid fuel supplying grooves 12 narrows and the fuel supplying path available at all decreases consequently in proportion as the inclination gains in degree. Thus, the angle of this inclination is desired to be not more than 30 degrees. This rule does not apply to the case in which two liquid fuel introducing paths 10 are provided one each on the opposite lateral surfaces of the stack 6.

When the combination channels and separators 5 are provided as described above with the liquid fuel supplying grooves 12 extending in the horizontal direction, for example, the liquid fuel can be supplied from the entire terminal surfaces of the fuel electrodes 2 to the fuel electrodes 2 and, at the same time, the fuel is can be simultaneously supplied through the grooves 12 in the lateral direction of the fuel electrodes 2. As a result, the liquid fuel in the liquid fuel introducing path 10 can be supplied all the more smoothly to the fuel electrodes 2. The cell reaction, therefore, is enabled to proceed uniformly on the entire surface of the electromotive parts 4. Hence, the enhancement of the efficiency of the cell operation is attained. The embodiment described thus far represents the case of forming both the oxidizing gas supplying grooves 7 and the liquid fuel supplying grooves 12 on the combination channels and separators 5. Optionally, channels may be installed separately for the fuel electrodes 2 and the oxidizing electrodes 3. In this case, the separation of the liquid fuel from the oxidizing gas is to be ensured by interposing a conductive plate impervious to gas between the two channels or by stoppering the pores in at least one of the opposite surfaces of channels, for example. For the purpose of decreasing the number of component parts and consequently rendering the miniaturization of the fuel cell all the more practicable, it is desirable to use these electrodes concurrently as channels.

For the sake of effectively drawing the liquid fuel from the liquid fuel introducing path 10 by the capillary attraction, the improvement of the capillary attraction is an important factor. The capillary attraction, as described above, increases in proportion as the capillaries decrease in diameter and the wettability of the capillaries with the liquid fuel increases. From the viewpoint of augmenting the wettability of the capillaries with the liquid fuel, the improvement of the surface of capillary which generates the capillary attraction is effective and the provision of an oxide film for the surface mentioned above is particularly effective. To be specific, the capillary attraction is notably augmented, the speed of drawing the liquid fuel into the fuel cell is increased, and the distance of travel of the liquid fuel is elongated by providing the oxide film for the inner surface of the porous material forming the fuel electrodes 2 and for the inner surface of the liquid fuel supplying grooves 12 formed on the combination channels and separators 5. As a result, the undue largeness of the surface area of the fuel cell can be coped with and the time required for initiating the operation of the fuel cell can be decreased. It is, however, desirable to form the oxide film in such a manner as to avoid lowering the porosity of the porous material. It is important that the oxide film formed on the terminal surfaces of the fuel electrodes 2 adjoined to the liquid fuel introducing path 10 should avoid clogging the entrance for the liquid fuel.

Incidentally, the fuel electrodes 2 are required to conduct the electrons which are generated in consequence of the cell reaction. The oxide film which is formed on the surfaces of the fuel electrodes, therefore, must not obstruct the conduction of electrons mentioned above. When the oxide film to be formed on the fuel electrodes 2 is an insulator, the surfaces of the fuel electrodes 2 adjoined as to the separators 5 and the channels must escape being covered with the oxide film. Even when the oxide film is to be formed inside the liquid fuel supplying grooves 12, the application of the oxide film must be limited to the inner surfaces of the grooves 12.

When the introduction of the liquid fuel to the liquid fuel introducing path 10 is effected by the capillary attraction, the formation of the oxide film on the inner surface of the liquid fuel introducing path 10 is effective.

As means of forming the oxide film, the method which effects oxidation of a metallic surface by elevating the temperature of the metallic surface in an oxidizing atmosphere or in an atmosphere of steam and the method which effects the oxidation by a treatment with such a chemical as alkali may be cited. The removal of the oxide film from a given portion of surface can be accomplished by mechanically grinding or cutting the relevant portion.

Figure 4:
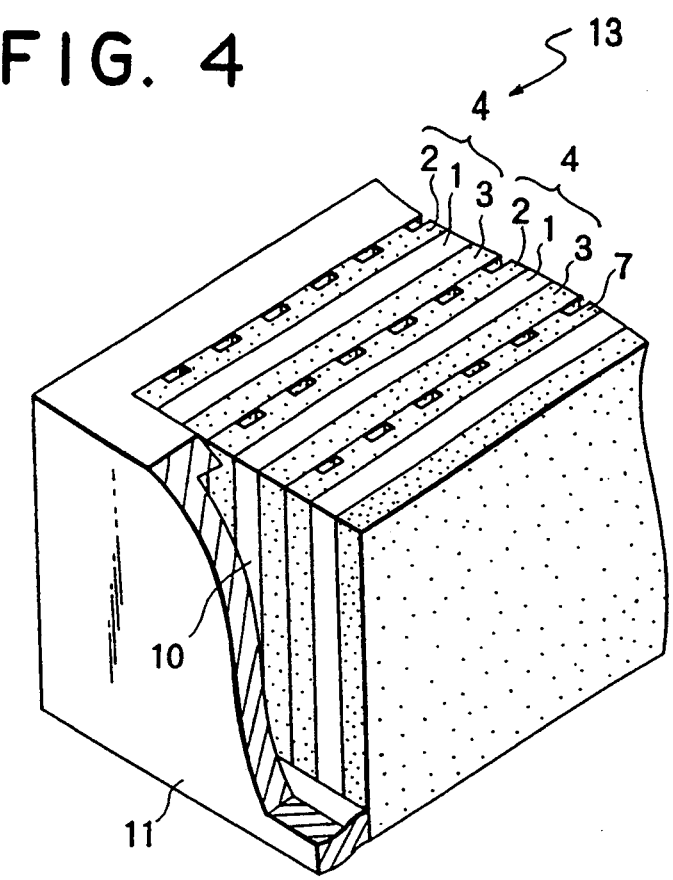
FIG. 4 is a partially cut-away perspective view illustrating the construction of the essential part of a fuel cell omitting a separator as one embodiment of this invention.
Figure 5:
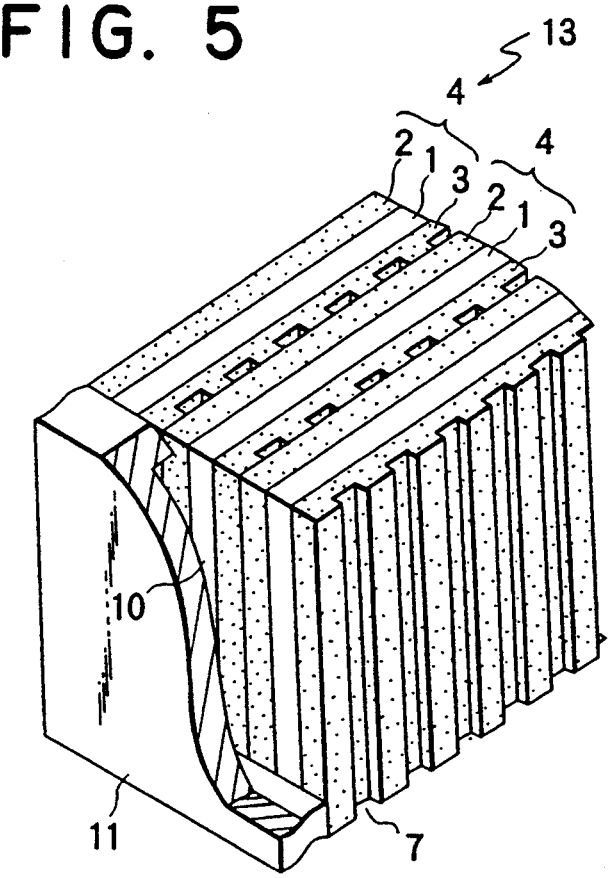
FIG. 5 is a partially cut-away perspective view illustrating the construction of the essential part of another example of the fuel cell omitting a separator according to this invention.
Figure 6:
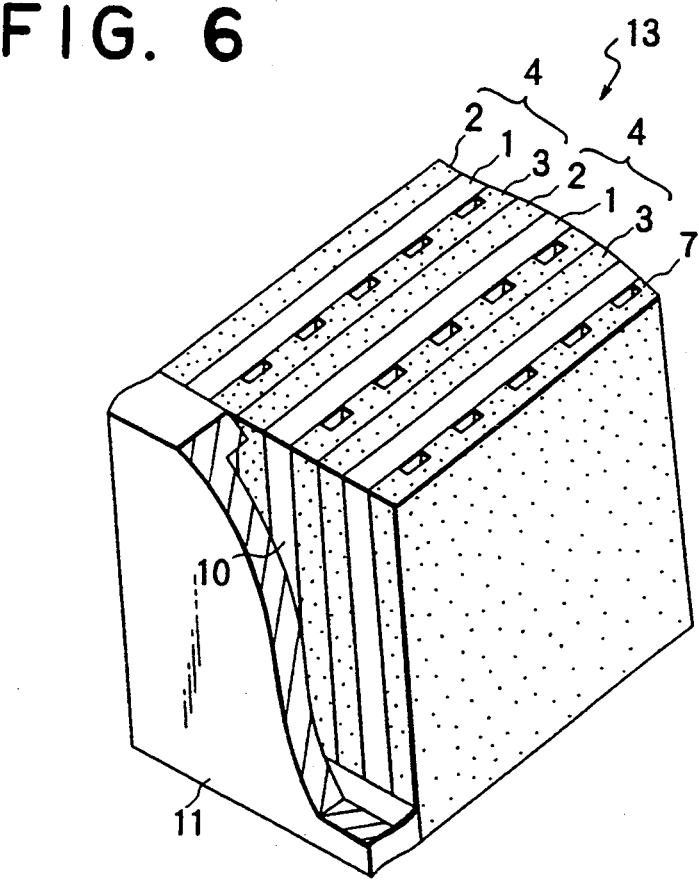
FIG. 6 is a partially cut-away perspective view illustrating the construction of the essential part of another example of the fuel cell omitting a separator according to this invention.

The embodiment described thus far represents the case of forming a fuel cell which is provided with a stack 6 having a plurality of electromotive parts 4 superposed through the medium of a combination channel and separator 5. The fuel cell of this invention does not always require separators or channels. A stack 13 may be formed by having directly superposed a plurality of electromotive parts 4 composed of the fuel electrode 2, the oxidizing electrode 3, and the electrolyte plate 1 nipped by and between the two electrodes as illustrated in FIG. 4. In this case, the oxidizing gas supplying grooves 7 are formed in the shape of a continuous depression in the vertical direction on the surfaces of the fuel electrodes 2 adjoined to the oxidizing electrodes 3 as illustrated in FIG. 4 or in the vertical direction on the surfaces of the oxidizing electrodes 3 adjoined to the fuel electrodes 2 as illustrated in FIG. 5. The oxidizing gas supplying grooves 7 may be otherwise formed on the surfaces of the oxidizing electrodes 3 adjoined to the electrolyte plates 1 as illustrated in FIG. 6. Optionally, the oxidizing gas supplying grooves 7 may not contact the electrolyte plates 1 or the fuel electrodes 2. The oxidizing gas can be made to flow smoothly also by forming the oxidizing gas supplying grooves directly on the fuel electrodes 2 or the oxidizing electrodes 3 as described above. The component parts such as the liquid fuel introducing path 10, for example, other than those described above are constructed similarly to those of the fuel cells of the embodiments described above. The construction described above allows a decrease in the number of component parts of the fuel cell and ensures further miniaturization of the fuel cell.

In the construction in which the fuel electrodes 2 and the oxidizing electrodes 3 directly contact each other as described above, the liquid fuel must be prevented from being drawn from the fuel electrodes 2 into the oxidizing electrodes 3. The reason for this prevention is that the flow of the oxidizing gas is retarded and the cell reaction obstructed when the liquid fuel is drawn into the oxidizing electrodes 3. The invasion of the oxidizing electrodes 3 by the liquid fuel can be prevented basically by controlling the pore diameter of the porous material forming the oxidizing electrodes 3 to a size small enough to avoid drawing the liquid fuel by the phenomenon of capillarity. Depending on the kind of the device for which the fuel cell is used, there are times when the pore diameter mentioned above must be large enough to draw the liquid fuel by the phenomenon of capillarity. In this case, the pores in the oxidizing electrode 3 side surface of the porous material forming the fuel electrodes 2 are to be stoppered, no matter whether the oxidizing gas supplying grooves 7 are formed on the fuel electrodes 2 or on the oxidizing electrodes 3. When the oxidizing gas supplying grooves 7 are formed on the oxidizing electrodes 3, the pores in the fuel electrode 2 side surfaces may be stoppered except for the grooves 7 of the oxidizing electrodes 3. The possibility arises then that the liquid fuel will find its way into the oxidizing electrodes 3 via the lateral surfaces of the oxidizing gas supplying grooves 7. It is desirable in this case to stopper the pores in the surfaces of contact between the oxidizing electrodes 3 and the fuel electrodes 2 and those in the lateral surfaces of the oxidizing gas supplying grooves 7.

As ways of stoppering the pores mentioned above, the method which consists in coating the relevant surfaces with a jelly material incapable of impeding continuity between the fuel electrodes 2 and the oxidizing electrodes 3 or grinding or cutting the relevant surfaces and utilizing the plastic deformation induced in the porous material in consequence of the mechanical treatment and the method which consists in fusing the relevant surfaces by the use of an electron beam or laser and then solidifying the fused surfaces may be cited. When the oxidizing gas supplying grooves 7 are to be formed on the oxidizing electrodes 3, the invasion of the oxidizing electrodes 3 by the liquid fuel can be prevented by interposing a conductive material such as, for example, a metallic plate which is impervious to the liquid fuel between the fuel electrodes 2 and the oxidizing electrodes 3.

The fuel cells of the embodiments thus far described are invariably so constructed as to enable the liquid fuel in the liquid fuel introducing path 10 to contact directly the terminal parts of the oxidizing electrodes 3 made of the porous material and the terminal parts of the electrolyte plates 1. Particularly, the oxidizing electrodes 3 are incapable of supplying a gas to the electrolyte plates 1 unless they are made of the porous material. When the terminal parts of such oxidizing electrodes 3 are exposed directly to the liquid fuel, therefore, the liquid fuel is fated to be drawn into the oxidizing electrodes 3 by the capillary attraction and the liquid fuel so introduced into the oxidizing electrodes 3 is eventually suffered to clog the path for the oxidizing gas. Thus, the entry of the liquid fuel through the terminal parts of the oxidizing electrodes 3 must be prevented.

The prevention of the entry of the liquid fuel into the oxidizing electrodes 3 may be accomplished basically by controlling the pore diameter of the porous material forming the oxidizing electrodes 3 to a size enough to prevent the liquid fuel from being drawn in by the capillary attraction. Depending on the kind of the device for which the fuel cell is used, however, there are times when the pore diameter mentioned above must be large enough to draw the liquid fuel by the capillary attraction. The prevention of the entry of the liquid fuel in this case is carried out, for example, by stoppering the pores in the liquid fuel introducing path 10 side surfaces of the oxidizing electrodes 3 or by covering with a sealing member the surfaces of the oxidizing electrodes 3 adjoining the liquid fuel introducing path 10. As a concrete way of effecting this invention, the method which resides in covering the relevant lateral surfaces with a plate, foil, or membrane of metallic substance, inorganic substance, ceramic substance, or organic substance or coating the lateral surfaces with a slurry containing one member or a mixture of two or more members selected from among the substances enumerated above may be cited. The method utilizing the thermal deformation and the method involving the steps of fusion and solidification are also available.

Figure 7:
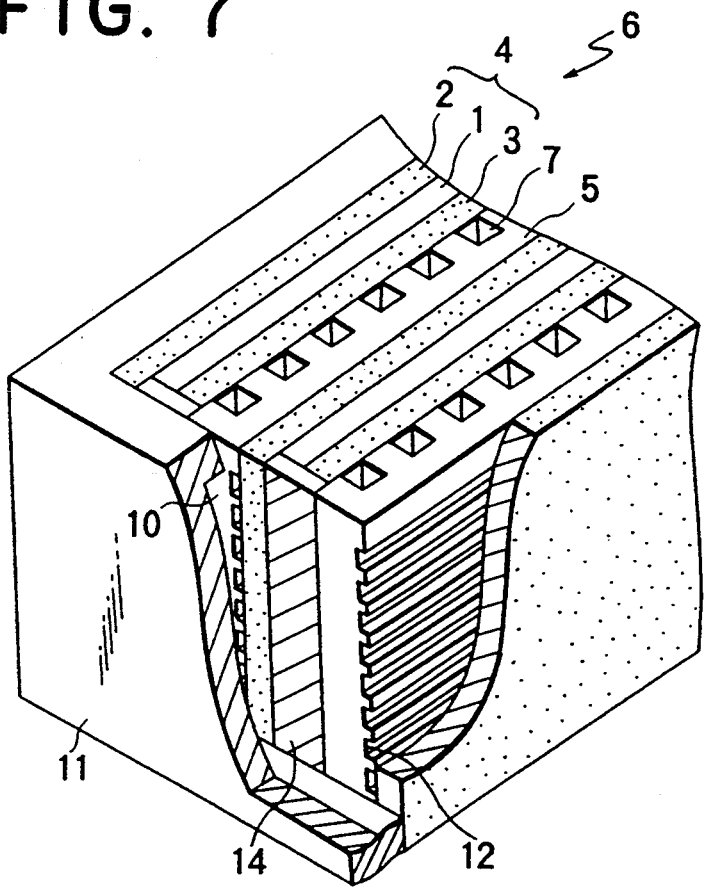
FIG. 7 is a partially cut-away perspective view illustrating the construction of the essential part of a modified example of the fuel cell shown in FIG. 3.

When separators 5 and channels are used in the latter method which comprises covering the lateral surfaces of the oxidizing electrodes 3, the method which consists in nipping a sealing member 14 by and between the fuel electrode 2 and the combination channel and separator 5, for example, thereby allowing the sealing member 14 to be positioned on the lateral surfaces of the oxidizing electrode 3 and the electrolyte plate 1 as illustrated in FIG. 7 may be adopted. In this case, when the sealing member 14 is capable of conducting electrons, the adjacent fuel electrodes 2 are short-circuited and the output aimed at cannot be obtained. Thus, the sealing member 14 must be formed of an insulating material. The sealing member 14 is not always required to be nipped between the fuel electrode 2 and the combination channel and separator 5. Optionally, it may be nipped between the fuel electrodes 2 or exclusively between the lateral surfaces of the oxidizing electrodes 3.

Figure 8:
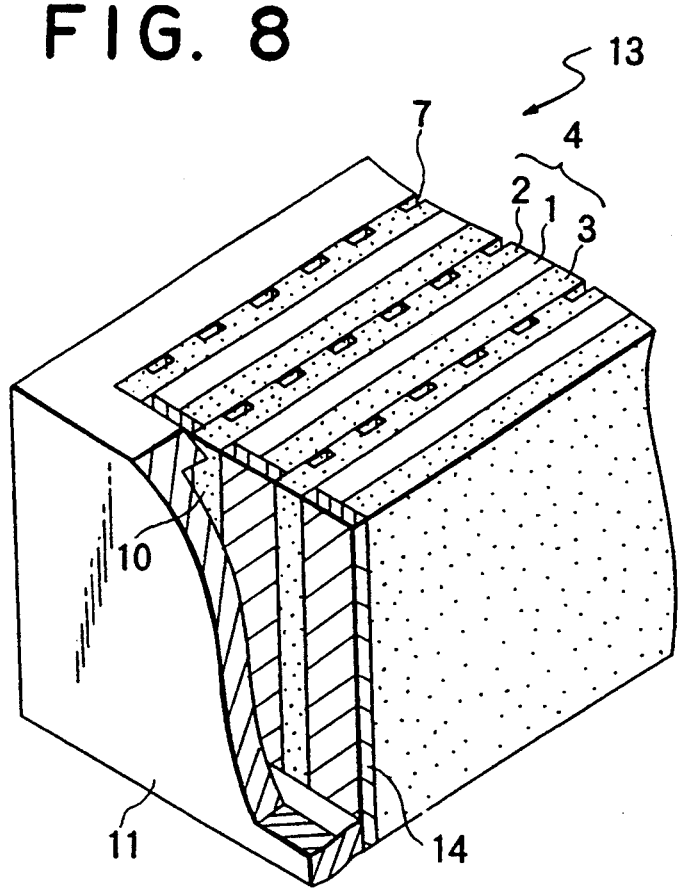
FIG. 8 is a partially cut-away perspective view illustrating the construction of the essential part of a modified example of the fuel cell shown in FIG. 4.

In cases where neither separators nor channels are used, the lateral surfaces of the oxidizing electrodes 3 can be shielded by interposing the same sealing member 14 between the adjacent fuel electrodes 2 as illustrated in FIG. 8. The shielding with the sealing member 14 may be effected exclusively on the lateral surfaces of the oxidizing electrodes 3.

The stack 6 (13) obtained by the superposition of electromotive parts 4 must be clamped to ensure electrical contact between the adjacent electromotive parts 4. When the sealing members 14 to be used herein are made of a material possessing rubbery elasticity, namely when the sealing members 14 which are interposed between the adjacent component parts of the electromotive parts 4 or between the adjacent combination channels and separators 5 (hereinafter referred to as "component parts of the stack") are deformed owing to rubbery elasticity during the clamping of the electromotive parts 4, the electrical contact mentioned above can be obtained infallibly and the effect of sealing the relevant surfaces against the liquid fuel.

When the sealing members to be interposed between the component parts of the stack are made of a rigid material and the rigid sealing members have a smaller thickness than the component parts of the stack to be covered with the sealing members, the relevant surfaces cannot be sealed safely against the liquid fuel because gaps occur between the component parts of the stack and the rigid sealing members. Conversely, when the rigid sealing members have a larger thickness than the component parts of the stack to be covered with the sealing members, the clamping of the stack 6 (13) does not produce the electrical contact aimed at because gaps occur between the adjacent oxidizing electrodes 3 or between the adjacent electrolyte plates 1, for example. Theoretically, the electrical contact and the sealing of relevant surfaces against the liquid fuel are simultaneously satisfied when the two thicknesses mentioned above are equal. Actually, however, it is difficult to obtain exact equalization of the component parts of the electromotive parts 4 in thickness.

When the sealing members 14 to be interposed between the adjacent component parts of the stack are vested with rubbery elasticity, the difference of thickness between the component parts of the stack and the sealing members 14 can be absorbed by the plastic deformation which occurs in the sealing members 14 when the stack 6 (13) is clamped. As a result, the electrical contact and the sealing of the relevant surfaces against the liquid fuel can be infallibly secured. For the sealing members capable of rubbery elasticity, various materials such as raw rubber and fluoro rubber which manifest rubbery elasticity can be used.

Figure 9:
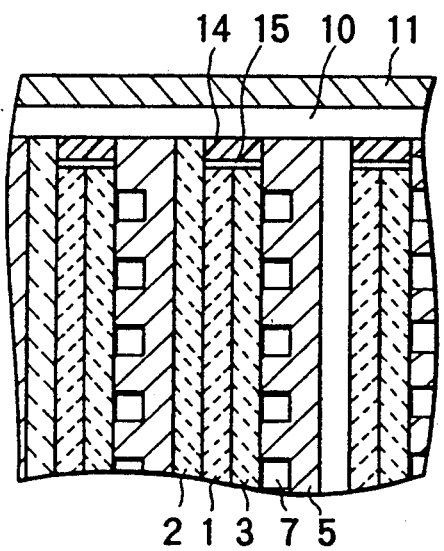
FIG. 9 is a cross section illustrating the construction of the essential part of another modified example of the fuel cell shown in FIG. 7.

When the sealing members 14 are interposed between the adjacent component parts of the stack as described above, the invasion of the oxidizing electrodes 3 by the liquid fuel can be prevented effectively with increased certainty by inserting a gap between the oxidizing electrodes and the sealing members 14 thereby preventing the sealing members 14 from directly contacting the oxidizing electrodes 3 as illustrated in FIG. 9. As a result, the direct invasion of the oxidizing electrodes 3 by the liquid fuel can be avoided even when the liquid fuel accidentally leaks through incompletely sealed portions. For the purpose of further ensuring the prevention of the oxidizing electrodes 3 from the invasion by the liquid fuel, the pores in the lateral surfaces of the oxidizing electrodes ought to be stoppered.

The lateral surfaces of the oxidizing electrodes 3 opposite to the liquid fuel introducing path 10 are not always required to be provided with the sealing members possessing rubbery elasticity but may be sealed with part of an insulating cell storing member which is improvised as a sealing member. In this case, it is desirable to insert gaps at least between the terminal parts of the oxidizing electrodes 3 and the cell storing member from the standpoint of preventing the infiltration of the liquid fuel into the oxidizing electrodes 3.

Figure 10:
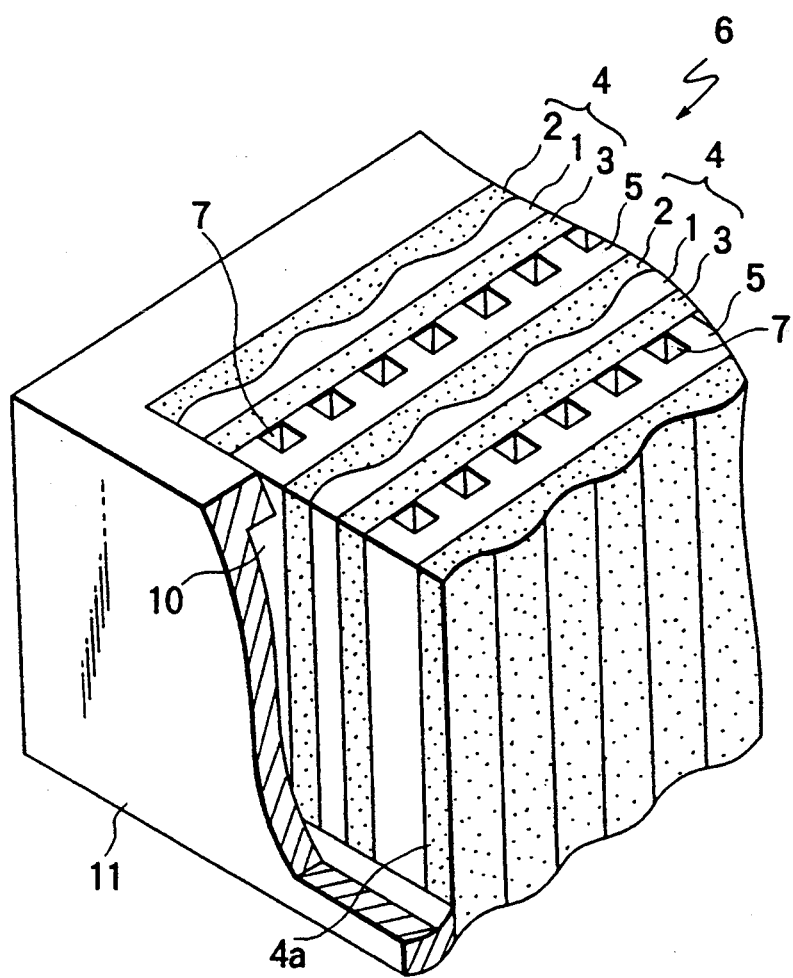
FIG. 10 is a partially cut-away perspective view illustrating the construction of the essential part of a modified example of the fuel cell of this invention.

In FIG. 1 through FIG. 9, the fuel electrodes 2, electrolyte plates 1, and oxidizing electrodes 3 are depicted as held in mutual contact along planes. Optionally, the surfaces of contact may be curved for the purpose of enlarging cell surface areas. FIG. 10 represents a case in which the surfaces of contact of the fuel electrodes 2 and electrolyte plates 1 are in an undulating form. The undulating surfaces are required to exist in at least the surfaces of contact between the fuel electrodes 2 and the electrolyte plates 1 and the surfaces of contact between the oxidizing electrodes 3 and the electrolyte plates 1. From the standpoint of the cell reaction, the surfaces of contact between the fuel electrodes 2 and the electrolyte plates 1 are desired to form such undulating surfaces.

In the fuel cell of this invention, the carbon dioxide which is produced by the reaction of decomposition of the liquid fuel in the fuel electrodes can be discharged with high efficiency by additionally forming grooves in the vertical direction on the surfaces of the fuel electrodes adjoined to the electrolyte plates.

Figure 11:
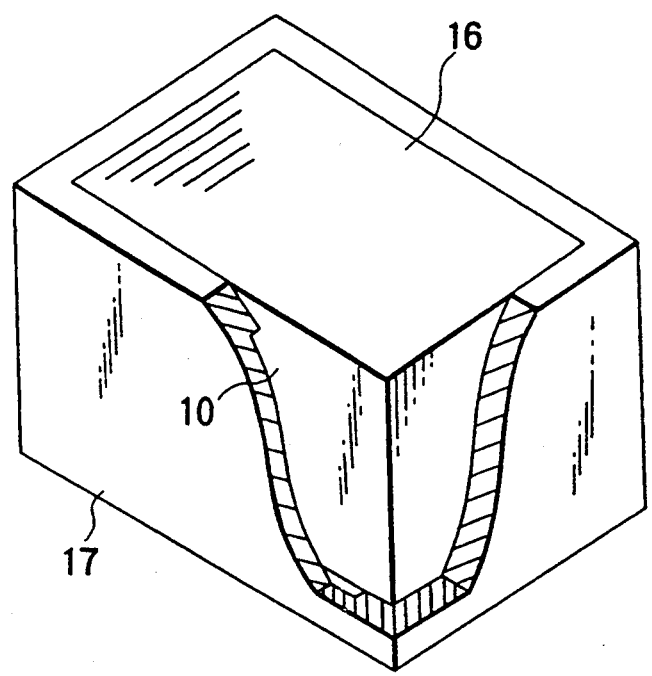
FIG. 11 is a partially cut-away perspective view illustrating a clamping structure for the fuel cell of this invention.

In the fuel cell of this invention, the stack 6 (13) must be clamped so as to secure electrical contact between the adjacent electromotive parts 4. For this clamping, the same method as used on the conventional fuel cell can be adopted. The fuel cell may optionally be so constructed that a stack 16 will be clamped by the use of a cell clamping member 17 made of a material exhibiting an insulating property and possessing rubbery elasticity as illustrated in FIG. 11. The use of this cell clamping member 17 enables the stack 16 to be easily and infallibly clamped.

When the cell clamping member 17 constructed as described above is to be used, the inside dimensions thereof are smaller than the corresponding outside dimensions of the stack 16 so as to allow room for the clamping. The clamping of the stack 16 is effected by spreading the cell clamping member 17, inserting the stack 16 in the spread cell clamping member 17, relieving the cell clamping member 17 of the spreading force, and allowing the resilient force of the material of rubbery elasticity to clamp the stack 16. In this case, the liquid fuel introducing path 10 may be formed in the cell clamping member 17 as illustrated in FIG. 11 or formed as a separate part from the cell clamping member 17.

Incidentally, the cell clamping member 17 which is made of a material exhibiting rubbery elasticity is not used exclusively for a methanol fuel cell illustrated in the embodiments thus far cited but may be used for various fuel cells. The adoption of this cell clamping member 17 is subject to the condition that the maximum temperature tolerated by the material of rubbery elasticity should exceed the working temperature of the fuel cell. Thus, when the cell clamping member 17 uses an ordinary heat-resistant material, it can be applied to various other fuel cells such as, for example, phosphoric acid fuel cells, solid polymer electrolyte fuel cells, alkaline fuel cells, and hydrazine fuel cells, let alone the methanol fuel cells mentioned above. The materials exhibiting rubbery elasticity are not limited to various species of rubber. Springs made of metals may be used instead. The cell clamping members thus obtained can be used on molten carbonate fuel cells and solid oxide fuel cells.

Figure 12:
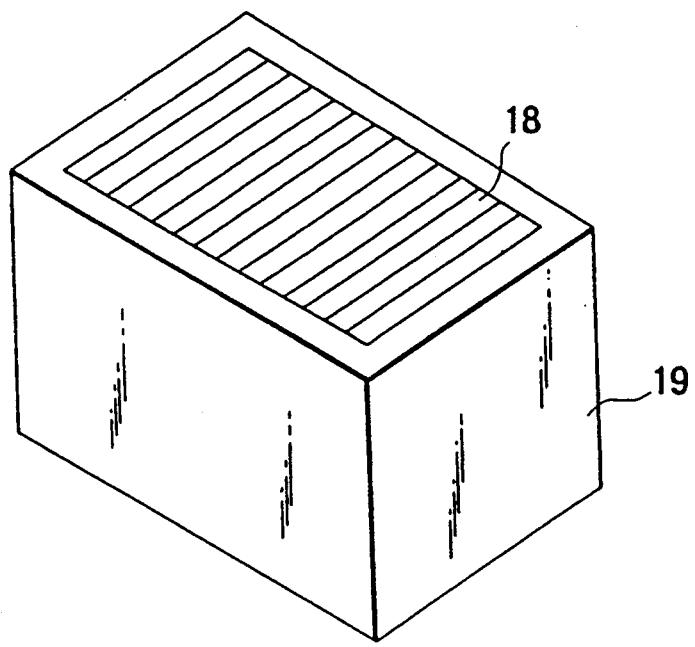
FIG. 12 is a diagram illustrating in the form of a model the construction of a fuel cell provided with the clamping structure of this invention.

When the cell clamping member which is formed of a material exhibiting rubbery elasticity as described above is used for the ordinary fuel cell, a cell clamping member 19 made of a material exhibiting rubbery elasticity is used in the same manner as in the embodiments described above to squeeze the periphery of a stack 18 obtained by superposing optionally through the medium of a separator a plurality of electromotive parts (cell) composed of a fuel electrode, an oxidizing electrode, and an electrolyte plate nipped by and between the two electrodes, and optionally a gas channel as illustrated in FIG. 12.

FIG. 12 represents an example of uniformly clamping the stack 18 on four lateral sides thereof by the use of the cell clamping member 19. The cell clamping member 19 is only required to exert the clamping force on the stack 18 at least in the direction of superposition of the component layers thereof. Since primary object of the operation of clamping the stack 18 resides in improving the mutual contact of the adjacent component parts of the fuel cell and minimizing the electrical resistance arising from the resistance of contact between the adjacent component parts, the clamping force is required only to be exerted on the stack 18 at least in the direction of super-position of the component layers thereof. Thus, a cell clamping part 20 which is provided with a part 20a of rubbery elasticity disposed in the direction of superposition of the component layers of the stack 18 as illustrated in FIG. 13 may be used.

When the peripheral surface of the stack 18 is wholly covered with the material of rubbery elastic as illustrated in FIG. 12, the cell clamping part 19 functions concurrently as a heat insulator. In the case of the cell clamping part 20 which expose part of the lateral surfaces of the stack 18 as illustrated in FIG. 13, the heat generated by the cell reaction can be released through an open part 20b into the ambient air. Devices of this sort can be suitably selected, depending on the mode of use of the fuel cell. In cases where the initial rate of operation of the fuel cell is to be improved or where the heat radiated from the fuel cell produces an adverse effect on the peripheral parts, for example, the cell clamping part 19 which is constructed as illustrated in FIG. 12 is used advantageously. Then in cases where excess accumulation of heat produces an adverse effect on the fuel cell, the cell clamping part 20 which is constructed as illustrated in FIG. 13 is advantageous. When the cell clamping part 19 constructed as illustrated in FIG. 12, a cooling mechanism set in place separately of the fuel cell may be used.

Figure 13:
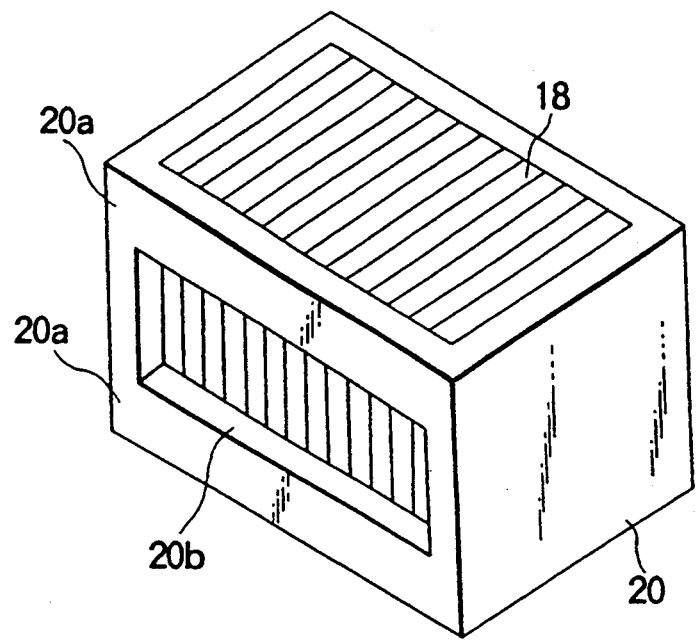
FIG. 13 is a diagram illustrating in the form of a model another example of the clamping structure for the fuel cell according to this invention.
Figure 14:
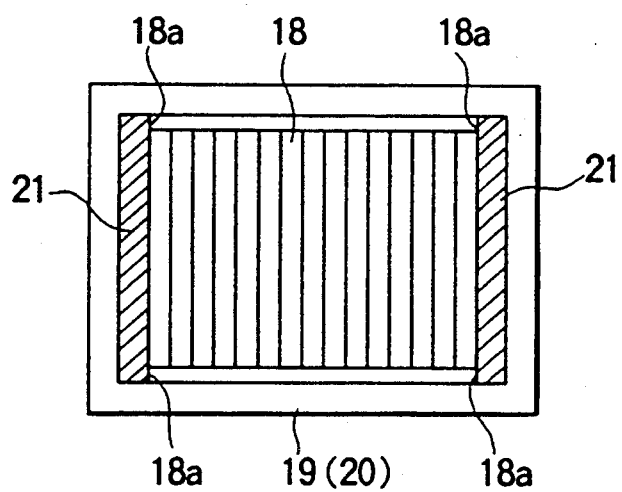
FIG. 14 is a diagram illustrating a modified example of the clamping structure for the fuel cell shown in FIGS. 12 and 13.

When the cell clamping parts 19 and 20 which are illustrated respectively in FIG. 12 and FIG. 13 are used and the clamping force exerted in the directions of the surfaces of the stack 18 is unduly large, the corners of the stack 18 are possibly exposed to excess force and induced to sustain damage. Basically it is necessary to adjust the clamping force in a range incapable of inflicting damage to the corners of the stack by utilizing the force exerted in the directions of the surfaces of the stack 18. It is, therefore, desirable to put the cell clamping parts 19 or 20 to use after the corners of the stack 18 have been covered with a rigid material. Particularly the force exerted on the corners 18a of the stack 18 can be decreased to a substantially ignorable extent by setting rigid members 21 having a larger area than the stack 18 in place against the opposite terminal surfaces of the stack 18 in the direction of superposition of the component layers thereof and enclosing both the stack 18 and the rigid members 21 with the cell clamping part 19 (20) as illustrated in FIG. 14, and putting the cell clamping part 19 (20) to work. When the rigid members are so constructed as to short-circuit the adjacent cells as when the rigid members have a construction such as to enfold the corners of the stack 18, they must be insulated from the stack 18. When the rigid members are intended to fulfill an additional function of a power lead plate, they are desired to be a one-piece conductive plate.

The constructions of the cell clamping parts described thus far are not limited to those illustrated in FIG. 12 and FIG. 13. These cell clamping parts are only required to be constructed so that they will clamp the stack by means of rubbery elasticity at least in the direction of superposition of the component layers of the stack. For example, a cell clamping part may be formed by combining a material of rubbery elasticity and a rigid material as illustrated in FIG. 15 and FIG. 16.

Figure 15:
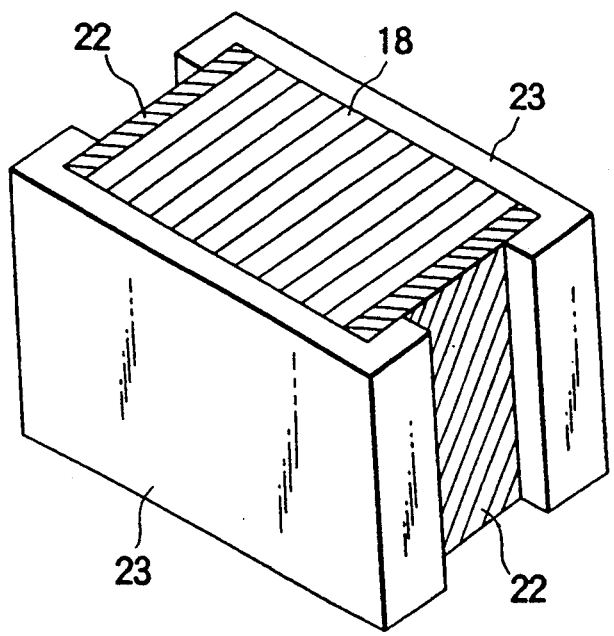
FIG. 15 is a diagram illustrating still another example of the clamping structure for the fuel cell according to this invention.
Figure 16:
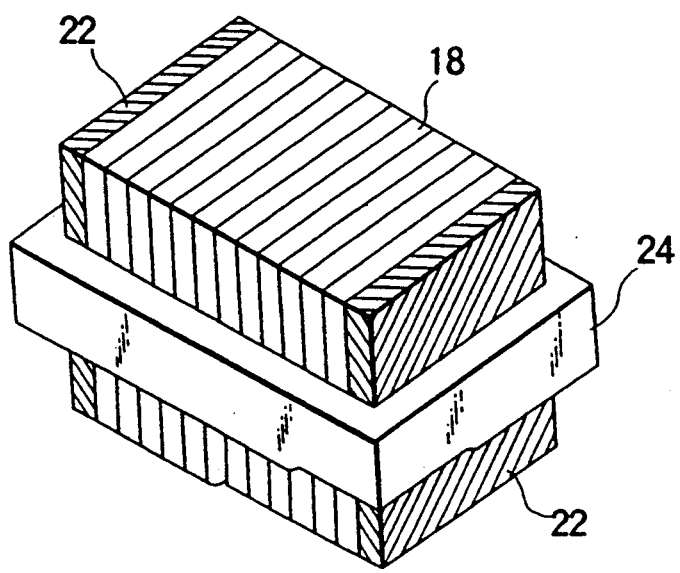
FIG. 16 is a diagram illustrating yet another example of the clamping structure for the fuel cell according to this invention.

FIG. 15 depicts a construction which is obtained by setting rigid members 22 in place one each against the opposite terminal surfaces of the stack in the direction of superposition of the component layers thereof and interconnecting the rigid members 22 with parts 23 of rubbery elasticity disposed to cover the lateral surfaces of the stack 18 and, at the same time, clamp the stack 18 in the direction of superposition of the component layers thereof. FIG. 16 depicts a construction which is obtained by setting rigid members 22 in place one each against the opposite terminal surfaces of the stack 18 in the direction of superposition of the component layers thereof and clamping the periphery of the stack 18 inclusive of the rigid members 22 with a belt-like part 24 of rubbery elasticity. The combination of a material of rubbery elasticity and a rigid material obtained as described above is only required to be such that the stack is clamped by the rubbery elasticity at least in the direction of superposition of the component layers thereof. Numerous variations are conceivable for the combination.

When the stack 18 is so constructed as to use an external manifold, the various cell clamping parts mentioned above may be used in such a manner as to clamp the stack 18 from above the manifold. In this case, part of the cell clamping part can be used concurrently as a manifold as illustrated in FIG. 11.

Figure 17:
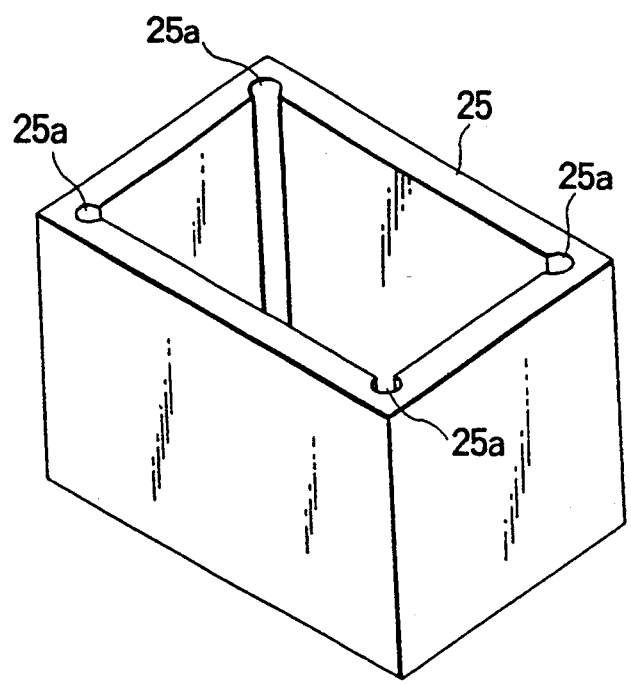
FIG. 17 is a diagram illustrating a modified example of a cell clamping part.

The various cell clamping parts described above, for the purpose of enabling a given stack to be effectively clamped therewith, are required to have inside dimensions smaller than the corresponding outside dimensions of the stack in the direction of superposition of the component layers of the stack. The actual work of clamping must be carried out by temporarily spreading the cell clamping part, inserting the stack into the spread cell clamping part, and thereafter relieving the cell clamping part of the spreading force. In this case, for the purpose of facilitating the work of spreading the cell clamping part and, after the insertion of the stack therein, the work of relieving the cell clamping part of the spreading force, a cell clamping part 25 is desired to be provided in each of the four inner corners thereof with a notch 25a which is intended to allow easy spreading of the cell clamping part 25 as illustrated in FIG. 17. The clamping of the stack can be easily obtained by inserting bars intended for spreading the cell clamping part 25 one each into the notches 25a at the four corners thereby relieving the cell clamping part 25 of the spreading force and thereafter extracting the bars from the corner notches. When the rigid members 21 having a larger surface area than the stack 18 are set in place one each against the opposite lateral surfaces of the stack 18 so as to insert gaps between the cell clamping part 19 and the stack 18 as illustrated in FIG. 14, the gaps can be utilized for facilitating the work of spreading the cell clamping part 19 and the work of relieving the cell clamping part 19 of the spreading force.

As the material of rubbery elasticity to be used for the cell clamping part mentioned above, a varying rubber material can be adopted on the condition that this rubber material should possess an insulating property and an ability to produce a necessary clamping force in the direction of superposition of the component layers of the stack. Raw rubber and fluoro rubber may be cited as apt examples. A rubber material possessing an ability to resist heat, acids, and alkalis can be used, depending on the kind of the fuel cell.

The cell clamping part which clamps the stack at least in the direction of superposition of the component layers of the stack by rubbery elasticity as described above facilitates the work of clamping, permits reduction of the clamping part itself in size and weight, and contributes in a large measure to the miniaturization of the fuel cell as compared with the conventional cell clamping part using bolts. Further, since this cell clamping part permits easy adjustment of the clamping force, it can be easily adapted for various fuel cells.

The fuel cell of this invention is not discriminated on account of the presence or absence of a catalyst layer in the fuel electrodes 2 and the oxidizing electrode 3 as mentioned above. Since the fuel cell is so constructed as to supply the liquid fuel by capillary attraction to the fuel electrodes 2, it is desirable to enhance the efficiency of the reaction of oxidation on the fuel electrodes 2 side and improve the mobility of protons generated in consequence of the oxidation. As a way of fulfilling this requirement, the method which consists in forming a fuel electrode 2 with fuel-oxidizing catalyst beads distributed on a carrier capable of resisting heat and acids after the fashion of clearly separated islands in an ocean and provided at least on the surface of the fuel-oxidizing catalyst thereof with a proton-conducting substance resistant to heat and acids may be cited.

As concrete examples of the fuel-oxidizing catalyst beads mentioned above, (a) fuel-oxidizing catalyst beads distributed on a carrier resistant to heat and acids after the fashion of mutually clearly separated islands in an ocean and coated at least on the surface of the fuel-oxidizing catalyst thereof with a thin proton-conducting film resistant to heat and acids and (b) fuel-oxidizing catalyst beads distributed on a carrier resistant to heat and acids after the fashion of mutually clearly separated islands in an ocean and coated at least on the surface of the fuel-oxidizing catalyst thereof with a thin film having a proton-conducting substance retained therein with a polymer network possessing an ability to resist heat and acids may be cited.

In either of the fuel-oxidizing catalyst beads of (a) and (b) mentioned above, the fuel electrodes 2 are basically formed of a fuel-oxidizing catalyst supported on a porous carrier made of carbon particles or Ti carbide, for example. Specifically, they are formed of a porous material which retains therein with the aid of a hydrophobic resinous binder such as, for example, polytetrafluoroethylene the fuel-oxidizing catalyst beads obtained by depositing the aforementioned fuel-oxidizing catalyst on a carrier. They are constructed so that the fuel-oxidizing catalyst beads are coated with either of the thin films of (a) and (b) mentioned above. The fuel-oxidizing catalysts which answer the description given above are noble metal catalysts using Pt-Ru alloy, Pt-Au alloy, Pt-Sn alloy, Pt-Re alloy, Pt-Mo alloy, and Pt-Ti alloy besides such platinum group metals as Pt and Pd, for example.

Figure 18:
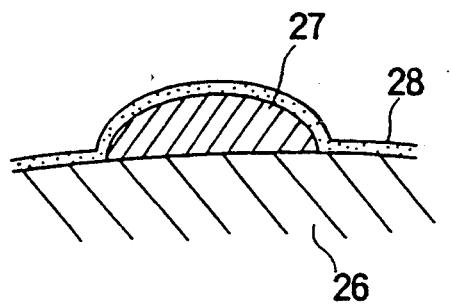
FIG. 18 is a cross section illustrating the construction of the essential part of one example of the fuel-oxidizing catalyst particle in the fuel cell of this invention.

The fuel-oxidizing catalyst beads of (a) mentioned above are obtained by causing a fuel-oxidizing catalyst 27 of the nature described above to be distributed in the form of islands in an ocean on the surface of carrier particles 26 formed of such conductive particles as Carbon particles or Ti carbide particles which possess an ability to resist heat and acids and coating the surface of the fuel-oxidizing catalyst 27 and carrier particles 26 with a thin proton-conducting film 28 resistant to heat and acids as illustrated in FIG. 18. The thin proton-conducting film 28 manifests the effect thereof so long as it coats at least the surface of the fuel-oxidizing catalyst 27. When the thin proton-conducting film 28 is made to coat wholly the surface of the fuel-oxidizing catalyst 27 including the surface of the carrier particles 26 as illustrated in FIG. 18, it can prevent the carrier particles 26 from corrosion and ensure elongation of the service life of the fuel electrodes 2.

The material for the thin proton-conducting film 28 is only required to be capable of resisting heat and acids. The question whether this material is organic or inorganic in category is not relevant. Among other materials available for the film 28, organic ion-exchange resins using as a matrix thereof a fluorine-containing such as, for example, a perfluorocarbon sulfonic acid resin is particularly useful. The thickness of the thin proton-conducting film 28 is desired to be not more than 1 μm. If the thickness is unduly thick, the film may possibly impede the reaction. As a way of coating the surface of the fuel-oxidizing catalyst with the thin proton-conducting film, the method which comprises converting the ion-exchange resin into a solution and applying the resultant solution in the form of a coat to the surface is popular and convenient. Particularly, as a way of forming this film uniformly in an extremely small thickness of not more than 1 μm, the method of electrolytic coating using the ion-exchange resin in the form of a solution proves to be ideal.

Figure 19:
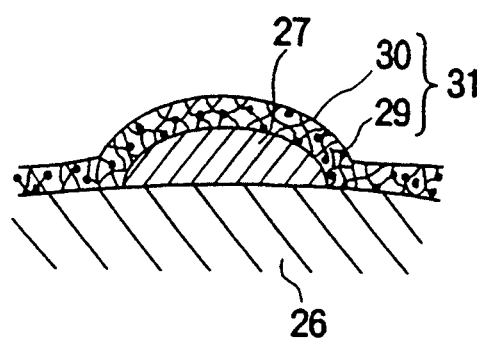
FIG. 19 is a cross section illustrating the construction of the essential part of another example of the fuel-oxidizing catalyst particle in the fuel cell of this invention.

The fuel-oxidizing catalyst beads of (b) mentioned above is obtained by causing the fuel-oxidizing catalyst 27 to be distributed after the fashion of islands in an ocean on the surface of the same carrier particles 26 as used in the fuel-oxidizing catalyst beads of (a) mentioned above and coating both the surface of the fuel-oxidizing catalyst 27 and the surface of the carrier particles 26 with a thin film consisting of a polymer network 29 having an ability to resist heat and acids and a proton-conducting substance 30 retained in the network 29 as illustrated in FIG. 19.

For the polymer network 29 mentioned above, a varying polymer material can be used on the condition that the material should possess an ability to resist heat and acids and, at the same time, exhibit an excellent binding power to the carrier and the fuel-oxidizing catalyst. In consideration of the binding power to be exhibited to the carrier and the fuel-oxidizing catalyst, polyaniline, polypyrrole, and polyphenylene sulfide which are produced by electrolytic polymerization prove to be particularly suitable. For the proton-conducting substance 30 to be retained in the polymer network 29, a varying material can be used on the condition that this material should be capable of resisting heat and acids. For example, monomers and polymers which possess a proton-conducting property are usable. As examples of the proton-conducting monomer, derivatives of such fluorinated sulfonic acids as trifluoromethanesulfonic acid and tetrafluoroethanedisulfonic acid, derivatives of such fluorinated diphosphoric acids as $(HO)_2OP(CF_2)PO(OH)_2$ and $(HO)_2OP(CF_2)PO(OH)_2$, and derivatives of such fluorinated sulfonylic acids as $(CF_3SO_2CH_2SO_2CF_2CF_2)_2$ and $CF_3SO_2NHSO_2C_4F_9$ can be cited. As a proton-conducting polymer possessing similar properties, ion-exchange resins having as a matrix thereof an organic fluorine-containing polymer such as, for example, a perfluorocarbon-sulfonic acid resin can be cited, for example. Specifically, the thin film 31 which is produced by converting Nafion 117 (product of Du Pont) or DOW membrane (product of Dow Chemical) into a solution and causing the polymer particles contained in the resultant solution to be deposited on the polymer network is put to use.

The thin film 31 which has the proton-conducting substance 30 retained therein with the aid of the polymer network 29 is desired to be formed by the method of electrolytic polymerization described above. This method comprises preparing a porous electrode matrix with a carrier supporting the fuel-oxidizing catalyst thereon, placing this porous electrode matrix as one of a pair of electrodes for electrolytic polymerization in an electrolytic bath containing a polymer network material and a proton-conducting substance, and passing an electric current between the electrode mentioned above and a counter electrode thereby inducing the electrolytic polymerization. As a result, the polymer network takes shape while incorporating therein the proton-conducting substance and the electrode matrix incorporates these substances. By the electrolytic polymerization described above, the surface of the fuel-oxidizing catalyst deposited on the carrier is eventually coated with the thin film having the proton-conducting substance retained therein with the aid of the polymer network. In this case, the electrolytic polymerization is desired to be carried out by passing a pulsating electric current. By this electrolytic polymerization, the polymer network retaining the proton-conducting substance can be occluded efficiently in the micropores of the order of $\mu m$ contained in the electrode matrix. Optionally, the proton-conducting substance may be preparatorily added to the electrolyte in the fuel cell and subsequently allowed to be incorporated in the polymer network during the cell reaction. The thickness of the film can be controlled by the amount of the electric current to be passed and it is desired to equal the thickness of the thin proton-conducting film 28 in the fuel-oxidizing catalyst beads of (a) mentioned above.

Figure 20:
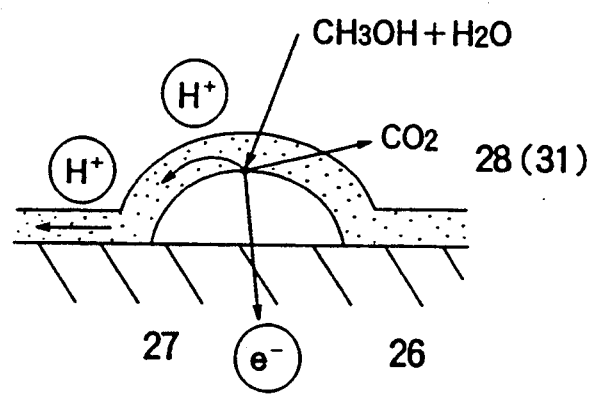
FIG. 20 is a cross section for aiding in the explanation of an electrode reaction in the fuel-oxidizing catalyst to be used in the fuel cell of this invention.

In the fuel cell which uses the fuel electrodes of the sort described above, the thin proton-conducting film 28 resistant to heat and acids or the thin film 31 having the proton-conducting substance retained in the polymer network capable of resisting heat and acids which coat the surface of the fuel-oxidizing catalyst 27 in the fuel electrodes as illustrated in FIG. 20 functions as a path for transfer of the protons (H+) generated by the reaction of oxidation of the liquid fuel. Thus, the thin film enables the liquid fuel drawn into the fuel electrodes by capillary attraction to undergo the reaction with high efficiency and ensures impartation of high quality to the fuel electrodes. Owing to the presence of protons in the thin film 28 or 31 possessing an ability to conduct protons, the conversion of the fuel into a methanol+water system, for example, can be attained. This fact obviates the necessity for paying attention to the ability of the material for the fuel electrodes to resist acids and makes a contribution to lowering the cost of the fuel electrodes. It also improves the properties of the material for the fuel electrodes as to service life. When the thin film 28 or 31 having an ability to conduct protons is a hydrated film represented by Nafion 117, it manifests the ability to catalyze the oxidation of fuel owing to the water-absorbing property even if the fuel (methanol+water or dilute sulfuric acid, for example) is supplied in a gaseous state.

Now, concrete examples of the fuel cell simplified and miniaturized in compliance with the first object of the present invention and the results of evaluation thereof will be described below.

EXAMPLE 1

A liquid fuel cell constructed as illustrated in FIG. 1 was produced by the following procedure. Porous plates measuring 60 mm×50 mm and having an average pore diameter of 20 $\mu m$ were used as fuel electrodes 2, porous plates having equal dimensions and an average pore diameter of 30 $\mu m$ were used as oxidizing electrodes 3, and electrolyte plates 1 were nipped by and between these electrodes. The resultant electromotive parts were superposed in a total of ten layers through the medium of a combination channel and separator 5 of metal plate incorporating therein oxidizing gas supplying grooves 7 having a depth of 0.7 mm and a width of 10 mm to form a stack 6. The pores in the surfaces of the oxidizing electrodes 3 adjoined to the liquid fuel introducing path 10 were closed by grinding the surfaces with an abrasive paper. The liquid fuel introducing path 10 was formed of a gap 1 mm in breadth.

When a mixed solution consisting of methanol and dilute sulfuric acid was introduced as a liquid fuel to the liquid fuel cell obtained as described above, the liquid fuel was supplied to the entire surfaces of the fuel electrodes 2 and air flowed to the oxidizing electrodes 3 smoothly and, consequently, the cell reaction proceeded ideally.

A fuel cell was produced by repeating the procedure described above, excepting the porous pieces destined to form fuel electrodes 2 were provided on the inner surfaces thereof with an oxide film. In this fuel cell, the supply of the liquid fuel proceeded more smoothly and the cell reaction more efficiently.

The following test was carried out for the purpose of evaluating the improvement of capillary attraction owing to the formation of the oxide film. Two copper plates having an oxide film formed on the surfaces thereof were opposed across a gap of 1 mm to produce a model fuel introducing path. This model fuel introducing path was immersed in methanol and tested in comparison with a model fuel introducing path produced with copper plates provided with no oxide film. The comparison revealed that the height of rise of methanol in the model path using the copper plates provided with the oxide film was about 5 times that in the model path using the copper plates provided with no oxide film and that the time required for the rise of methanol to reach a fixed distance in the former model path was about ⅛ times that of the latter model path. Then, two sample plates were obtained from porous nickel material having an average pore diameter of 20 $\mu m$; one sample plate had undergone a surface treatment comprising the steps of coating the inner surface of plate with an oxide film and removing by grinding the oxide film from the surfaces of plate except for the lateral surfaces and the other sample plate had not undergone the surface treatment. They were immersed in methanol and tested to determine the height of rise of methanol in the sample plate and the time required by the rise of methanol in the sample plate to reach a height of 10 mm in the plate. The comparison revealed that in the sample plate provided with the oxide film, the height of rise of methanol was about 3 times and the time as the index to the rate of rise of methanol was about 1/5 times respectively those found in the sample plate provided with no oxide film. From the test results given above, it is noted that the formation of the oxide film was effective in improving the capillary attraction. Further, a liquid fuel cell was produced by following the procedure adopted for the production of the liquid fuel cell mentioned above, excepting a sealing member 14 made of Teflon rubber and having a thickness of 5 mm was interposed between the adjacent fuel electrodes 2 as illustrated in FIG. 9 and a cell clamping member 17 made of rubber and used in clamping the stack 6 (16) as illustrated in FIG. 11. When the liquid fuel was supplied in the same manner to this liquid fuel cell, the liquid fuel failed to permeate in the oxidizing electrodes 3, indicating that the sealing member 14 manifested the effect of its own. The component parts of the stack did not loosen, establishing the usefulness of the cell clamping member 17.

EXAMPLE 2

The same liquid fuel cell as used in Example 1 (the fuel cell illustrated in FIG. 3) was produced by following the procedure of Example 1, excepting liquid fuel supplying grooves 12 measuring 0.5 mm in depth and 0.5 mm in width were provided on the fuel electrode side surfaces of combination channels and separators 5. When the same liquid fuel was introduced to the liquid fuel cell, this liquid fuel was smoothly supplied to the entire surfaces of the fuel electrodes 2 and the cell reaction was allowed to proceed satisfactorily.

EXAMPLE 3

A liquid fuel cell constructed as illustrated in FIG. 4 was produced by the following procedure. First, oxidizing gas supplying grooves 7 measuring 0.7 mm in depth and 10 mm in width were formed in porous plates having an average pore diameter of 20 $\mu$m and measuring 60 mm$\times$50 mm and the pores in the groove-containing surfaces of the plates were ground with an abrasive paper to produce fuel electrodes 2. Porous plates having an average pore diameter of 30 $\mu$m and the same dimensions as mentioned above were prepared and the pores in one lateral side surfaces of the plates were stoppered by grinding with an abrasive paper to produce oxidizing electrodes 3. Electrolyte plates 1 were nipped one each by and between the fuel electrodes 2 and the oxidizing electrodes 3. A stack 13 was produced by superposing the resultant electromotive parts in a total of ten layers. A liquid fuel introducing path 10 was formed with a gap of 1.5 mm.

When a mixed solution of methanol and dilute sulfuric acid was introduced as a liquid fuel to the liquid fuel cell, the liquid fuel was supplied to the entire surfaces of the fuel electrodes 2, air flowed smoothly, and the cell reaction proceeded satisfactorily.

When the oxide film and the sealing member 14 were tested for their respective effects in the same manner as in Example 1, the results were as satisfactory as those in Example 1. When the same liquid fuel cell as used in Example 1 (the fuel cell illustrated in FIG. 5) was produced by forming oxidizing gas supplying grooves 7 in the oxidizing electrodes 3, the results were as satisfactory as those in Example 1.

Now, concrete examples of the fuel-oxidizing catalyst contemplated by this invention and the results of test performed thereon will be described below.

EXAMPLE 4

As a raw material for a fuel-oxidizing catalyst, a heat-treated conductive carbon black having a specific surface area of 100 m$^2$/g (product of Cabot Corp. marketed under trademark designation of "Vulcan XC-72R") and having a platinum catalyst deposited in a ratio of 20% by weight thereon was prepared. On the surface of this raw material for fuel-oxidizing catalyst, a thin proton-conducting film about 1 $\mu$m in thickness was formed with a dilute Nafion solution (about 0.01% by weight in concentration) which was obtained by converting Nafion 117, a species of perfluorocarbon sulfonic acid resin (proprietary product of Du Pont), into a Nafion solution (containing Nafion at a concentration of about 5% by weight in a mixed solution of a lower alcohol and water) and subjecting this Nafion solution to dialysis (hereinafter referred to as "modified catalyst").

The modified catalyst mentioned above was dispersed by means of ultrasonic waves in an aqueous suspension of polytetrafluoroethylene (product of Du Pont marketed under product code of "TFE-30"). This mixed suspension was caused by addition of aluminum trichloride to induce precipitation of floccule. The floccular mixture containing the modified catalyst (70% by dry weight basis) and polytetrafluoroethylene was deposited on carbon paper, pressed, dried, and then fired in nitrogen at 300° C. for 20 minutes to produce an electrode. The produced electrode was adjusted so as to contain 1.5 mg of platinum per unit surface area of electrode (1 cm$^2$).

The fuel electrode thus produced was tested for half cell property of fuel electrode at 60° C. by using as a liquid fuel therefor an aqueous solution incorporating 1 mol of sulfuric acid and 1 mol of methanol. As a result, it was found to excel in polarization characteristic and manifest high quality as evinced by the fact that the limiting current density thereof was 100 mA/cm$^2$.

COMPARATIVE EXPERIMENT 1

The same fuel electrode as produced in Example 4 was obtained by using the same raw material for a fuel-oxidizing catalyst as obtained in Example 4 by following the procedure of Example 4, excepting the deposition of the proton-conducting film on the raw material was omitted. When the fuel electrode was tested for half cell property in the same manner as in Example 4, it was found to possess a limiting current density of 60 mA/cm$^2$.

EXAMPLE 5

The same raw material for a fuel-oxidizing catalyst as used in Example 4 was prepared and dispersed by means of ultrasonic waves in an aqueous suspension of polytetrafluoroethylene (product of Du Pont marketed under product code of "TFE-30"). Then, the resultant mixed suspension was caused by addition of aluminum trichloride to induce precipitation of a floccule. The resultant flocculent mixture containing the raw material for a catalyst (70% by dry weight basis) and polytetrafluoroethylene was deposited on carbon paper, pressed, dried, and fired in nitrogen at 300° C. for 20 minutes to produce an electrode matrix.

Then, electrolytic polymerization was carried out by the following procedure using the electrode matrix to form on the surface of the catalyst a thin film having a proton-conducting monomer retained in a polymer network. In the polymerization, polyaniline was used as the polymer network and trifluoromethane-sulfonic acid as the proton-conducting monomer. First, in an electrolytic tank containing as a medium for electrolytic polymerization a mixed solution consisting of 1 mol of aniline per liter and 2 mols of trifluoromethanesulfonic acid per liter, a counter electrode and the aforementioned electrode matrix as a working electrode were placed as opposed to each other. With the temperature of the medium of electrolytic polymerization kept at 0° C., the electrolytic polymerization was carried out by passing a fixed current of 2 mA/cm$^2$ for five minutes and further passing a fixed current of 20 mA/cm$^2$ for 10 minutes. As a result, a thin film having trifluoromethanesulfonic acid retained in the polyaniline network was deposited on the surface of the catalyst to give rise to a fuel electrode.

EXAMPLE 6

A thin film using the same electrode matrix as obtained in Example 5 and having a proton-conducting polymer in the place of the proton-conducting monomer of Example 5 retained in a polymer network was deposited on the surface of the catalyst by the same electrolytic polymerization as performed in Example 5. In this polymerization, polyaniline was used as the polymer network and Nafion 117 (proprietary product of Du Pont) as the proton-conducting polymer. The electrolytic polymerization was carried out under the same conditions as those of Example 5, excepting the trifluoromethanesulfonic acid was changed to Nafion 117. Thus, a thin film having Nafion 117 retained in the polyaniline network was deposited on the surface of the catalyst to give rise to a fuel electrode.

The electrodes obtained in Example 5 and Example 6 were tested for half cell property in the same manner as in Example 4. They were both found to excel in polarization characteristic and manifest satisfactory quality as evinced by the fact that the former fuel electrode possessed a limiting current density of 102 mA/cm$^2$ and the latter fuel electrode a limiting current density of 95 mA/cm$^2$.

EXAMPLE 7

An electrolytic polymerization was carried out by following the procedure indicated below using the same electrode matrix as produced in Example 5. The materials for the polymer network and the proton-conducting monomer were the same as those used in Example 5. First, in an electrolytic tank containing as the medium for electrolytic polymerization a mixed solution containing 1 mol of aniline per liter and 2 mols of borofluoric acid per liter, a counter electrode and the aforementioned electrode matrix as a working electrode were placed as opposed to each other. The electrolytic polymerization was carried out under the same conditions as used in Example 5. Thus, a polyaniline network film was deposited on the surface of the catalyst.

The fuel electrode obtained as described above was tested for half cell property of fuel electrode at 60° C. by using as a liquid fuel the product obtained by preparing an aqueous solution containing 1 mol of sulfuric acid and 1 mol of methanol and adding to the aqueous solution 1% by volume of trifluoromethane-sulfonic acid.

EXAMPLE 8

The same electrode as produced in Example 7 was tested for half cell property of fuel electrode at 60° C. by using as the liquid fuel what was produced by preparing an aqueous solution containing 1 mol of sulfuric acid and 1 mol of methanol and adding to the aqueous solution 1% by volume of Nafion 117.

By the test, the electrodes of Example 7 and Example 8 were both found to excel in polarization characteristic and manifest satisfactory quality as evinced by the fact that the former electrode possessed a limiting current density of 98 mA/cm$^2$ and the latter electrode a limiting current density of 93 mA/cm$^2$.

EXAMPLE 9

A thin film having a proton-conducting monomer retained in a polymer network was deposited on the surface of the catalyst by using the same electrolytic matrix as obtained in Example 5 and carrying out electrolytic polymerization in accordance with the procedure of Example 5, excepting a rectangular pulse current was adopted instead. In the polymerization, polyaniline was used as the polymer network and trifluoromethanesulfonic acid as the proton-conducting monomer. First, in an electrolytic tank containing as the medium for electrolytic polymerization a mixed solution containing 1 mol of aniline per liter and 2 mols of trifluoromethanesulfonic acid, a counter electrode and the aforementioned electrode matrix as a working electrode were placed as opposed to each other. With the temperature of the medium for electrolytic polymerization kept at 0° C., pulse electrolytic polymerization was carried out by using a rectangular pulse current passed at a rate of 5 m coulombs/cm$^2$. The polymerization was performed under the conditions of 5 mA/cm$^2$ of current density, 5 msec of pulse-on time, and 20 msec of pulse-off time (duty cycle: 0.2). Thus, a thin film having trifluoromethanesulfonic acid retained in the polyaniline network was deposited on the surface of the catalyst to give rise to a fuel electrode.

EXAMPLE 10

A thin film using the same electrode matrix as prepared in Example 5 and having a proton-conducting polymer in the place of the proton-conducting monomer of Example 9 retained in a polymer network was deposited on the surface of the catalyst by carrying out the same electrolytic polymerization as performed in Example 9. In the polymerization, polyaniline was used as the polymer network and Nafion 117 (proprietary product of Du Pont) as the proton-conducting polymer. The electrolytic polymerization was carried out under the same conditions as adopted in Example 9, excepting the trifluoromethanesulfonic acid was changed to Nafion 117. Thus, a thin film having Nafion 117 retained in the polyaniline network was deposited on the surface of the catalyst to give rise to a fuel electrode.

When the electrodes obtained in Example 9 and Example 10 were tested for half cell property of fuel electrode, they were both found to excel in polarization characteristic and manifest highly satisfactory quality as evinced by the fact that the former electrode possessed a limiting current density of 105 mA/cm$^2$ and the latter electrode a limiting current density of 103 mA/cm$^2$.

EXAMPLE 11

Electrolytic polymerization was carried out by the following procedure using the same electrode matrix as produced in Example 5. The materials for the polymer network and the proton-conducting monomer used in the polymerization were the same as those adopted in Example 9. First, in an electrolytic tank containing as the medium of electrolytic polymerization a mixed solution containing 1 mol of aniline per liter and 2 mols of borofluoric acid per liter, a counter electrode and the aforementioned electrode matrix as a working electrode were placed as opposed to each other. Electrolytic polymerization was carried out under the same conditions as those used in Example 9. Thus, a polyaniline network film was deposited on the surface of the catalyst.

The electrode obtained as described above was tested for half cell property at 60° C. by using as the liquid fuel what was obtained by preparing an aqueous solution containing 1 mol of sulfuric acid and 1 mol of methanol and adding to the aqueous solution 1% by volume of trifluoromethanesulfonic acid. The results of the test were substantially equal to those obtained in Example 7.

EXAMPLE 12

The same electrode as produced in Example 11 was tested for half cell property at 60° C. by using as the liquid fuel what was obtained by preparing an aqueous solution containing 1 mol of sulfuric acid and 1 mol of methanol and adding to the aqueous solution 1% by volume of Nafion 117. The results were virtually the same as those of Example 8.

As described thus far, the fuel cell of this invention permits smooth supply of a liquid fuel and an oxidizing gas without use of a pump or a blower. Thus, this invention attains simplification of both system and construction of the fuel cell and allows manufacture of a miniaturized fuel cell which has been heretofore regarded as a remote possibility.

Now, embodiments of this invention regarding the discharge of the water produced in consequence of the operation of the fuel cell, i.e. for the fulfillment of the second object of this invention will be described below.

One example of the miniaturized fuel cell which fits the present invention will be described with reference to the annexed drawings.

Figure 21:
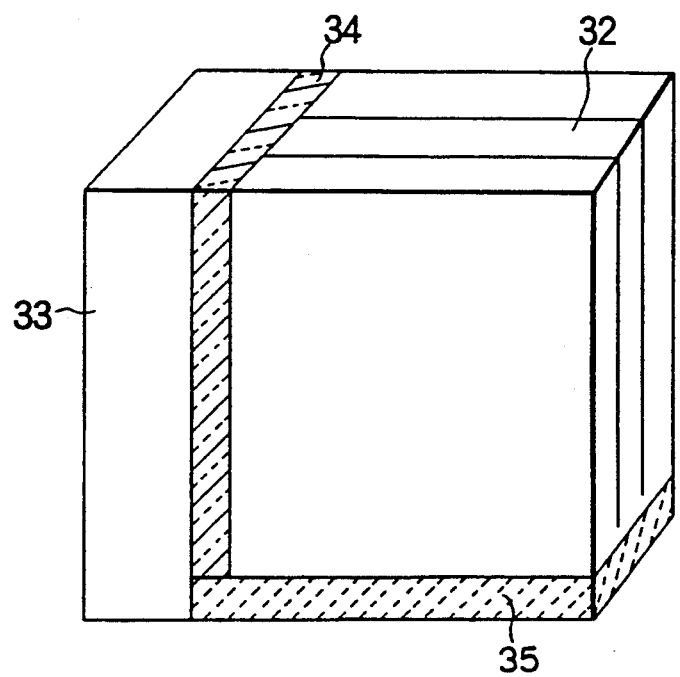
FIG. 21 is a perspective view illustrating the construction of a miniaturized fuel cell of this invention containing a mechanism for the recovery of water.

FIG. 21 is a perspective view illustrating one example of the construction of the miniaturized fuel cell. Basically, this fuel cell comprises a fuel cell proper 32, a fuel cartridge 33, a fuel diffusion chamber 34, and a water recovery chamber 35 for facilitating the recovery and diffusion of the produced water. The construction will be described in detail below.

Figure 22:
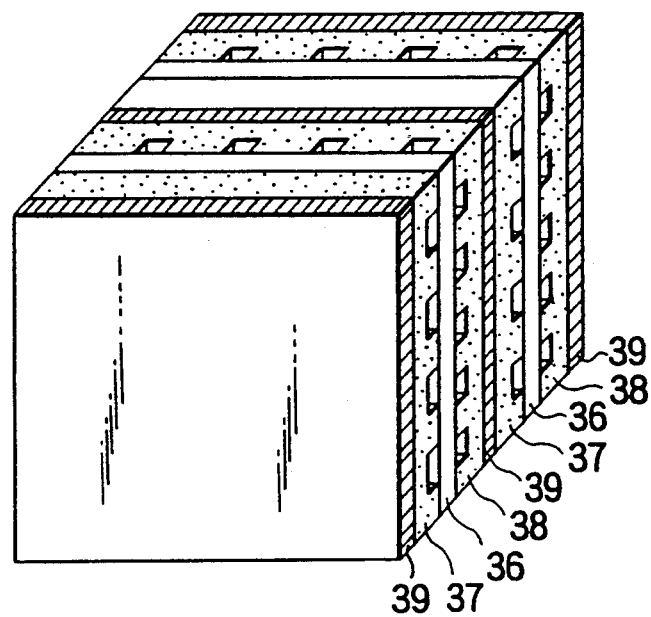
FIG. 22 is a perspective view of the main body of a fuel cell to be used in the miniaturized fuel cell of FIG. 21.

FIG. 22 is a perspective view of the fuel cell proper 32. The fuel cell proper 32 is constructed by superposing a plurality of such electromotive parts of the fuel cell as illustrated in FIG. 22. As illustrated in FIG. 22, the fuel cell proper 32 is constructed by superposing a plurality of electromotive parts which are composed of an electrolyte 36, a fuel electrode 37, and an oxidizing electrode 38 and severally separated by an interposed separator 39.

The oxidizing electrode 38 is made of a porous material for the purpose of absorbing the water to be produced by the cell reaction. The fuel electrode 37 has a porous texture so as to permit supply of the fuel without use of any extra motive power. The fact that the liquid fuel such as methanol is supplied effectively by the phenomenon of capillarity favors miniaturization of a fuel cell.

The water recovery chamber 35 shown in FIG. 21 is a site for facilitating the recovery of the produced water. A porous material (water-recovering wick) is placed in this chamber 35.

The water-recovering wick is disposed so as to touch the oxidizing electrode 38. The water-recovering wick has a smaller average pore diameter than the oxidizing electrode.

Figure 23:
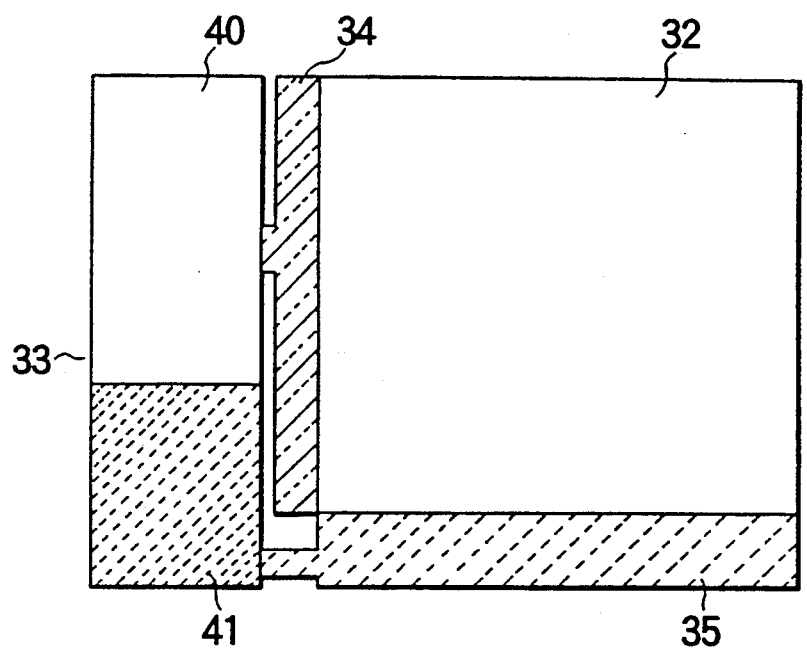
FIG. 23 is a cross section illustrating the construction of the miniaturized fuel cell of FIG. 21.

The fuel is supplied by the use of the fuel cartridge 33. FIG. 23 is a cross section of the fuel cell illustrated in FIG. 21. The cartridge 33 is divided into two chambers, i.e. a fuel-storing space 40 and a water-storing space 41 which are capable of admitting the fuel (containing water in a required portion) and the water produced from the fuel cell proper. The interior of the water-storing space 41 is filled in advance with a porous material made of inorganic or organic fibers, for example. When the fuel cartridge is set in place in the system, the wick in the water recovery chamber 35 comes into contact with a water-retaining wick contained in the water-storing space 41 of the fuel cartridge. The water-retaining wick is made of a porous material having a smaller average pore diameter than the aforementioned water-recovering wick.

Owing to the construction of this nature, the produced water is finally recovered in the fuel cartridge 33. The water recovery chamber 35 is not required to exist by itself but may be formed within the construction of the fuel cell proper. Even in this case, the water-recovering wick must be placed inside the water recovery chamber 35.

As respects the supply of the fuel, when the supply is effected by the phenomenon of capillarity, the fuel cell is desired to be constructed as follows. The fuel diffusion chamber 34 is disposed on the fuel inlet side surface of the fuel cell proper and it is filled in advance with a wick made of organic or inorganic fibers. The wick remains in contact with the fuel inlet side surface of the fuel electrode. The fuel supplied from the fuel cartridge is supplied to the wick in the fuel diffusion chamber 34 and then dispensed thence to the fuel electrodes by capillary attraction. The fuel diffusion chamber 34 is not always required to be present separately of the fuel cell proper but may be formed within the construction of the fuel cell proper. The presence of the fuel-diffusing wick is not always dispensable, for the fuel in the liquid state maybe supplied directly to the fuel inlet side surface of the fuel cell proper.

The fuel cartridge mentioned above is desired to be so constructed as to be freely attached to and detached from the fuel cell proper. When the fuel cartridge of this construction is attached to the fuel cell proper, the fuel-storing space and the fuel-diffusing wicks of the fuel diffusion chamber contact each other to allow supply of the fuel and, at the same time, the water-recovering wick of the water recovery chamber and the water-retaining wick of the water-storing space come into mutual contact. Conversely, when the fuel cartridge is detached from the fuel cell proper, the contacts mentioned above are broken and the fuel cartridge side is cut off from the side embracing the fuel diffusion chamber and the water recovery chamber and they are isolated from the ambience.

The porous materials (wick) to be used for the supply of the fuel and the recovery of water in the manner described above are enabled to attract the relevant liquids by capillary attraction. In this case, the liquids are enabled to flow smoothly by disposing the porous materials in such a manner that the magnitude of average pore diameter gradually decreases in the direction of flow of the liquids. The decrease in the average pore diameter results in an increase in the force with which the liquids are drawn by the capillary attraction. By disposing the porous materials continuously thereby enabling the average pore diameters of the respective porous materials to decrease gradually, therefore, the liquids are allowed to flow smoothly in the direction of decrease of the average pore diameter.

As regards the path for supply of the fuel in this case, the fuel-diffusing wick (made of inorganic or organic fibers) has an average pore diameter of about 100 μm and the fuel electrodes (porous material of such metal as nickel) have an average pore diameter of about 30 μm. As respects the path for recovery of water, the oxidizing electrodes (porous material of such a metal as nickel) have an average pore diameter of about 50 μm and the water-recovering wick (made of inorganic or organic fibers) has an average pore diameter of about 30 μm, with the result that the relevant liquids are allowed to flow smoothly in the due directions. The average pore diameters of these wicks are properly varied to suit the properties of the fuel cell to be produced.

Further, the porous materials are desired to be so disposed that the porosities thereof will gradually increase in the directions of flow of the relevant liquids. The increase in the porosity allows an increase of the volume of liquid to be retained in the porous material and an increase of the speed of flow of the liquid. For a porous material, the factors of average pore diameter (D), specific surface area (Sp), and porosity (E) bear the following relation.

$$D = (1/Sp) \cdot [4E/(1-E)]$$

It is necessary that the specific surface area and porosity of the porous material should be selected so as to satisfy the formula of relation given above.

The examples of construction of the fuel cell described thus far presume miniaturized fuel cells which cause the water from the oxidizing electrodes to be recovered in the water-storing space formed in the fuel cartridge. Optionally, the recovered water may be diffused in the ambient air.

Figure 24:
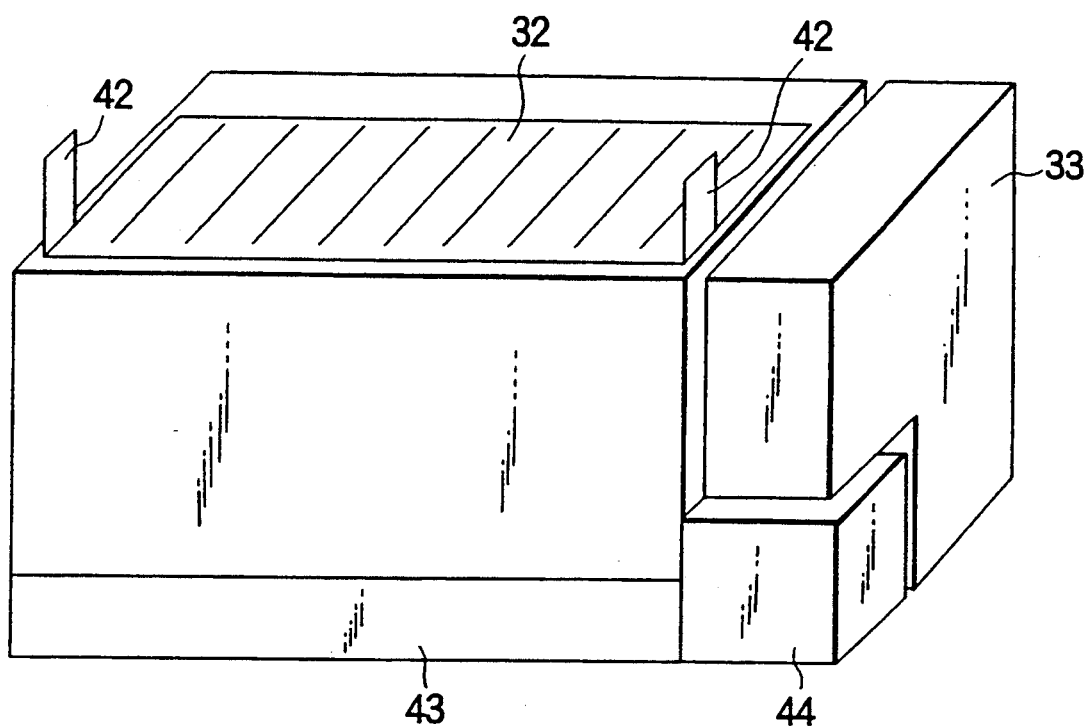
FIG. 24 is a perspective view illustrating the construction of a miniaturized fuel cell of this invention containing a mechanism for diffusing the recovered water.

FIG. 24 is a perspective view illustrating one example of the construction of a miniaturized fuel cell so constructed that the water recovered from the oxidizing electrodes will be diffused in the ambient air.

To be specific, this fuel cell comprises a fuel cell proper 32, a fuel cartridge 33, a water-diffusing mechanism 43, a (motive) power vessel 44, and a water recovery chamber 35 (not shown). A pair of cathode and anode terminals 42 are disposed at suitable positions. The fuel cell proper 32 has superposed a plurality of electromotive parts which are composed of a fuel electrode, an oxidizing electrode, and an electrolyte layer as illustrated in FIG. 22.

Figure 25:
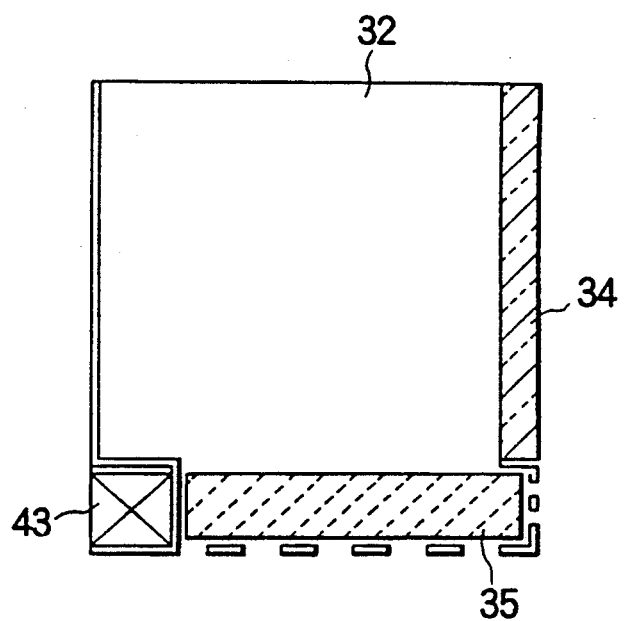
FIG. 25 is a cross section illustrating the construction of the miniaturized fuel cell of FIG. 21 as viewed in a different direction.

The water-diffusing mechanism 43 fulfills the function of inducing diffusion of the water formed in the oxidizing electrodes. The (motive) power vessel 44 contains a (motive) power device for actuating the water-diffusing mechanism or an electronic circuit. FIG. 25 represents a cross section which is taken at the position of the fuel cell proper 32) through the fuel cell of FIG. 21 viewed from the direction of the fuel cartridge 33.

The water recovery chamber 35 is the place for facilitating the recovery and diffusion of the water generated in the oxidizing electrodes. The porous material (wick) is placed in this chamber 35. The water-recovering wick has a smaller average pore diameter than the porous material forming the oxidizing electrodes and is set in place so as to contact the oxidizing electrodes in the fuel cell proper 32.

The water which is forwarded to the water recovery chamber 35 illustrated in FIG. 25 contains both steam and water. The ratio of steam and water so contained varies with the conditions for the operation of the fuel cell. The steam poses no problem because it is diffused in its unaltered form into the ambient air. It is the portion which exists in the form of water that poses a problem. The porous material (water-recovering wick) which is contained in the water recovery chamber 35 requires to have a minimum porosity of 50% and facilitate diffusion of the water entrapped in the pores by the water-diffusing mechanism.

The water-diffusing mechanism 43 is provided with a small lateral current fan and enabled to effect the diffusion of the water by the operation of this fan.

The diffusion of the produced water may be otherwise attained by means of the vibration generated by a vibrator using a piezoelectric element in the place of the forced current of air generated by the lateral current fan.

Alternatively, a heater may be used for the purpose of heating part of the produced water thereby expanding the volume of the water and, by dint of the expansion, actuating a discharge valve and inducing forced discharge of the remainder of the produced water.

The vibrator using the piezoelectric element has no use for any heat of vaporization because it only functions to diffuse but not vaporize the water. The vibrator using the piezoelectric element permits ample reduction in volume and thickness. It is, therefore, incapable of jeopardizing the characteristic features of smallness and high efficiency enjoyed by the fuel cell.

The method which resorts to vaporization of only part of the produced water operates effectively with a decisively small amount of energy as compared with the method which necessitates vaporization of the whole produced water.

Figure 26:
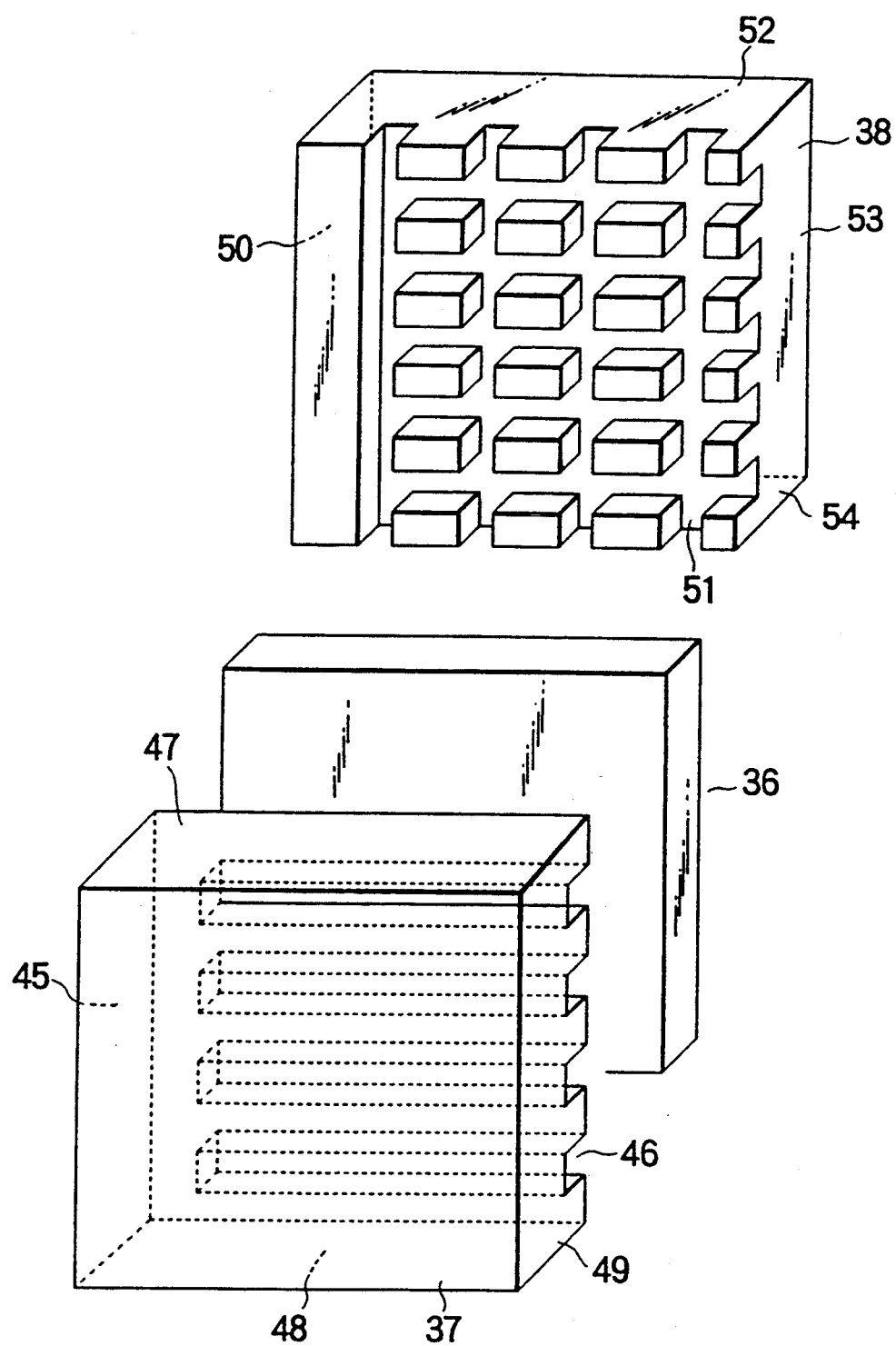
FIG. 26 is a perspective view illustrating the constructions of a fuel electrode, an electrolyte layer, and an oxidizing electrode in the miniaturized fuel cell of this invention containing the mechanism for recovery of water.
Figure 27:
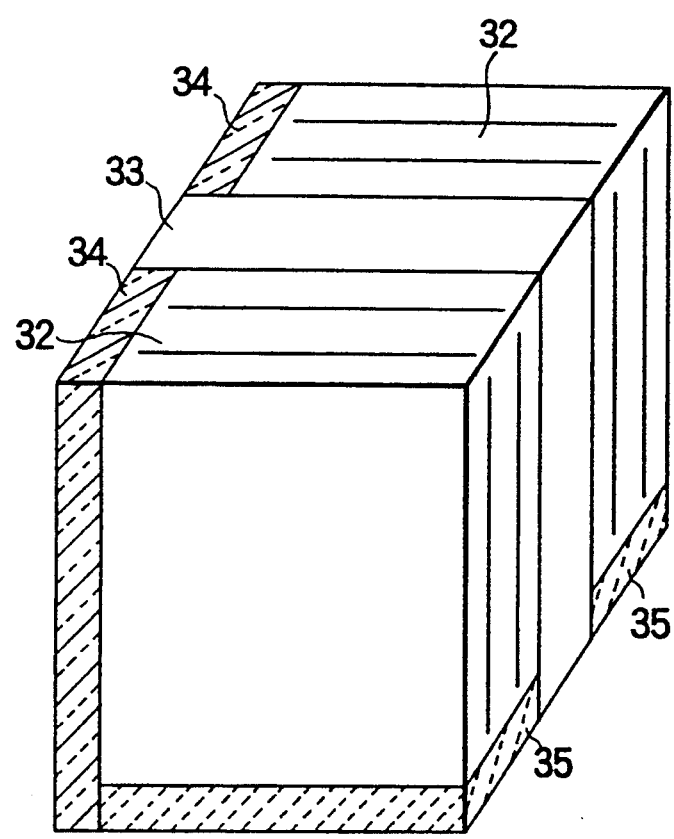
FIG. 27 is a perspective view illustrating the construction of the miniaturized fuel cell of this invention containing the mechanism for recovery of water.

FIG. 26 illustrates detailed constructions of a fuel electrode, an electrolyte layer, and an oxidizing electrode which are favorable for ensuring smooth operation of the fuel cells of the constructions described thus far.

In the fuel electrode 37, only one of the four lateral surfaces (excluding the surfaces lying perpendicularly to the direction of superposition of the component layers of a stack) is used as a fuel introducing surface 45. In the direction from the fuel introducing surface 45 to the opposite surface, a plurality of grooves 46 open at one terminal for allowing escape of carbon dioxide gas are formed in the plane of the fuel electrode 37 adjoined to the electrolyte layer 36 over the better part of the entire length of the fuel electrode 37. The fuel is smoothly transported through the capillaries in the porous material and diffused throughout the entire surface and the carbon dioxide gas produced by the reaction is passed through the grooves 46 and discharged into the ambient air. In this case, for the purpose of preventing the fuel from leaking to the ambient air, the surface pores in the other three lateral surfaces 47, 48, and 49 which do not participate in the supply of the fuel are kept closed.

The oxidizing electrode 38 is formed of a similar porous material. In this case, the surface pores in the lateral surface 50 parallel to the direction of introduction of the fuel into the fuel electrode are perfectly closed to preclude the entry of the fuel through this surface. In the surface of the oxidizing electrode adjoined to the electrolyte layer 36, a plurality of grooves 51 are formed in the straight direction. These grooves are formed so as to reach the three lateral surfaces 52, 53, and 54 other than the lateral surface in which the pores are stoppered. These three lateral surfaces are intended for introduction of the air. At least two of these three lateral surfaces are actually used for the introduction of the air. The water which is formed in the oxidizing electrode is caused to escape through one of the lateral surfaces (the surface 54 in the illustrated embodiment) which border on the surface whose pores are stoppered. The reason for using the construction which admits the air through the three lateral surfaces mentioned above is that the velocity of reaction in the oxidizing electrode which is lower than that in the fuel electrode is enhanced by increasing the concentration of oxygen.

One example of the operation of the miniaturized fuel cell of this invention inclusive of the recovery and discharge of the water produced in the oxidizing electrode has been described. This example presumes the construction which is adapted for a small portable device by contemplating the use of the fuel cartridge for supplying the fuel to the fuel cell proper.

The voltage to be required possibly varies with the kind of the device for which the fuel cell is used. When the device in use needs a high voltage, the number of electromotive parts superposed to form the fuel cell must be increased. There are devices for which one row of fuel cells does not suffice on account of the shape the electromotive parts are required to assume. In this case, the plurality of fuel cells proper 32 are assembled so that the fuel supplying surfaces thereof adjoin the position accommodating the fuel cartridge 33 and the fuel diffusion chambers 34 are installed thereon. As a result, the paths for the supply of the fuel are shortened and, at the same time, the distances of the paths from the water recovery chamber 35 are consequently shortened. Thus, the electromotive parts gain conspicuously in reliability.

This invention permits quick removal of the water produced on the oxidizing electrodes without use of any extra motive power and, consequently, enables the fuel cell to be operated continuously with high efficiency for a long time.

Particularly when a solid polymer membrane is used as the electrolyte, the working temperature thereof is not higher than 100° C. and the produced water is substantially wholly in a liquid state. This invention permits veritably quick removal of the water in the liquid state. Even when the fuel cell is tilted, reversed, or otherwise moved, the water once recovered can be prevented from scattering or back-flowing. Thus, it serves ideally as a power source for small portable devices.

The fuel cell which relies for supply of the fuel on the phenomenon of capillarity produced by the porous material as described above promises miniaturization of devices all the more because it has no use for any extra motive power in the supply of the fuel and the discharge of the produced water.

The aspect of this invention for accomplishing the third object of the invention resides in a fuel cell so constructed that a plurality of electromotive parts composed of a fuel electrode, an oxidizing electrode, and an electrolyte layer nipped by and between the two electrodes are connected in series, and the fuel electrodes severally of the electromotive parts receive the fuel supplied through a common fuel path and the surfaces of the fuel electrodes severally of the electromotive parts confront the fuel path mentioned above or the oxidizing electrodes severally of the electromotive parts receive the oxidizing agent from a common oxidizing agent path and the surfaces of the oxidizing electrodes severally of the electromotive parts confront the oxidizing agent path mentioned above, which fuel cell is characterized by the fact that the electrolyte layers contain a water-absorbing or water-retaining substance.

Figure 28:
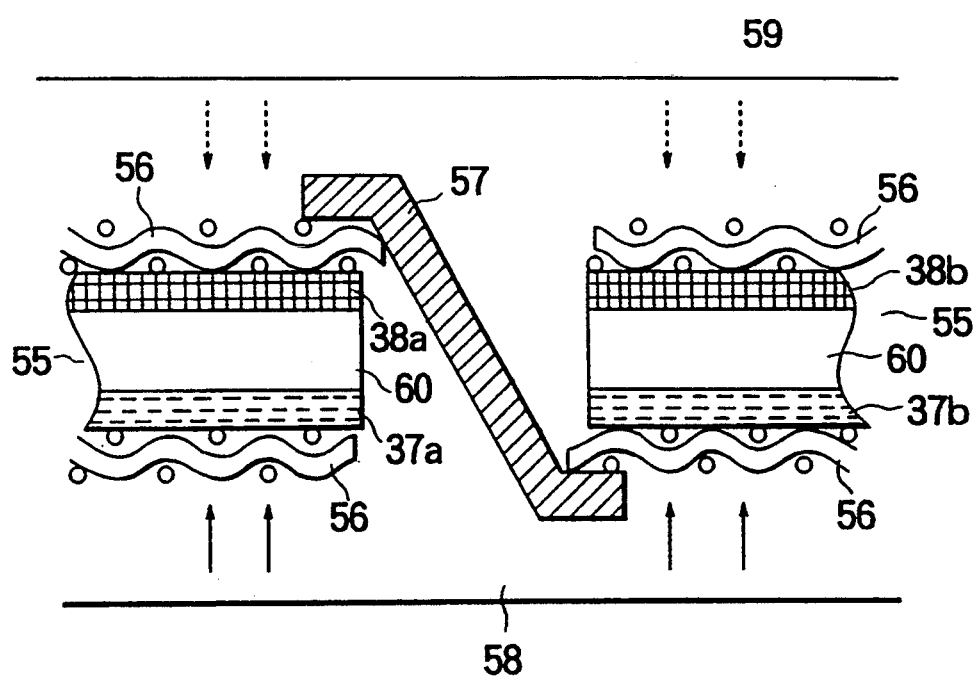
FIG. 28 is a structural diagram illustrating one example of the arrangement of electromotive parts in the fuel cell of this invention.

The following description will cover the fuel cell whose construction is illustrated in FIG. 28.

This invention is directed to a fuel cell which is so constructed that a plurality of electromotive parts composed of a fuel electrode, an oxidizing electrode, and an electrolyte layer nipped by and between the two electrodes are connected in series, and the fuel electrodes severally of the electromotive parts receive the fuel supplied through a common fuel path and the surfaces of the fuel electrodes severally of the electromotive parts confront the fuel path mentioned above or the oxidizing electrodes severally of the electromotive parts receive the oxidizing agent from a common oxidizing agent path and the surfaces of the oxidizing electrodes severally of the electromotive parts confront the oxidizing agent path mentioned above. In one example of the construction mentioned above, a plurality of electromotive parts 55 composed of an oxidizing electrode 38, a fuel electrode 37, and an electrolyte layer 60 are arranged laterally so as to allow the fuel electrodes severally thereof to lie on one and the same plane and the fuel electrodes 37 and the oxidizing electrodes 38 of the adjacent electromotive parts 55 are connected with a connecting conductor 57 so as to complete the fuel cell in series connection as illustrated in FIG. 28. In the fuel cell of this construction, the fuel is supplied through a common fuel path 58 to the surfaces of the fuel electrodes 37 in both the adjacent electromotive parts. The air as the oxidizing agent is supplied through a common oxidizing agent path 59 to the surfaces of the oxidizing electrodes 38 in both the adjacent electromotive parts.

Figure 29:
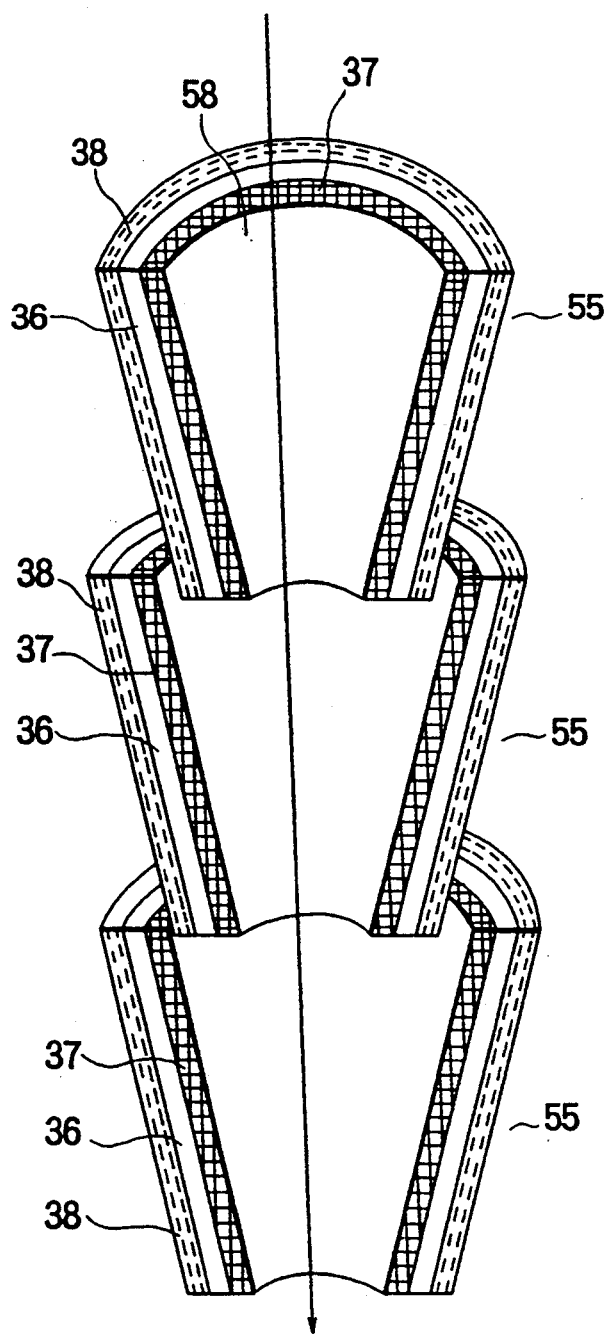
FIG. 29 is a structural diagram illustrating one example of the arrangement of electromotive parts in the fuel cell of this invention.

Besides the fuel cells described thus far, a fuel cell so constructed that cylindrical electromotive parts are connected in series may be cited. FIG. 29 illustrates in cross section the construction of another fuel cell according to this invention. The electromotive parts 55 are cylindrical in shape and are composed of a fuel electrode 37, an electrolyte layer 36, and an oxidizing electrode 38 as reckoned outwardly from the center of the cylinder.

One electromotive part 55 is laid on another one in such a manner that the oxidizing electrode 38 on the outer side of the former electromotive part contacts the fuel electrode 37 on the inner side of the latter electromotive part. In the fuel cell of this construction, the fuel is forwarded through the fuel path 58 formed inside the cylinder and supplied thence to the surfaces of the fuel electrode 37. The air as the oxidizing agent is supplied to the oxidizing electrode 38 from outside the cylinder. This construction may be modified so that the oxidizing electrodes form the inner surface of the cylinder and the fuel is supplied thereto from the outside of the cylinder.

Figure 44:
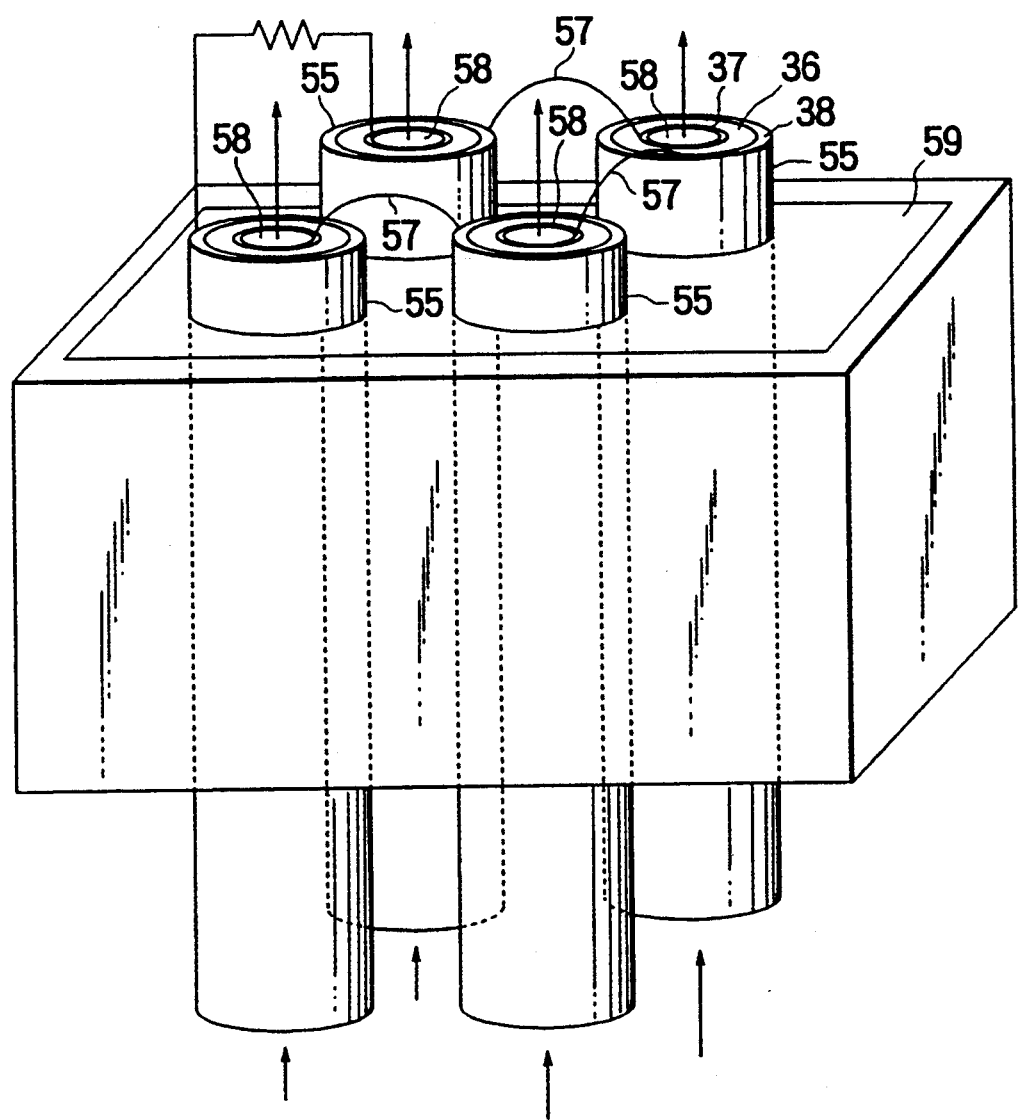
FIG. 44 is a structural diagram illustrating one example of the arrangement of electromotive parts in the fuel cell of this invention.

FIG. 44 is a perspective view illustrating still another fuel cell according to this invention.

Each electromotive part 55 has a cylindrical shape and is composed of a fuel electrode 37, an electrolyte layer 36, and an oxidizing electrode 38 as reckoned outwardly from the center of the cylinder. A plurality of such cylindrical electromotive parts 53 are connected in series with a connecting conductor 57. In the fuel cell of this construction, the fuel is forwarded to the fuel paths 58 formed one each inside the cylindrical electromotive parts and supplied thence to the surfaces of the fuel electrodes 37. The air as the oxidizing agent is supplied to the surfaces of the oxidizing electrodes 38 through one common oxidizing agent path 59 disposed outside the cylinder. In the fuel cell of the construction having such cylindrical electromotive parts arranged as described above, this construction may be modified so that the fuel electrodes will form the outer side of the cylinder and the oxidizing electrodes the inner side of the cylinder and the fuel supplied through the fuel path shared by the electromotive parts and disposed outside the cylinder.

Heretofore, the fuel to be supplied to the fuel electrode or the reactant substance such as the oxidizing agent to be supplied to the oxidizing electrode has been inevitably fated to be adulterated with water or an electrolyte. The impurifying substance functions as an electrolyte which is fated to form an ion-conducting carrier. Generally it has been held, therefore, that in the fuel cell constructed as described above, the voltage loss among the plurality of electromotive parts defies elimination.

As a measure to solve this problem, the present invention characteristically contemplates using in the electromotive part an electrolyte layer which incorporates therein, besides a compound possessing an ion-exchange ability and serving as a main component substance for the ordinary electrolyte, a water-absorbing or water-retaining substance capable of supplying water into the interior of the membrane, retaining water, or passing water in accordance with a concentration gradient.

Figure 30:
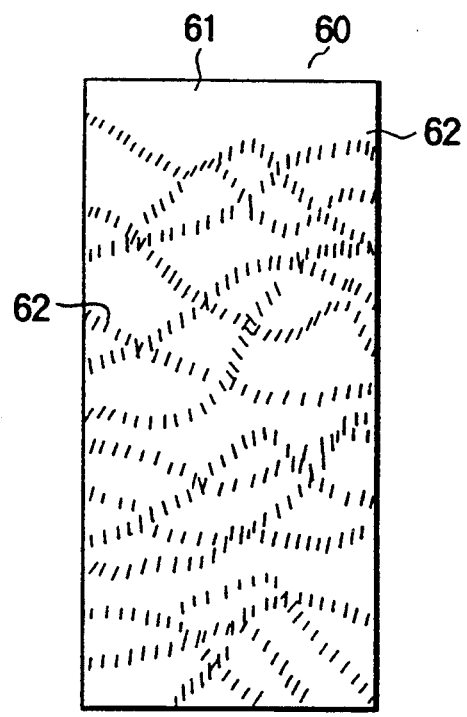
FIG. 30 is a model diagram of the construction of an electrolyte layer.

The construction and mechanism of the electrolyte layer to be used in the fuel cell of this invention will be described below with reference to model diagrams. FIG. 30 illustrates with a model the construction of an electrolyte layer using a proton-conducting solid polymer. In FIG. 30, an electrolyte layer 60 comprises a solid polymer electrolyte 61 and a water-absorbing or water-retaining substance 62 retained in the electrolyte 61.

Figure 31:
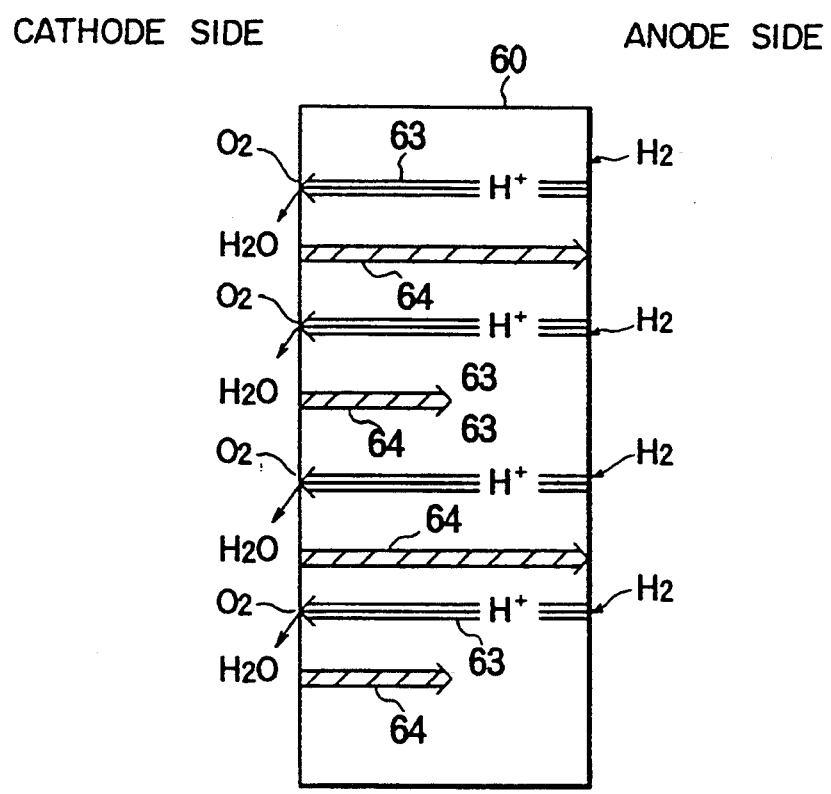
FIG. 31 is a model diagram illustrating mass transfer in the electrolyte layer.

FIG. 31 is a model diagram illustrating the transfer of substances within the electrolyte mentioned above. It is clearly noted from FIG. 31 that since the electrolyte layer according to this invention exhibits an ion (proton) conducting property which is inherent in a polymer solid electrolyte and, at the same time, manifests a water-absorbing or water-retaining ability of its own owing to the function of the water-absorbing or water-retaining substance, it quickly absorbs the water produced on the surface of the oxidizing electrode and retains the electrode ready constantly for contact with the reactant substance and, at the same time, prevents the interior of the membrane and the surface of the fuel electrode from drying.

Specifically, the protons which are produced on the fuel electrode side are transported toward the oxidizing electrode side (in the direction indicated by the arrow 63) through the agency of the proton-conducting property of the solid polymer electrolyte. The water produced meanwhile on the oxidizing electrode side is forwarded by the action of the water-absorbing or water-retaining substance to the surface of the fuel electrode and into the interior of the electrolyte as indicated by the arrow 64 and then retained therein.

Since the electrolyte layer according to this invention manifests the water-absorbing or water-retaining property in itself as described above, it quickly absorbs the water produced on the surface of one of the electrode catalysts, retains the surface of the catalyst ready constantly for contact with the reactant substance and, at the same time, causes diffusion of the absorbed water within the electrolyte in accordance with the concentration gradient and prevents the surface of the other electrode from drying. In the course of this process, the electrolyte itself manifests an outstanding quality of constantly maintaining characteristic properties of ion dissociation and ion conduction effectively without requiring addition of water from an external source.

In the fuel electrode which uses this electrolyte layer, therefore, the water can be supplied to the interior of the electrolyte without adulterating the reactant substance being supplied meanwhile and the water produced on the oxidizing electrode can be quickly absorbed. Thus, the conduction of ions outside the electrolyte layer can be appreciably curbed.

The water-absorbing or water-retaining substances which are effectively usable in this invention include water absorbent macro-molecular compounds such as starch, acrylonitrile copolymers, cross-linked acrylates, and cross-linked polyethylene oxide and gel compounds such as silica hydrogel and denatured proteins (gelatin), for example.

This invention manifests the effect thereof conspicuously when the electrolyte to be used therein is a solid polymer electrolyte.

As proton-conducting solid polymer electrolytes among other solid polymer electrolytes, perfluorocarbon sulfonic acid polymer (product of Du Pont of the U.S.A. marketed under trademark designation of "Nafion") and polystyrene type cation-exchange membranes possessing a sulfonic acid group may be cited. The use of the electromotive parts which are consequently obtained enables the reactant substances supplied to the oxidizing electrodes and the fuel electrodes, essential components for the fuel cell of this invention, to avoid including therein any substance capable of functioning as an electrolyte except for the imponderable amount of the inevitably entrained substance and ensures realization of a fuel cell so constructed that the terminal parts of a plurality of electromotive parts are interconnected in series.

As means of interconnecting the terminal parts of the plurality of electromotive parts in series, the method which consists in directly connecting the collectors of the electromotive parts by welding or through the medium of a conductive adhesive agent, the method which effects the connection through the medium of a conducting plate for the purpose of preventing adulteration of the reactant substances and leakage of electric current, and the method which, during the manufacture of electromotive parts, consists in integrally manufacturing a plurality of electromotive parts in such a manner as to obtain direct interconnection of the electromotive parts may be adopted.

In these methods, the water-repelling treatment given to the connecting parts of the plurality of electromotive parts is effective in curbing the wetting of the electrolyte.

The aspect of this invention for fulfilling the fourth object of this invention will be described below. This invention contemplates directly supplying a carbon-containing fuel such as methanol to the fuel electrodes. This invention pertains to a methanol fuel cell and aims to curb the poisoning of the surface of the fuel electrode which occurs during the supply of the carbon-containing fuel to the fuel electrode.

The invention which satisfies the fourth object mentioned above resides in a fuel cell provided with a fuel electrode, an oxidizing electrode, and an electrolyte layer nipped by and between the electrodes, which fuel cell is characterized by being furnished with a mechanism capable of anodically polarizing the fuel electrode.

To be specific, in this invention, when a poisoning product occurs on the surface of the fuel electrode during the operation of the fuel cell, the fuel electrode is made to contact a counter electrode to induce anodic polarization of the fuel electrode and consequently effect removal of the poisoning product by dint of oxidation. As a result, the fuel cell is enabled to give a stable output for a long time.

Generally, the conventional fuel cell uses a plurality of serially connected electromotive parts composed of a fuel electrode, an oxidizing electrode, and an electrolyte layer. In this case, the polarizing operation mentioned above is desired to be rotated through the plurality of electromotive parts so as to effect desired removal of the poisoning product without interrupting the operation of the fuel cell.

The fuel cells of this invention which fulfill the second, third, and fourth objects of this invention will be described below with reference to working examples.

EXAMPLE 13

A power generator using a fuel cell was constructed as shown in FIG. 24. It was rated for working voltage at 3 V 6W and for 10 hours' capacity at 60 Wh. The number of electromotive parts superposed in the fuel cell proper was 8. Each electromotive part was constructed as illustrated in FIG. 22.

As a solid polymer electrolyte 36, a commercial product having a thickness of 100 μm and marketed under trademark designation of "Nafion" was used. On the opposite surfaces of the solid polymer electrolyte 36, a platinum catalyst was deposited fast by the electroless plating technique and the dispersion of PTFE (Teflon) was applied in a proper amount by spraying. A fuel electrode 37 and an oxidizing electrode 38 were disposed severally on the opposite sides of the solid polymer electrolyte 36 and separators 39 made of nickel plate were set one each against the outer surfaces of the electrodes as illustrated in FIG. 22. The fuel electrode 37 and the oxidizing electrode 38 were both made of porous Ni plate and the fuel electrode 37 had a pore diameter distribution in the range of 40 to 60 μm and an average pore diameter of about 50 μm as a median. The cathode similarly had an average pore diameter of about 50 μm. To the surfaces of the fuel electrode and the oxidizing electrode adjoining the solid polymer electrolyte layer, the platinum catalyst and the PTFE were deposited likewise in a suitable amount. The lateral surfaces of the oxidizing electrode, solid polymer electrolyte membrane 36, and separator 39 which were flush with the surface of the fuel electrode 37 allowing infiltration of the fuel were coated with a protective film resistant to alcohol to preclude permeation of alcohol. FIG. 25 is a diagram illustrating a cross section of the fuel cell shown in FIG. 21.

The fuel diffusion chamber 34 was made of resin and packed with a fuel-diffusing wick formed of a porous material of resin fibers (a composite material consisting of minute particles of phenol resin and woven fabric of polyester and having an average pore diameter of about 100 μm). The water recovery chamber 35 was likewise packed with a water-recovering wick formed of the same porous resinous material (having an average pore diameter of about 40 μm and a porosity of about 50%). A lateral current fan was used as the water diffusing mechanism 43.

The fuel cartridge was filled with methanol and water at a methanol: water molar ratio of 1:2 (despite the theoretical molar ratio of 1:1, the water was used in a doubled amount for the purpose of keeping the solid polymer electrolyte wet).

COMPARATIVE EXAMPLE 2

A power generator constructed as follows was used for the purpose of comparison. Though this power generator was identical in construction with the power generator of Example 13, the fuel cell was so constructed that the oxidizing electrode 38 and the water-recovering wick likewise had an average pore diameter of 50 μm.

COMPARATIVE EXAMPLE 3

A power generator constructed as follows was used for the purpose of comparison. This power generator was identical in construction with the power generator of Example 13, excepting the fuel cell omitted the use of the water-recovering wick.

Figure 32:
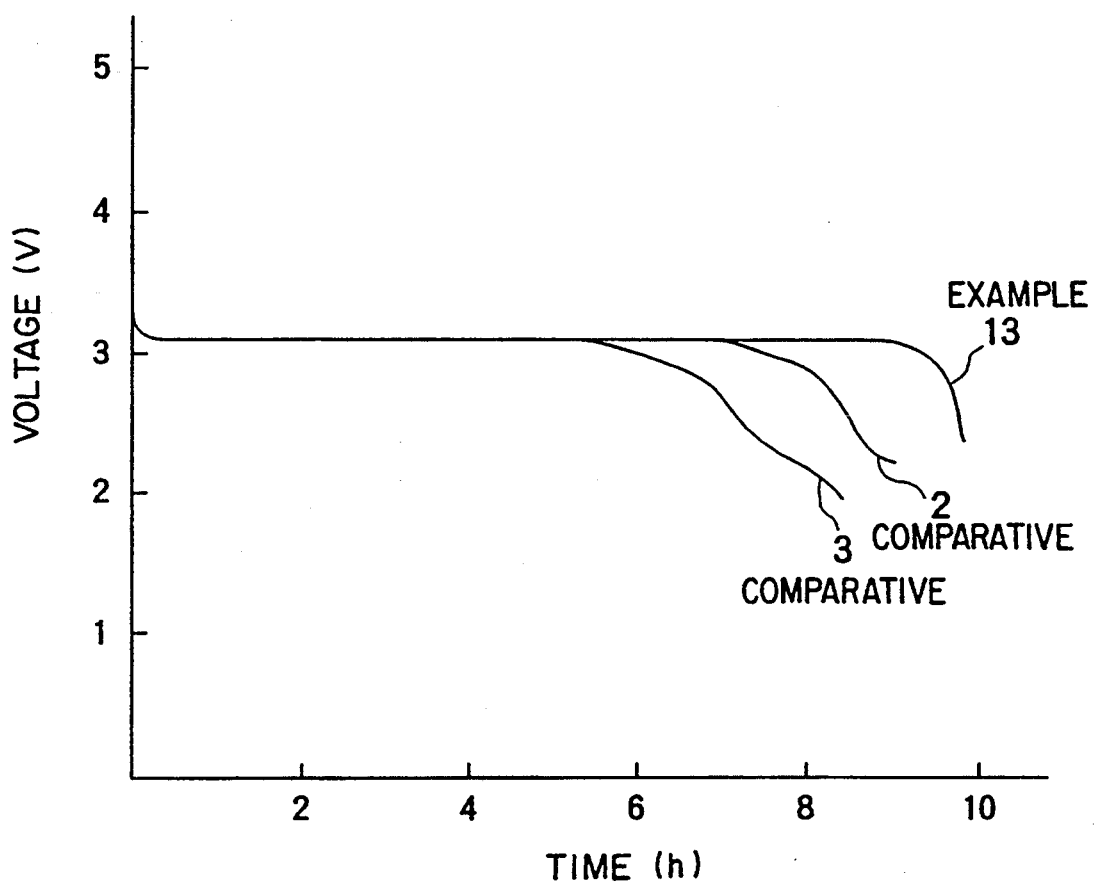
FIG. 32 is a time-voltage characteristic diagram showing the data obtained of the fuel cells of Example 13 of this invention and Comparative Experiments 3 and 4.

The fuel cells described above were operated at a 2A discharge at normal room temperature. The results were as shown in FIG. 32. The fuel cells of Comparative Experiment 2 and Comparative Experiment 3 completed discharge in short spans of time and failed to manifest properties as rated. The poor results may be logically explained by a supposition that the water produced by the cell reaction was not quickly removed from the fuel cell proper and consequently suffered to stagnate partly and obstructed the subsequent cell reaction.

In contrast, the fuel cell of Example 13 effected the discharge as rated. Though the voltage dropped slightly during the course of the discharge, this drop posed virtually no problem. The fuel was wholly used up.

The materials which are effectively usable for this invention are not limited to those mentioned in the working examples cited thus far but include various other materials. The materials to be used for the fuel electrode and oxidizing electrode, for example, are not limited to nickel metals. The materials resistant to acids such as, for example, stainless steel type materials, aluminum- and copper-based alloys, tungsten, titanium, and other similar valve metal materials, carbon materials, and porous materials made of such composite materials as SiC are other examples of the materials under discussion. Further, porous resin materials which have surfaces thereof coated with a suitable acidproof metal may be used. These materials are desired to have a porosity approximately in the range of from 30% to 80% and an average pore diameter approximately in the range of from 1 μm to 100 μm. If these magnitudes fall short of the respective lower limits, the materials fail to contain substantially sufficient pores and allow no infiltration of liquid. Conversely if the magnitudes exceed the respective upper limits, the materials exhibit unduly low mechanical strength and contain excessively large pores and no longer serve effectively as a liquid-retaining material.

As respects the wick, wicks of varying substances are usable. Generally, wicks of hydrophilic substances are desirable for the purpose of transporting a liquid. In this case, the materials for the wicks are not allowed to be conductors because conductors possibly form a cause for a short circuit. The resin materials are desired to be felts, nonwoven fabrics, and woven fabrics of phenol resin, polyester resin, and natural cellulose, for example. Desirably, these resin materials have a porosity approximately between the lower limit of 30% and the upper limit of 95%.

If the porosity is less than the lower limit, the capacity for retention of liquid is unduly low. If it exceeds the upper limit, the strength for retention of liquid is unduly low for the role of a wick.

EXAMPLE 14

A membrane was produced from a solution (product of Aldrich) of a commercially available solid polymer electrolyte membrane of perfluorocarbon sulfonic acid polymer (product of Du Pont of the U.S.A. marketed under trademark designation of "Nafion"), starch as an absorbent polymer, and a low molecular oligomer aqueous solution of a sodium polyacrylate polymer. The manufacture of this membrane was carried out by mixing the two solutions of the polymer electrolyte and the absorbent polymer in amounts calculated to result in a solids ratio of 9:1 on a glass plate, spreading the resultant mixture on the glass plate, and then heat-treated to complete polymerization and effect drying. A catalyst layer made of a mixture of platinum-carried carbon powder and fluorocarbon and a nickel mesh as a collector were deposited by thermocompression bonding on the opposite surfaces of the membrane mentioned above to produce an electromotive part.

Figure 33:
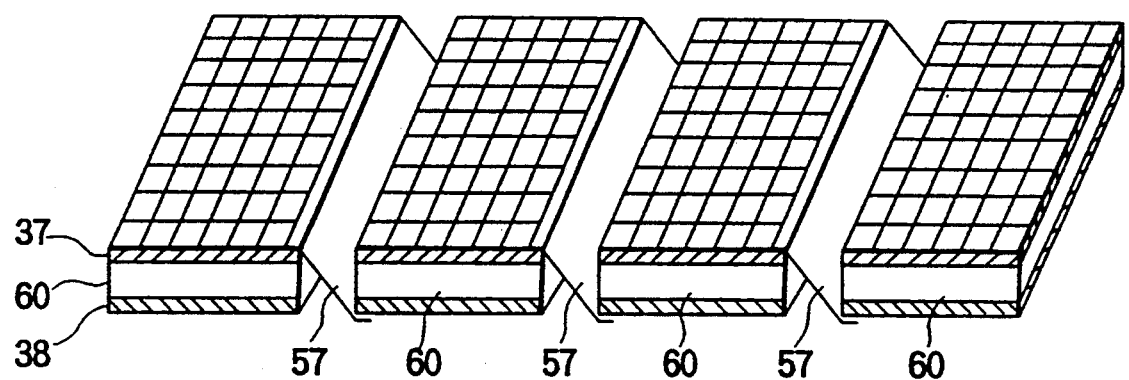
FIG. 33 is a schematic diagram of power-generating members according to Example 14.
Figure 34:
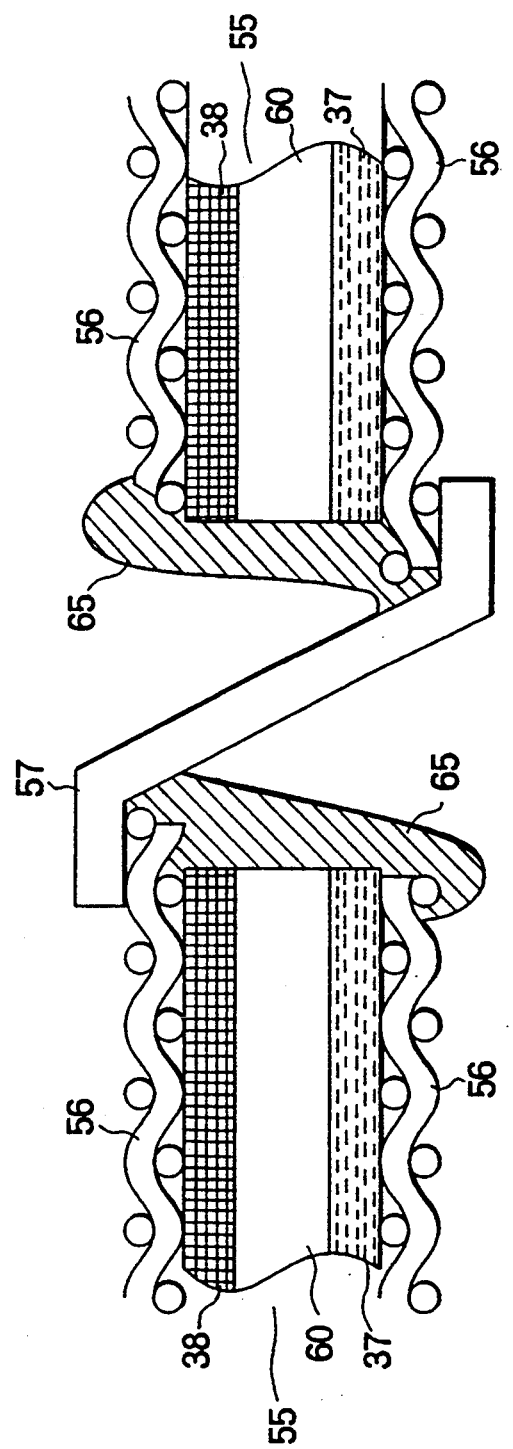
FIG. 34 is a schematic diagram of parts for union of the power-generating members according to Example 14.
Figure 35:
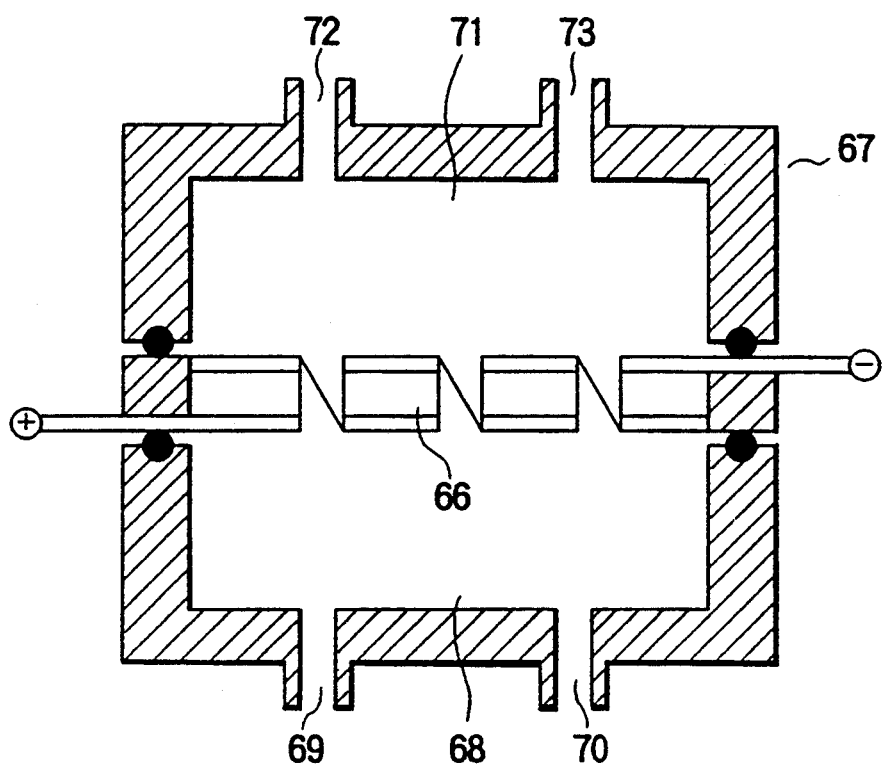
FIG. 35 is a cross section of a model fuel cell according to Example 14.

Four such electromotive parts measuring 10 cm×3 cm were prepared and interconnected across the longer edges thereof with a nickel ribbon to produce a four-piece series power generator. FIG. 33 represents the general outlook of this power generator. In FIG. 33, 37 stands for a fuel electrode, 38 for an oxidizing electrode, 60 for an electrolyte layer composed of the solid polymer electrolyte and the absorbent polymer, and 57 for a connecting conductor of nickel ribbon. FIG. 34 is a cross section illustrating the part of connection between the electromotive parts mentioned above. In FIG. 34, 37 stands for a fuel electrode, 38 for an oxidizing electrode, 60 for an electrolyte layer, 56 for a collector, and 57 for a connecting conductor. The part for connecting the collector 56 and the connecting conductor 57 was vested with ability to repel water by a treatment which comprised applying a Teflon dispersion 65 to the part and firing the applied layer of the dispersion. A model fuel cell was produced using such electromotive parts. FIG. 35 represents with a model the construction of this model fuel cell. The manufacture of this model fuel cell was carried out by first stowing the electromotive parts 66 in a model cell container 67 and providing the model cell container 67 with an air chamber 68, an air inlet 69, an air outlet 70, a fuel chamber 71, a fuel inlet 72, and a fuel outlet 73 which were adapted to supply air and fuel to the opposite surfaces of the electrodes. The air and the fuel were supplied to the opposite surfaces of the electrodes to test the model fuel cell for power-generating characteristics.

EXAMPLE 15

Figure 36:
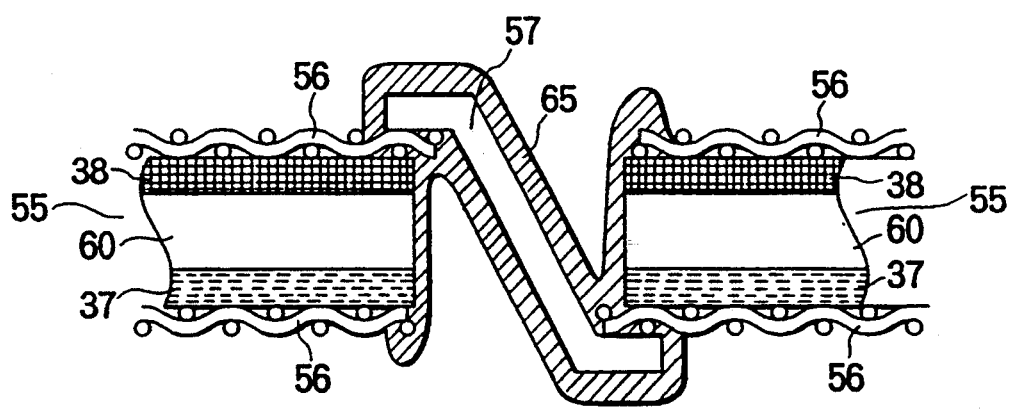
FIG. 36 is a schematic diagram of the parts of union of the power-generating members according to Example 15.

A power generator was produced by following the procedure of Example 13. The part for connecting the electromotive parts was vested with ability to repel water by a treatment which comprises applying the Teflon dispersion 65 to the entire surface of the part and firing the applied layer of the dispersion. Thus, a model fuel cell was produced. The connecting part is illustrated with a model in FIG. 36.

EXAMPLE 16

Figure 37:
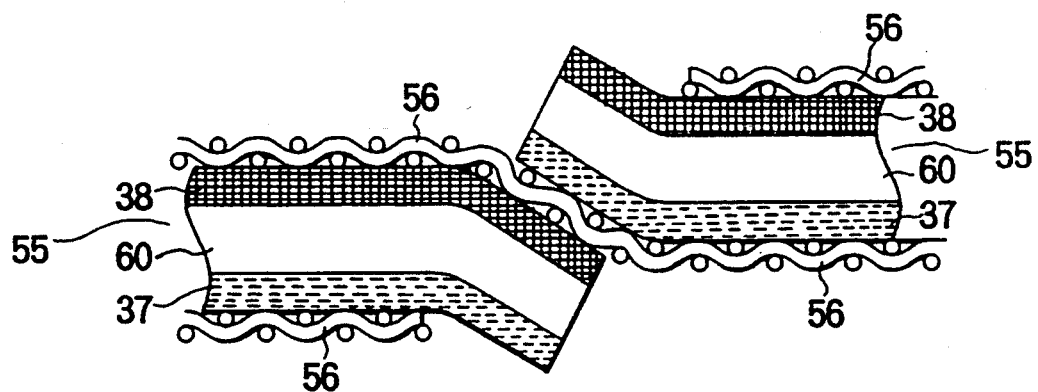
FIG. 37 is a schematic diagram of the parts of union of the power-generating members according to Example 16.

A power generator was produced by following the procedure of Example 13, excepting a nickel mesh was used jointly by two adjacent electromotive parts as illustrated in FIG. 37.

The model fuel cells of Examples 14 to 16 were tested for open-circuit voltage during supply of hydrogen gas to the fuel chamber and air to the air chamber and for voltage during the supply of an electric current of 0.2 A/cm². The results were as shown in Table 1.

COMPARATIVE EXAMPLE 4

A model fuel cell was produced by following the procedure of Example 8, excepting the solid polymer electrolyte contained no absorbent polymer. This model fuel cell was tested for voltage by following the procedure of Example 13, excepting the hydrogen gas passed through hot water at 80° C. was supplied to the fuel chamber. The results were as shown in Table 1.

COMPARATIVE EXAMPLE 5

The same electromotive element as used in Examples 12 to 14 was cut to obtain a plate of the square of 5 cm. This plate was interposed between two sintered porous plates of nickel powder. Four such composite sets were manufactured and superposed with a nickel plate interposed between every two adjacent composite sets to produce a model fuel cell. This model fuel cell was tested for voltage during the supply of hydrogen gas to the fuel electrode side and air to the oxidizing electrode side. The results were as shown in Table 1.

[TABLE 1]

| No. | Open-circuit voltage (mV) | Closed-circuit voltage at 200 mA/cm² (mV) |
| --- | --- | --- |
| Example 14 | 405 | 285 |
| Example 15 | 415 | 300 |
| Example 16 | 405 | 290 |
| Comparative Experiment 4 | 385 | 265 |
| Comparative Experiment 5 | 400 | 280 |

The model fuel cells of Example 14 and Comparative Experiment 4 were compared in size. The results were as shown in Table 2.

[TABLE 2]

| No. | Surface area of unit electromotive element (cm$^2$) | Output at 200 mA/cm$^2$ (mW) | Volume of model fuel cell (cm$^3$) | Volume per surface area of electromotive element (cm) | Volume per output (cm$^3$/W) |
| --- | --- | --- | --- | --- | --- |
| Example 14 | 30 | 57 | about 12 | 0.4 | 211 |
| Comparative Experiment 4 | 25 | 56 | about 31 | 1.24 | 554 |

As described above, for the same number of electromotive parts to be superposed, the fuel cell of this invention was favored with high voltage and small volume as compared with the fuel cell produced by the conventional method of superposition or the fuel cell which was supplied as conventionally practiced with wet reactant substances which possibly formed an ion source.

The model fuel cell of Example 14 was operated for direct power generation by supplying methanol heated to 60° C. to the fuel chamber in one test run and similarly supplying an equivoluminal mixture of methanol and water in another test run. The voltages obtained in the two test runs were as shown in Table 3.

[TABLE 3]

| Fuel supplied | Open-circuit voltage (V) | Closed-circuit voltage at 60 mA/cm$^2$ (V) |
| --- | --- | --- |
| Methanol | 2.80 | 1.65 |
| methanol + water (1:1) | 2.70 | 1.50 |

It is noted from Table 3 that the fuel cell operated even when methanol was supplied to the fuel chamber. The data clearly indicate that the fuel cell of this invention is not required to supply the fuel in combination with water which possibly causes a loss of voltage between the electrodes and that it can curb the voltage loss.

EXAMPLE 17

Figure 38:
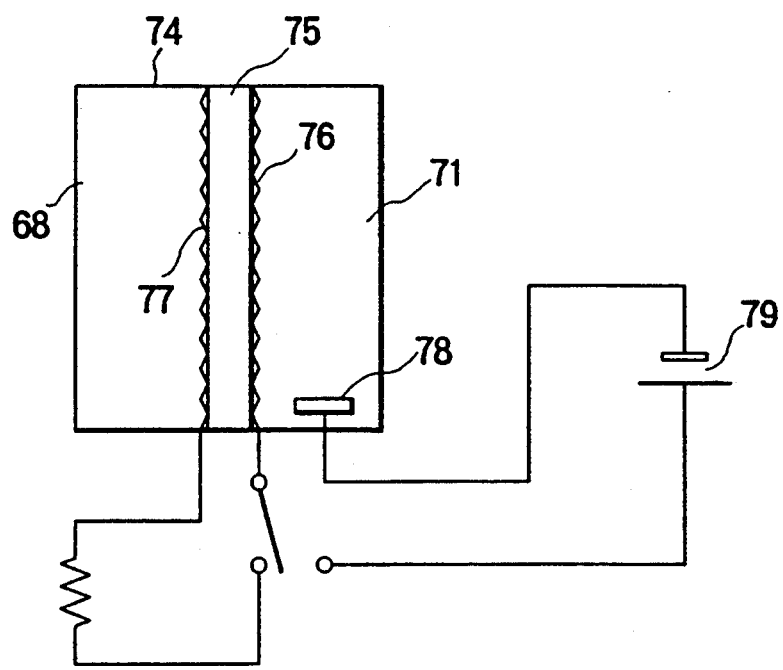
FIG. 38 is a circuit diagram illustrating the construction of a fuel cell according to Example 17.

A fuel cell illustrated in FIG. 38 was produced by way of trial. In this fuel cell, an electromotive part 74 was composed of a fuel electrode 76, an oxidizing electrode 77, and a solid polymer electrolyte layer 75 nipped by and between the electrodes. A fuel chamber 71 and an air chamber 68 were set severally on the opposite outer sides of the electromotive part 74. Inside the fuel chamber 71, a counter electrode 78 to be used for anodically polarizing the fuel electrode was set. In this case, platinum was used invariably for the fuel electrode, oxidizing electrode, and counter electrode and a commercially available perfluorocarbon sulfonic acid polymer (product of Du Pont of the U.S.A. marketed under trademark designation of "Nafion") was used for the solid polymer electrolyte. An aqueous solution containing methanol at a concentration of 1 mol/liter and sulfuric acid at a concentration of mol/liter was used as the anolyte.

The cell produced as described above was tested for discharge characteristics at a current density of 20 mA/cm$^2$. In this test, the discharge was interrupted at an interval of 100 minutes and, during each interval, the fuel electrode 76 was refreshed by being connected to the counter electrode 78 and to an external DC power source 79 rated at 2 V and subjected to 3 minutes' polarization.

COMPARATIVE EXAMPLE 6

The procedure of Example 17 was repeated, excepting the operation of polarization was omitted.

Figure 39:
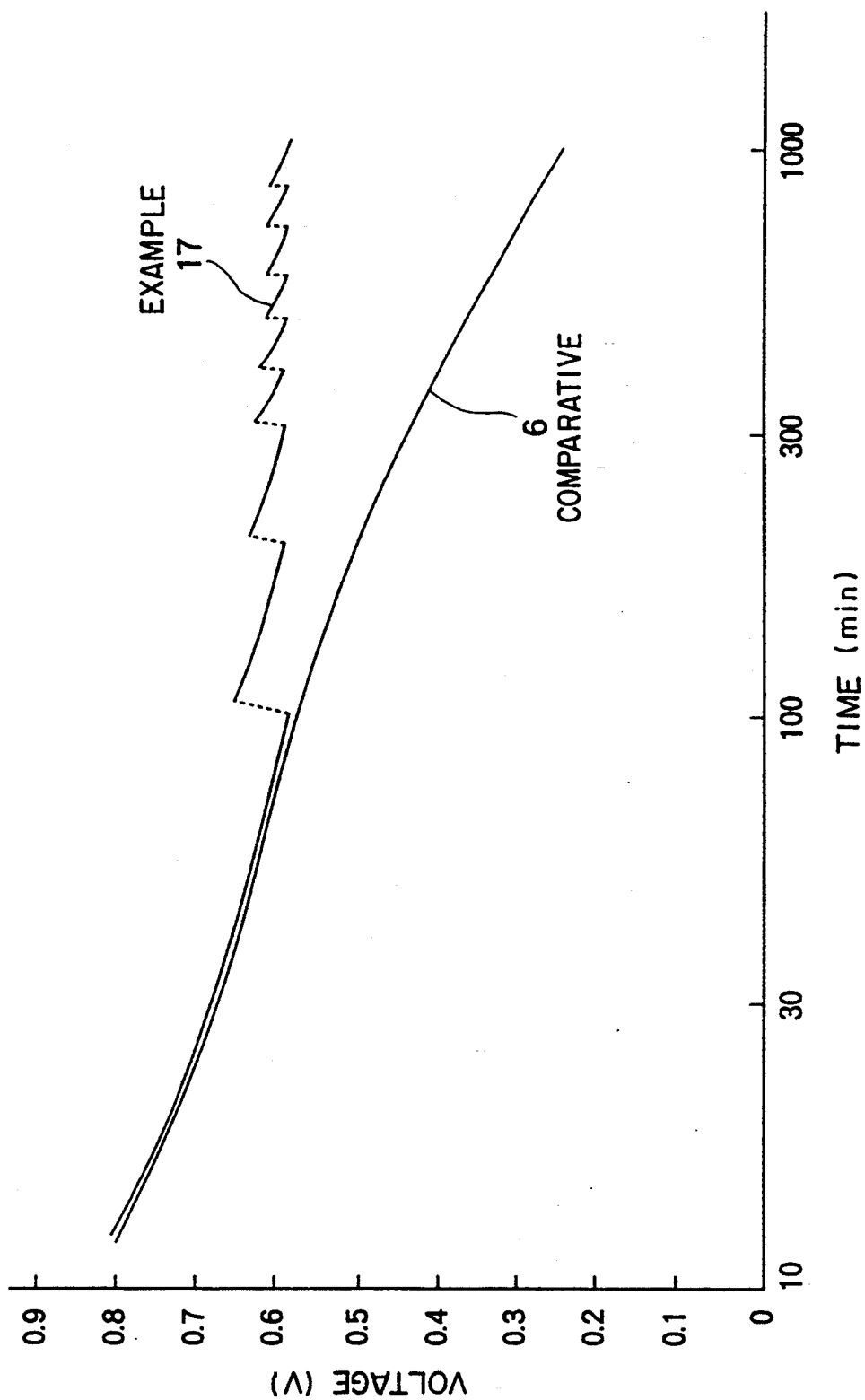
FIG. 39 is a time-voltage characteristic diagram showing the data obtained of the fuel cell according to Example 17.

The results were as shown in FIG. 39. The fuel cell of Example 5 in which the operation of polarization was carried out at the stated interval maintained a high output voltage even after 1,000 minutes, whereas the fuel cell of Comparative Experiment 6 in which the discharge was performed continuously showed a gradual decrease of output voltage with the elapse of time.

EXAMPLE 18 AND COMPARATIVE EXAMPLE 7

Figure 40:
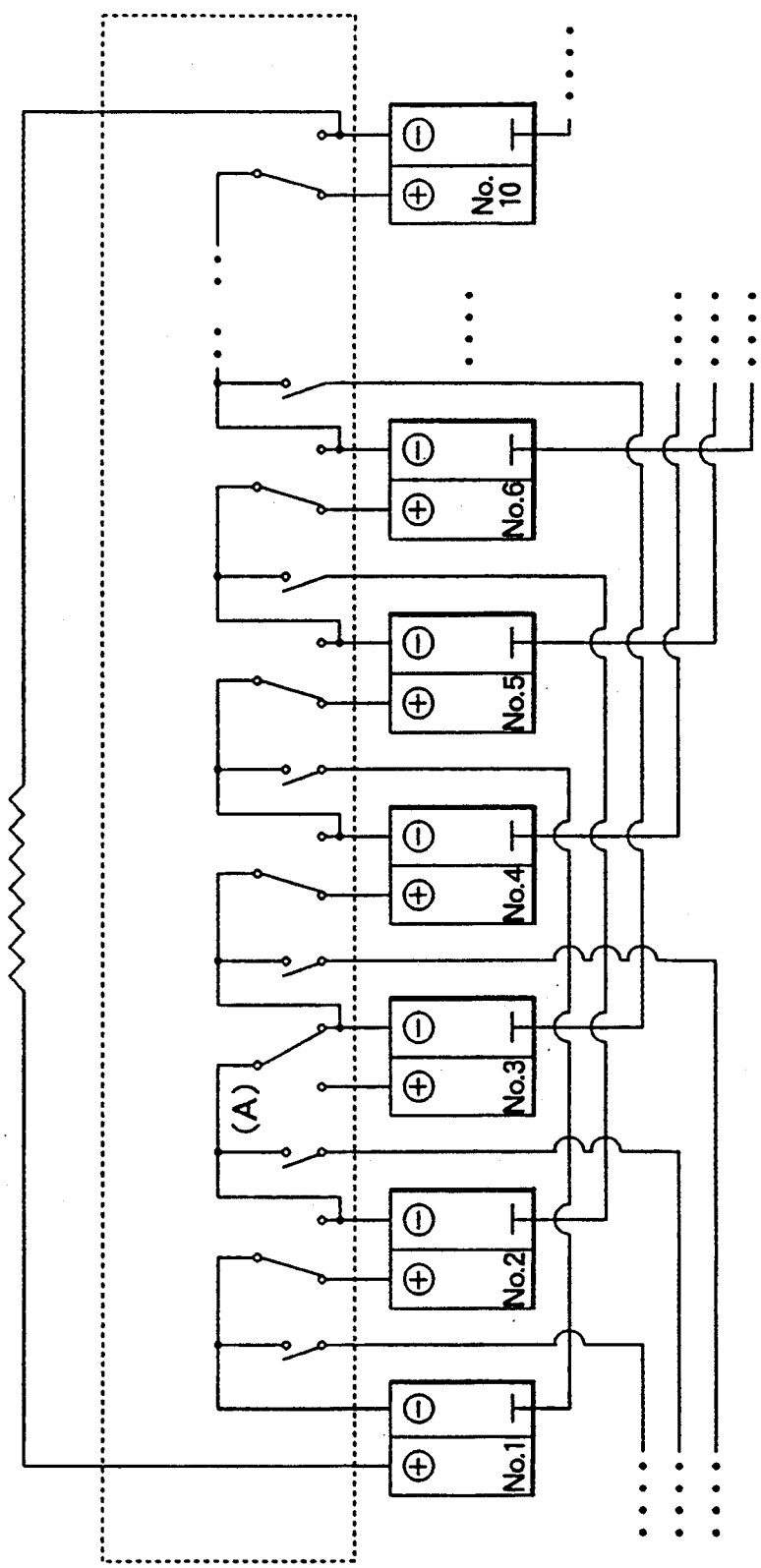
FIG. 40 is a circuit diagram illustrating the construction of a fuel cell according to Example 18.

A fuel cell was manufactured by way of trial by superposing 10 electromotive parts of Example 17. This fuel cell was tested for discharge characteristics under the same conditions as those of Example 17. In this case, however, the refreshing operation was performed on one of the cells removed from the discharge circuit, with the rest of the cells left in the circuit to avoid interrupting the operation. This procedure was rotated through the cells to allow continuation of the output. The power for the polarization was extracted from the superposed cell to obviate the necessity for using an external power source. The outline of the system and the circuit were as illustrated in FIG. 40. The diagram depicts the case of refreshing No. 3 cell. To be more specific, the switch (A) was turned to allow removal of No. 3 cell from the discharge circuit, the switch (B) was turned to effect polarization of the fuel electrode of the cell, and the power source was parallelly extracted from No. 4, No. 5, and No. 6 cells to perform polarization for a stated period while the discharge was in process. This switching operation was rotated through the superposed cells. The polarization was carried out for 5 minutes at the same interval of 100 minutes as in Example 11. The switching circuit enclosed with a frame of broken line in the diagram could be miniaturized through circuit integration.

Figure 41:
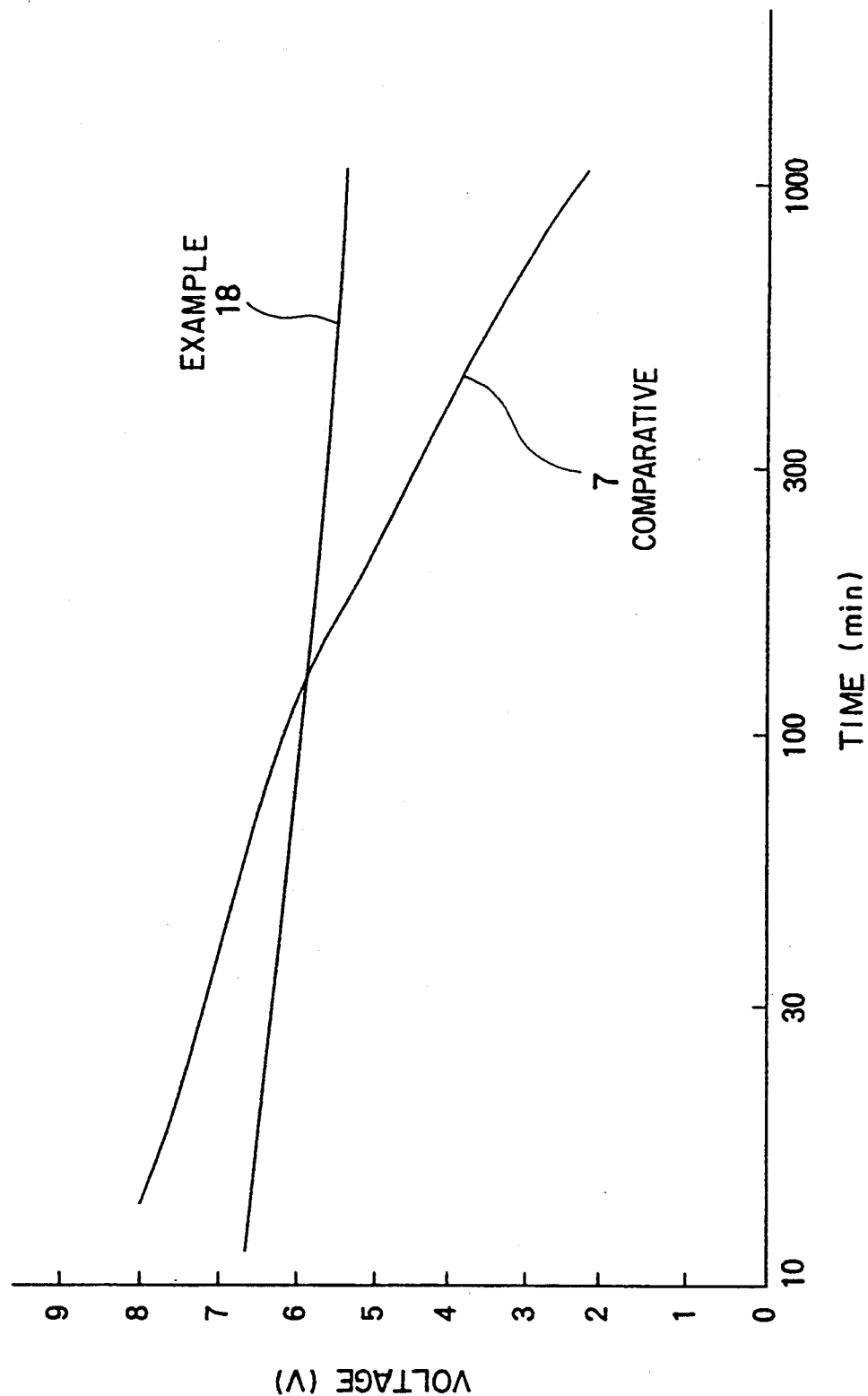
FIG. 41 is a time-voltage characteristic diagram showing the data obtained of the fuel cell according to Example 18.
Figure 42:
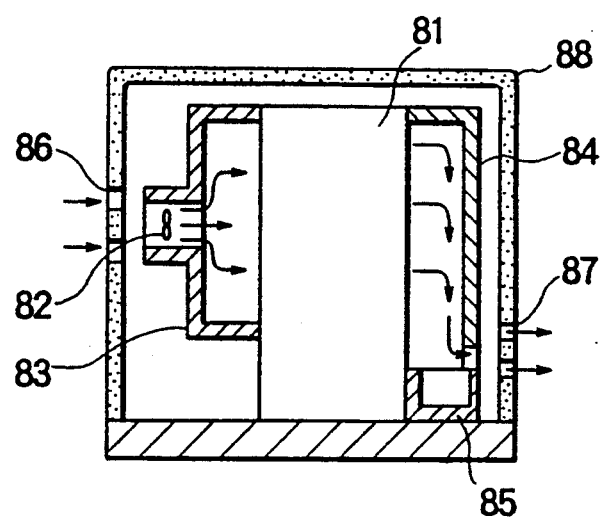
FIG. 42 is a schematic diagram of a conventional fuel cell.
Figures 43A, 43B:
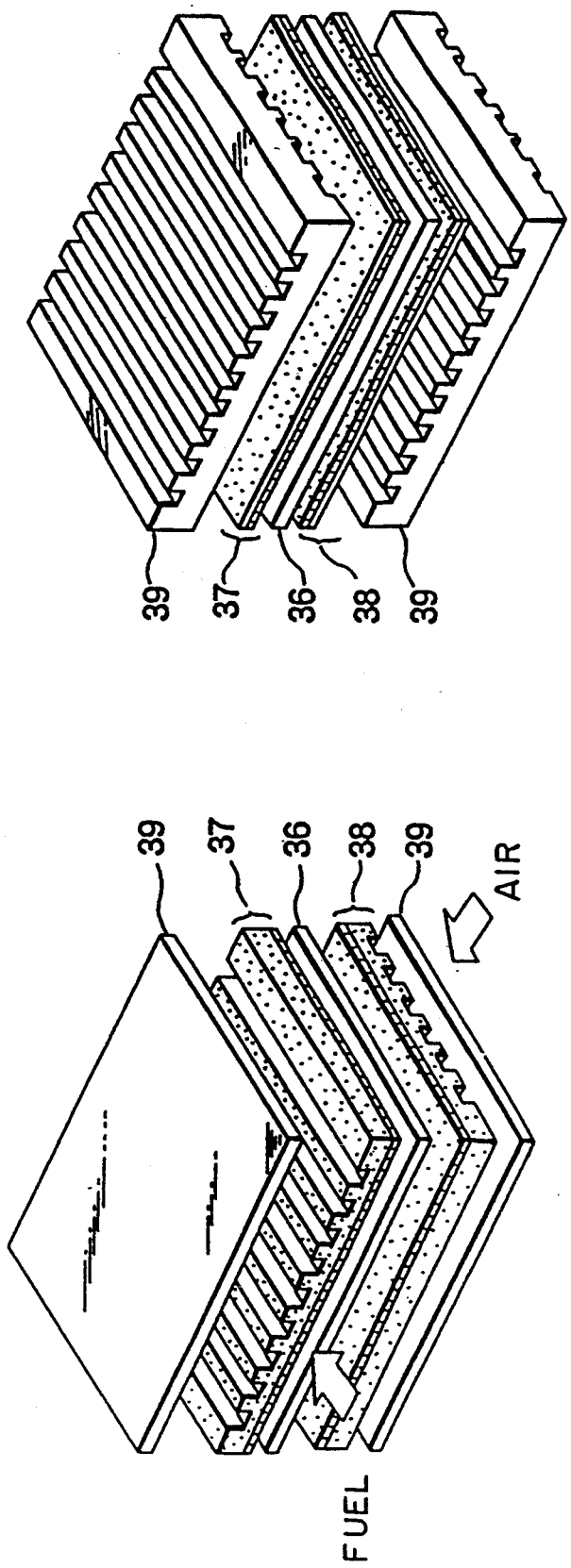
FIGS. 43A and 43B are perspective views illustrating the constructions of superposed layers in conventional fuel cells.

The fuel cell constructed as described above and a fuel cell which had undergone absolutely no polarizing operation (a sample for comparative experiment) were tested for discharge characteristics. The results were as shown in FIG. 41.

The fuel cell of Example 18, similarly to that of Example 17, maintained a high output voltage continuously even after the elapse of 1,000 minutes.

As described in detail above, this invention can provide a highly efficient fuel cell which fits miniaturization.

In accordance with the aspect of this invention fulfilling the second object of the invention allows quick recovery of the water formed on the surface of the oxidizing electrode without requiring use of any extra motive power. Further, since the fuel cell of this invention obtains the absorption of the produced water by the use of a porous material, it can be used as a mobile power source without suffering the recovered water to flow back or scatter about. Thus, the fuel cell has a structure fit for a power source which serves a miniaturized device.

Further, in accordance with the aspect of this invention fulfilling the third object of the invention, the fuel cell of a horizontal or cylindrical construction which fits miniaturization offers itself as a highly efficient power source capable of curbing the loss of voltage between the electromotive parts.

In accordance with the aspect of this invention fulfilling the fourth object of the invention, when methanol which forms an ideal fuel for a miniaturized fuel cell is adopted, a fuel cell capable of preventing the poisoning phenomena and producing a stable output for a long time can be realized.

What is claimed is:

1. A fuel cell comprising:
a stacked body comprising
a fuel electrode, an oxidizing electrode, and an electrolyte plate nipped between said fuel electrode and said oxidizing electrode;
means for supplying a fuel to said stacked body;
means for supplying an oxidizing agent to the stacked body; and
means for recovering water generated at said oxidizing electrode, wherein said recovering means comprises a first water absorbing means adjoined to said oxidizing electrode and second water absorbing means adjoined to said first water absorbing means and provided externally of said stacked body, wherein said second water absorbing means has a higher water absorbing ability than said first water absorbing means.

2. A fuel cell according to claim 1, wherein said first water absorbing means is composed of a porous material, said second water absorbing means is composed of a porous material, and said second water absorbing means have a smaller average pore diameter than said first water absorbing means.

3. A fuel cell according to claim 1, wherein said fuel cell is operated at a temperature of about 100° C. or below.

4. A fuel cell according to claim 1, wherein said fuel cell is a solid polymer electrolyte fuel cell.

5. A fuel cell comprising:
a plurality of electromotive parts comprising a fuel electrode, an oxidizing electrode, and an electrolyte layer nipped between said fuel electrode and said oxidizing electrode, said plurality of electromotive parts being connected in series,
wherein a fuel is supplied from a common fuel path to said fuel electrodes of said plurality of electromotive parts, the surfaces of said fuel electrodes of said plurality of electromotive parts confronting with said common fuel supplying path, and said electrolyte layer comprises a water absorbing substance and/or water retaining substance.

6. A fuel cell comprising:
a plurality of electromotive parts comprising a fuel cell, an oxidizing electrode, and an electrolyte layer nipped between said fuel electrode and said oxidizing electrode, said plurality of electromotive parts being connected in series,
wherein an oxidizing agent is supplied from a common oxidizing agent path to said oxidizing electrodes of said plurality of electromotive parts, the surfaces of said oxidizing electrodes of said plurality of electromotive parts confronting with said common oxidizing agent supplying path, and said electrolyte layer comprises a water absorbing substance and/or water retaining substance.

* * * * *